(12) United States Patent
Kim et al.

(10) Patent No.: US 11,054,929 B2
(45) Date of Patent: Jul. 6, 2021

(54) ELECTRONIC DEVICE AND A CONTROL METHOD THEREOF

(71) Applicant: KOREA ELECTRONICS TECHNOLOGY INSTITUTE, Seongnam-si (KR)

(72) Inventors: Kunnyun Kim, Yongin-si (KR); Wion Hyo Kim, Yongin-si (KR); Yeonhwa Kwak, Seoul (KR); Kwang Bum Park, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 15/038,406

(22) PCT Filed: Dec. 20, 2013

(86) PCT No.: PCT/KR2013/011916
§ 371 (c)(1),
(2) Date: May 20, 2016

(87) PCT Pub. No.: WO2015/093665
PCT Pub. Date: Jun. 25, 2015

(65) Prior Publication Data
US 2016/0291762 A1    Oct. 6, 2016

(30) Foreign Application Priority Data

Dec. 19, 2013  (KR) .................. 10-2013-0159356
Dec. 19, 2013  (KR) .................. 10-2013-0159357
(Continued)

(51) Int. Cl.
*G06F 3/041*      (2006.01)
*G06F 3/0488*    (2013.01)
(Continued)

(52) U.S. Cl.
CPC .......... *G06F 3/0414* (2013.01); *G06F 3/0482* (2013.01); *G06F 3/0487* (2013.01);
(Continued)

(58) Field of Classification Search
CPC .... G06F 3/0414; G06F 3/0416; G06F 3/0482; G06F 3/0488; G06F 2203/04102; G06F 2203/04803
See application file for complete search history.

(56) References Cited

U.S. PATENT DOCUMENTS 8,543,166 B2    9/2013  Choi et al.
9,672,796 B2    6/2017  Son et al.
(Continued)

FOREIGN PATENT DOCUMENTS

EP    2613244 A2    7/2013
EP    2648066 A2   10/2013
(Continued)

OTHER PUBLICATIONS

International Search Report dated Sep. 22, 2014 for International Application No. PCT/KR2013/011916, filed Dec. 20, 2013.
(Continued)

*Primary Examiner* — Patrick N Edouard
*Assistant Examiner* — Eboni N Giles
(74) *Attorney, Agent, or Firm* — Knobbe Martens Olson & Bear LLP

(57) ABSTRACT

An electronic device according to an embodiment of the present invention may include a display configured to display a first screen; a force direction sensing unit configured to detect a force direction of a contact applied to one point by an external object; and a control unit configured to sense an occurrence of a predetermined event to logically divide the display into at least two regions including a first region and a second region, acquire a force direction of a first
(Continued)

contact associated with the predetermined event from the force direction sensing unit, determine a region from among the at least two regions to display the first screen according to the force direction of the first contact, and display the first screen on the determined region.

4 Claims, 77 Drawing Sheets

(30) Foreign Application Priority Data

Dec. 19, 2013 (KR) .......................... 10-2013-0159358
Dec. 19, 2013 (KR) .......................... 10-2013-0159359

(51) Int. Cl.
*G06F 3/0487* (2013.01)
*G06F 3/0484* (2013.01)
*G06F 3/0482* (2013.01)

(52) U.S. Cl.
CPC ........ *G06F 3/0488* (2013.01); *G06F 3/04847* (2013.01); *G06F 2203/04102* (2013.01); *G06F 2203/04803* (2013.01); *G06F 2203/04808* (2013.01)

(56) References Cited

U.S. PATENT DOCUMENTS

| | | | |
|---|---|---|---|
| 2008/0303782 A1 | 12/2008 | Grant et al. | |
| 2012/0105358 A1* | 5/2012 | Momeyer | G06F 3/0414 345/174 |
| 2012/0133621 A1 | 5/2012 | Kim | |
| 2012/0289290 A1 | 11/2012 | Chae et al. | |
| 2012/0320081 A1 | 12/2012 | Kim et al. | |
| 2013/0120302 A1* | 5/2013 | Kang | G06F 3/041 345/173 |
| 2013/0169520 A1 | 7/2013 | Cho et al. | |
| 2013/0215088 A1 | 8/2013 | Son | |
| 2013/0265257 A1 | 10/2013 | Jung et al. | |
| 2013/0285922 A1 | 10/2013 | Alberth, Jr. | |
| 2013/0285933 A1* | 10/2013 | Sim | G06F 3/04883 345/173 |
| 2013/0296000 A1* | 11/2013 | Park | G09G 3/001 455/566 |
| 2013/0321264 A1* | 12/2013 | Park | G06F 3/01 345/156 |
| 2013/0321340 A1* | 12/2013 | Seo | H04M 1/0214 345/174 |
| 2014/0002355 A1* | 1/2014 | Lee | G06F 1/1626 345/156 |
| 2014/0028596 A1* | 1/2014 | Seo | G06F 3/0487 345/173 |
| 2014/0054438 A1 | 2/2014 | Yun et al. | |
| 2014/0098028 A1* | 4/2014 | Kwak | G09G 5/00 345/173 |
| 2014/0101560 A1 | 4/2014 | Kwak et al. | |
| 2014/0168139 A1* | 6/2014 | Ku | G09G 3/20 345/174 |
| 2014/0320425 A1* | 10/2014 | Jeong | G06F 3/1454 345/173 |
| 2014/0347287 A1 | 11/2014 | Lee et al. | |
| 2014/0375596 A1* | 12/2014 | Kim | G06F 3/0416 345/174 |
| 2016/0085355 A1* | 3/2016 | Pirogov | G06F 3/04144 345/174 |
| 2016/0266788 A1 | 9/2016 | Park et al. | |
| 2016/0299578 A1 | 10/2016 | Kim et al. | |
| 2016/0299579 A1 | 10/2016 | Kim et al. | |
| 2017/0262070 A1 | 9/2017 | Kwak et al. | |

FOREIGN PATENT DOCUMENTS

| | | |
|---|---|---|
| KR | 10-2010-0015231 A | 2/2010 |
| KR | 10-2010-0018883 A | 2/2010 |
| KR | 10-2010-0023326 A | 3/2010 |
| KR | 10-2010-0041733 A | 4/2010 |
| KR | 10-2010-0107377 A | 10/2010 |
| KR | 10-2011-0063410 A | 6/2011 |
| KR | 10-2012-0056512 A | 6/2012 |
| KR | 10-2012-0138618 A | 12/2012 |
| KR | 10-2013-0030727 A | 3/2013 |
| KR | 10-2013-0085528 A | 7/2013 |
| KR | 10-2013-0113901 A | 10/2013 |
| KR | 10-2013-0120817 A | 11/2013 |
| KR | 10-2013-0132679 A | 12/2013 |
| KR | 10-2013-0135648 A | 12/2013 |

OTHER PUBLICATIONS

Final Office Action in KR Application No. 10-2014-0166661, dated Jul. 28, 2016 in 4 pages.
Notice of Allowance in KR Application No. 10-2013-0159356, dated Sep. 26, 2015 in 2 pages.
Office Action in KR Application No. 10-2013-0159356, dated Mar. 31, 2015 in 4 pages.
Office Action in KR Application No. 10-2013-0159359, dated Apr. 30, 2015 in 4 pages.
International Search Report dated Sep. 22, 2014 for International Application No. PCT/KR2013/011917, filed Dec. 20, 2013.
International Search Report dated Sep. 30, 2014 for International Application No. PCT/KR2013/011918, filed Dec. 20, 2013.
Office Action received in U.S. Appl. No. 15/038,432, dated May 11, 2017.
Office Action of corresponding Korean Patent Application No. 10-2014-0166659—4 pages (dated Jun. 29, 2018).
Final Office Action received in U.S. Appl. No. 15/038,432, dated Jul. 17, 2018.
Notice of Allowance in KR Application No. 10-2014-0166659, dated Feb. 22, 2019 in 2 pages.
Office Action received in U.S. Appl. No. 15/038,429, dated Jan. 25, 2019.
Office Action received in U.S. Appl. No. 15/038,432, dated Jan. 10, 2019.

* cited by examiner

[Fig. 1]
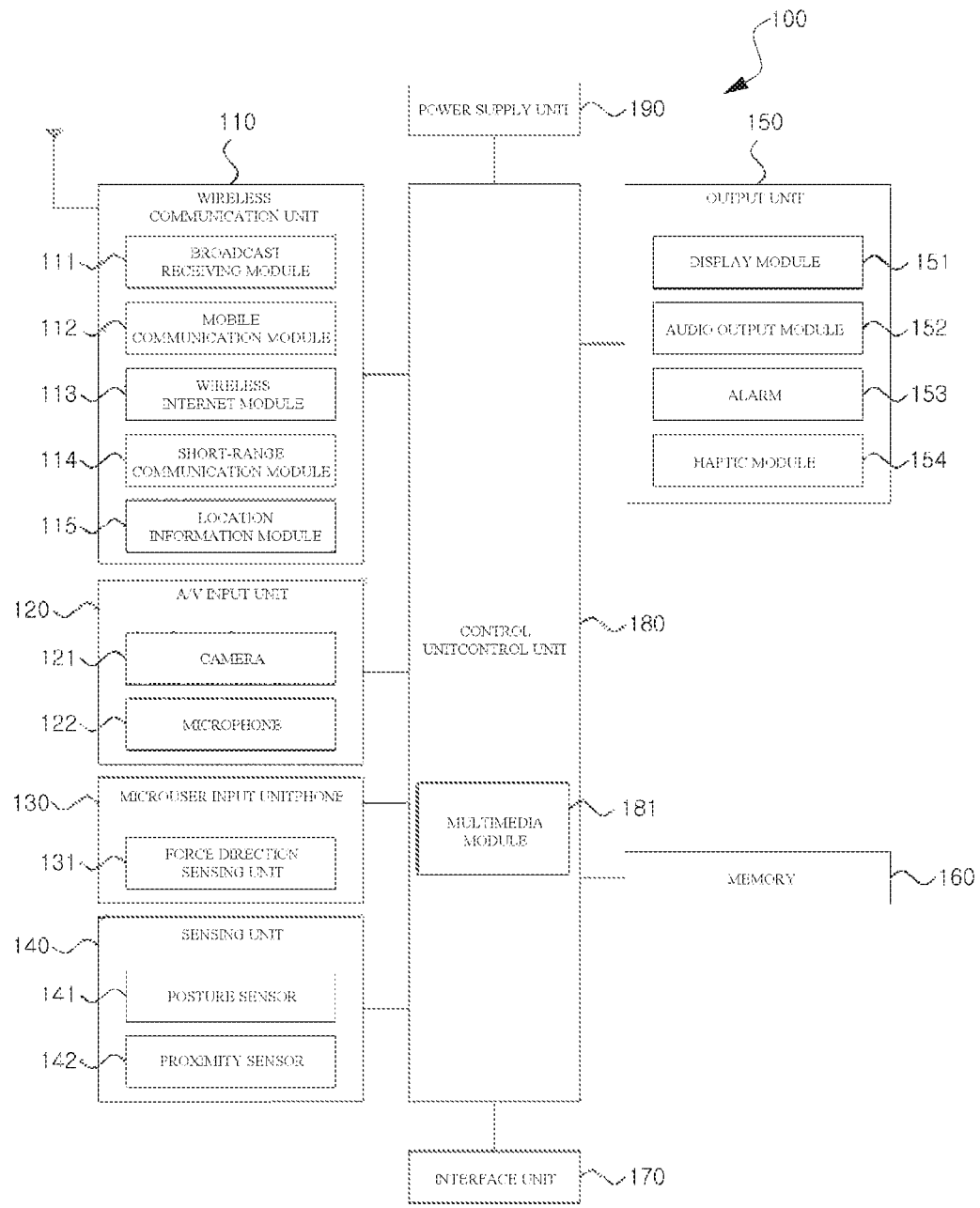

[Fig. 2]
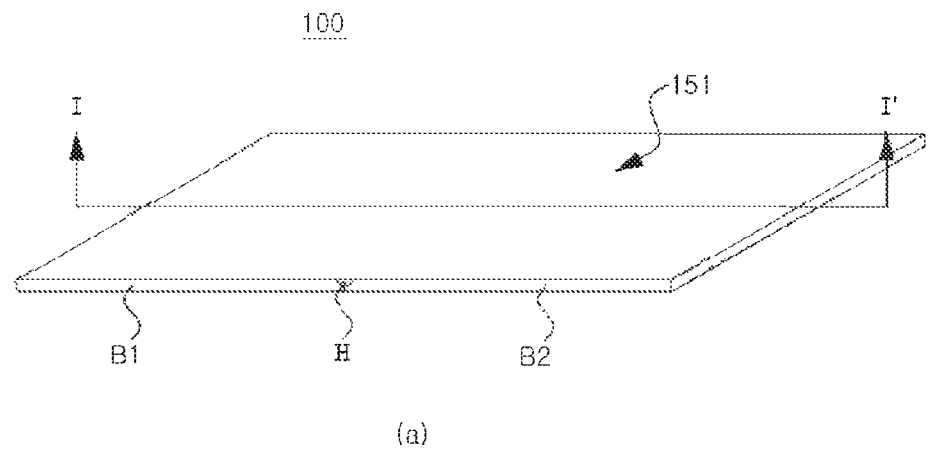
(a)
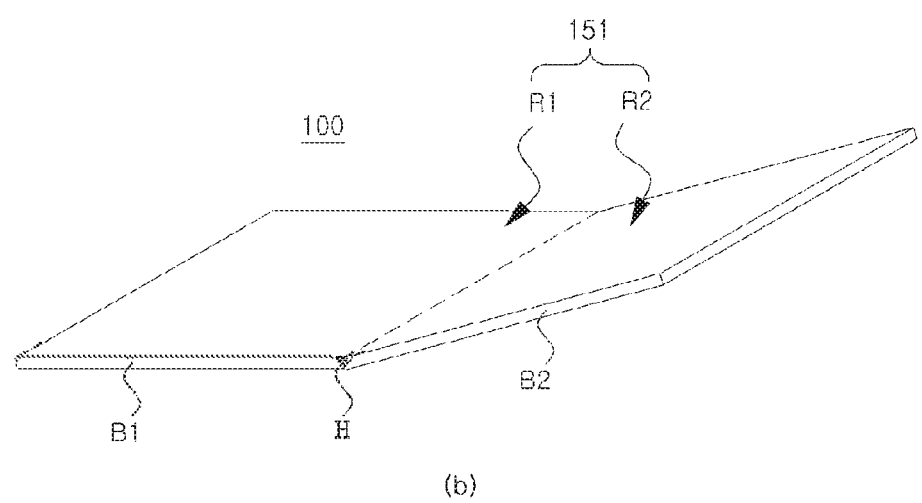
(b)
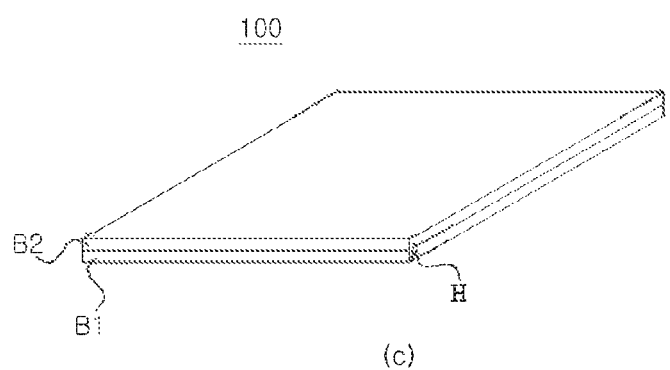
(c)

[Fig. 3]
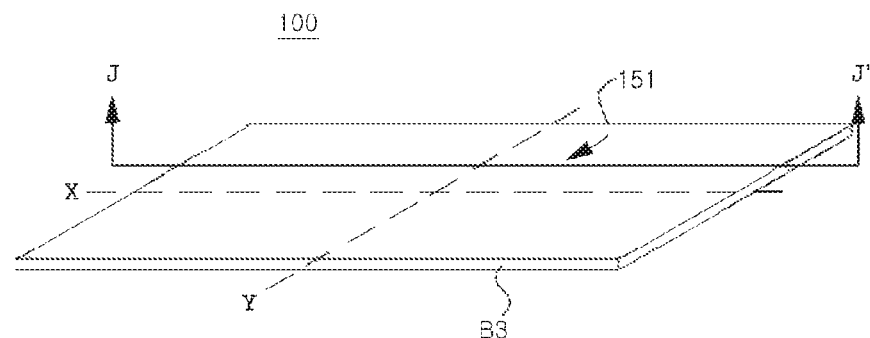
(a)
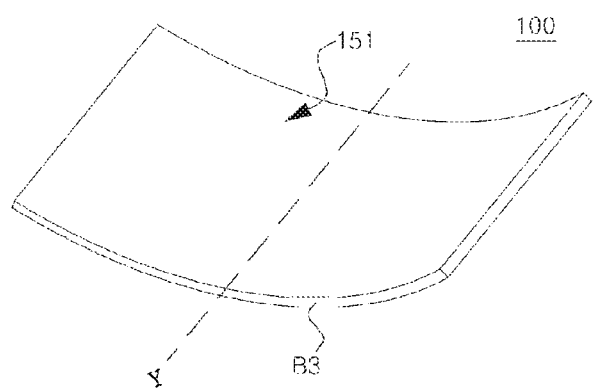
(b)
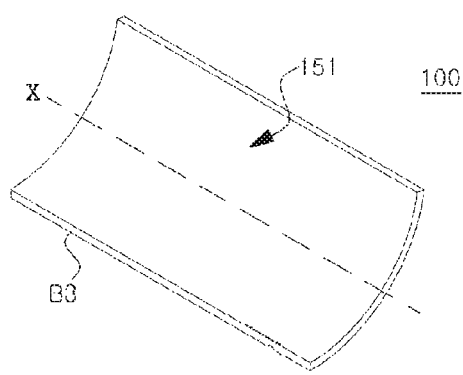
(b)

[Fig. 4]
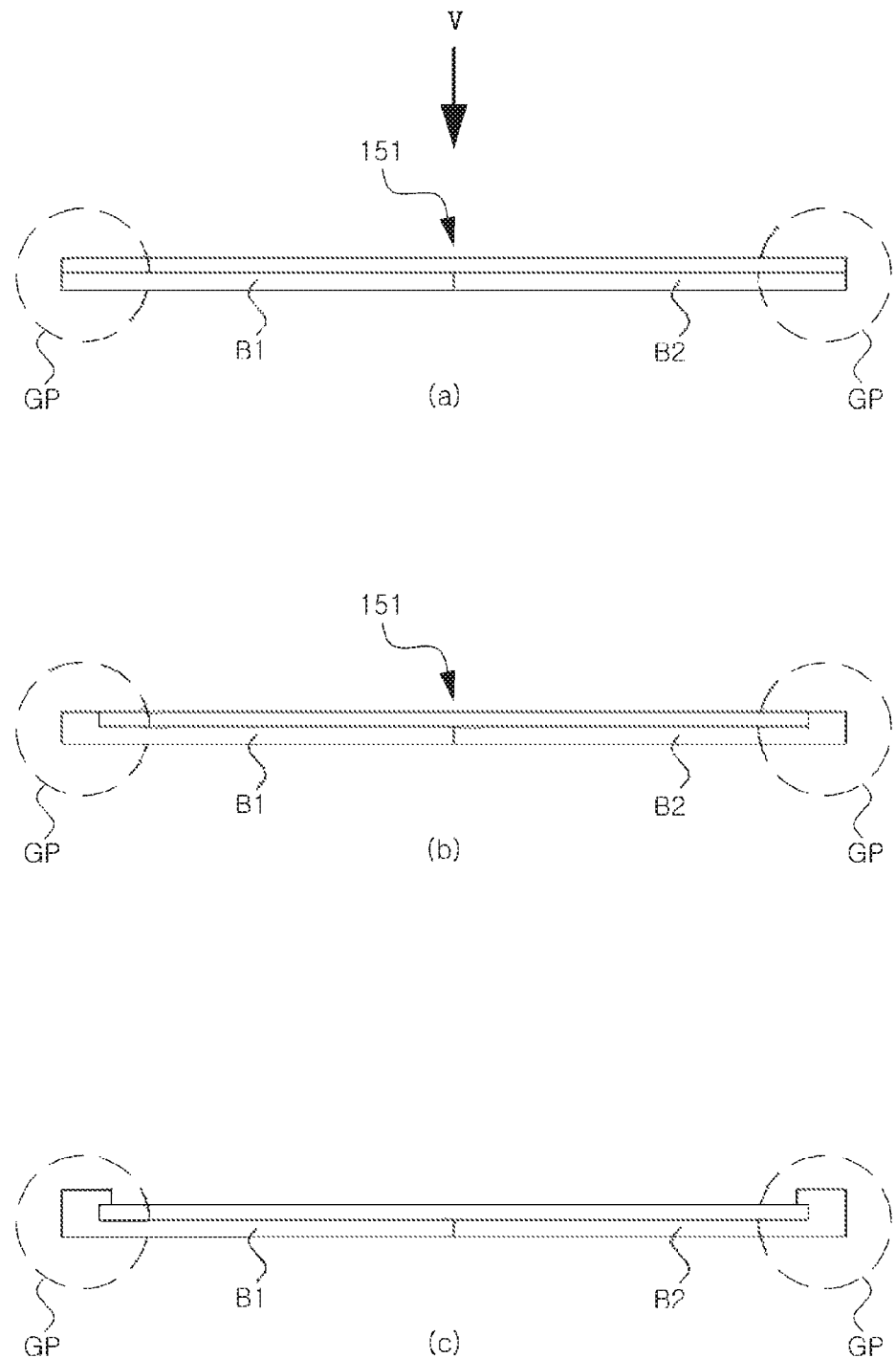

[Fig. 5]
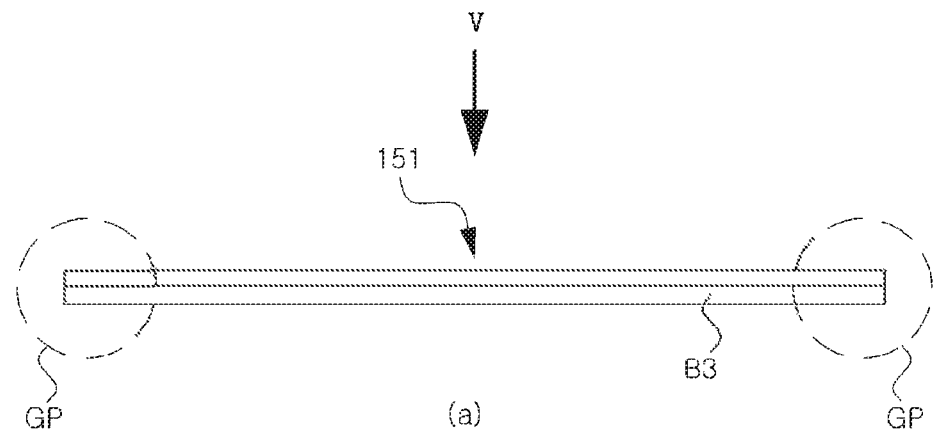
(a)
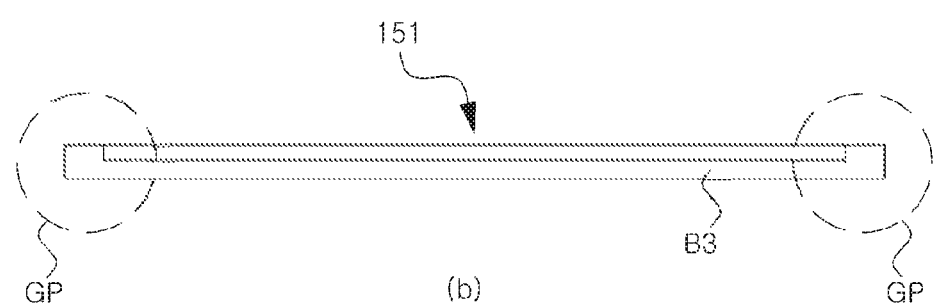
(b)
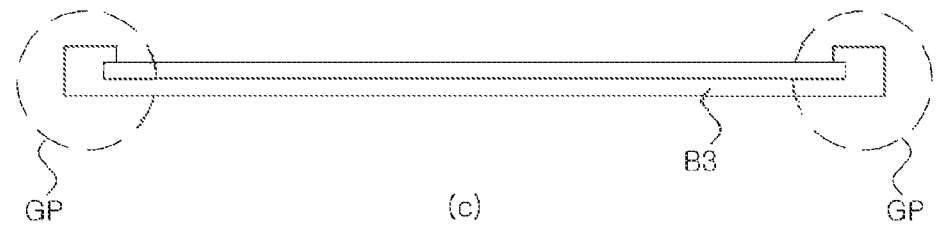
(c)

[Fig. 6]
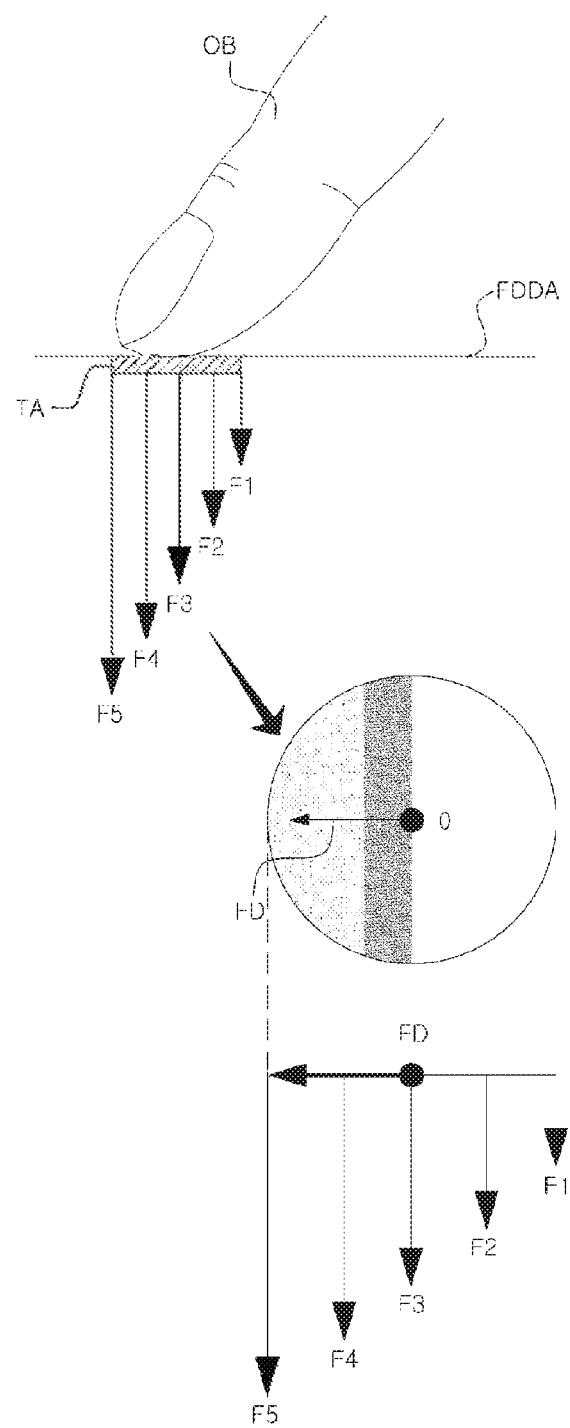

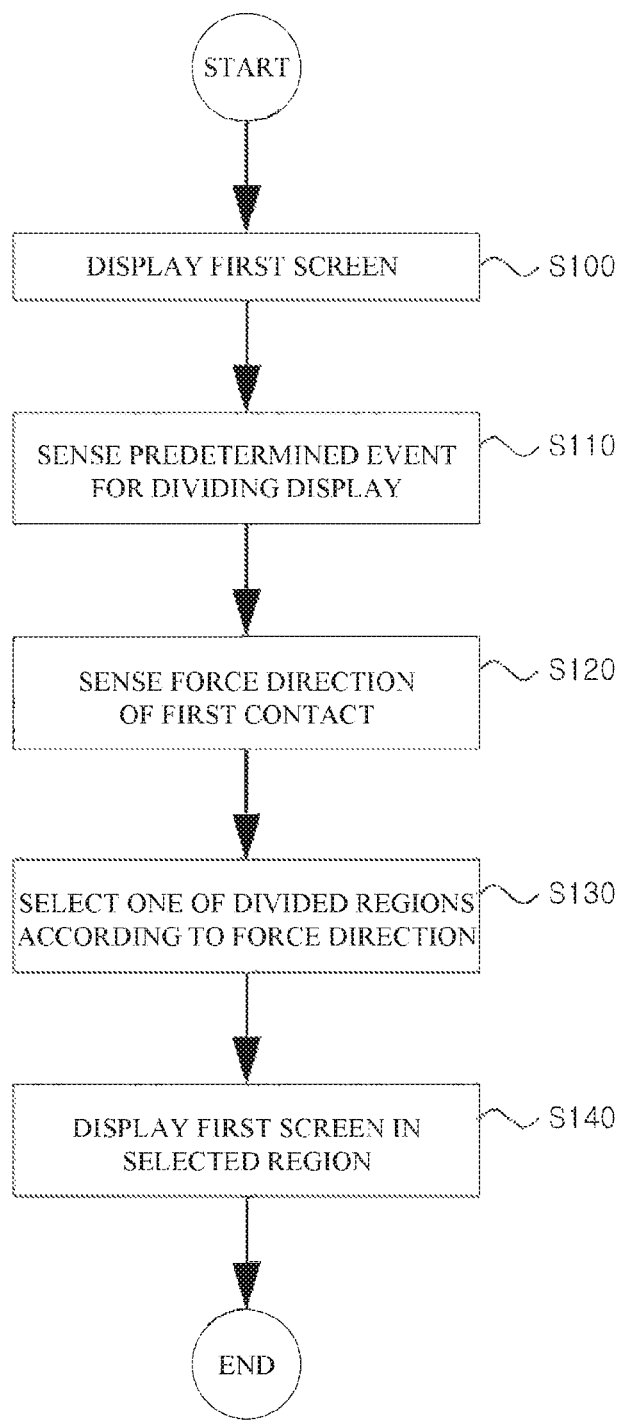
[Fig. 7]

[Fig. 8]
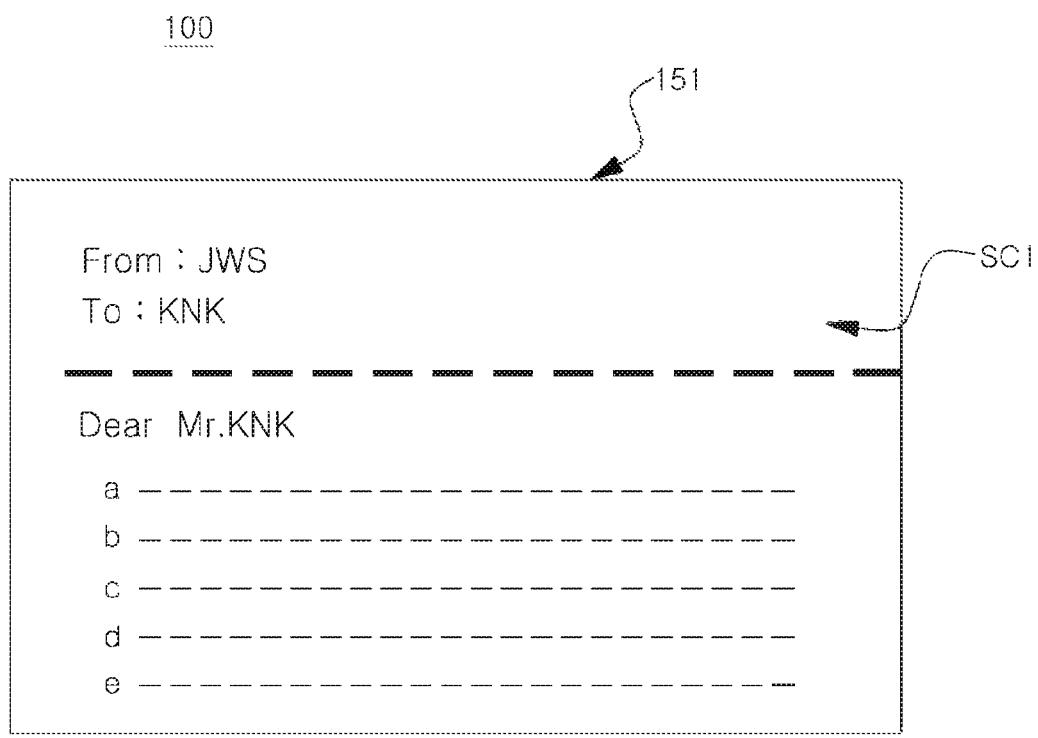

[Fig. 9]
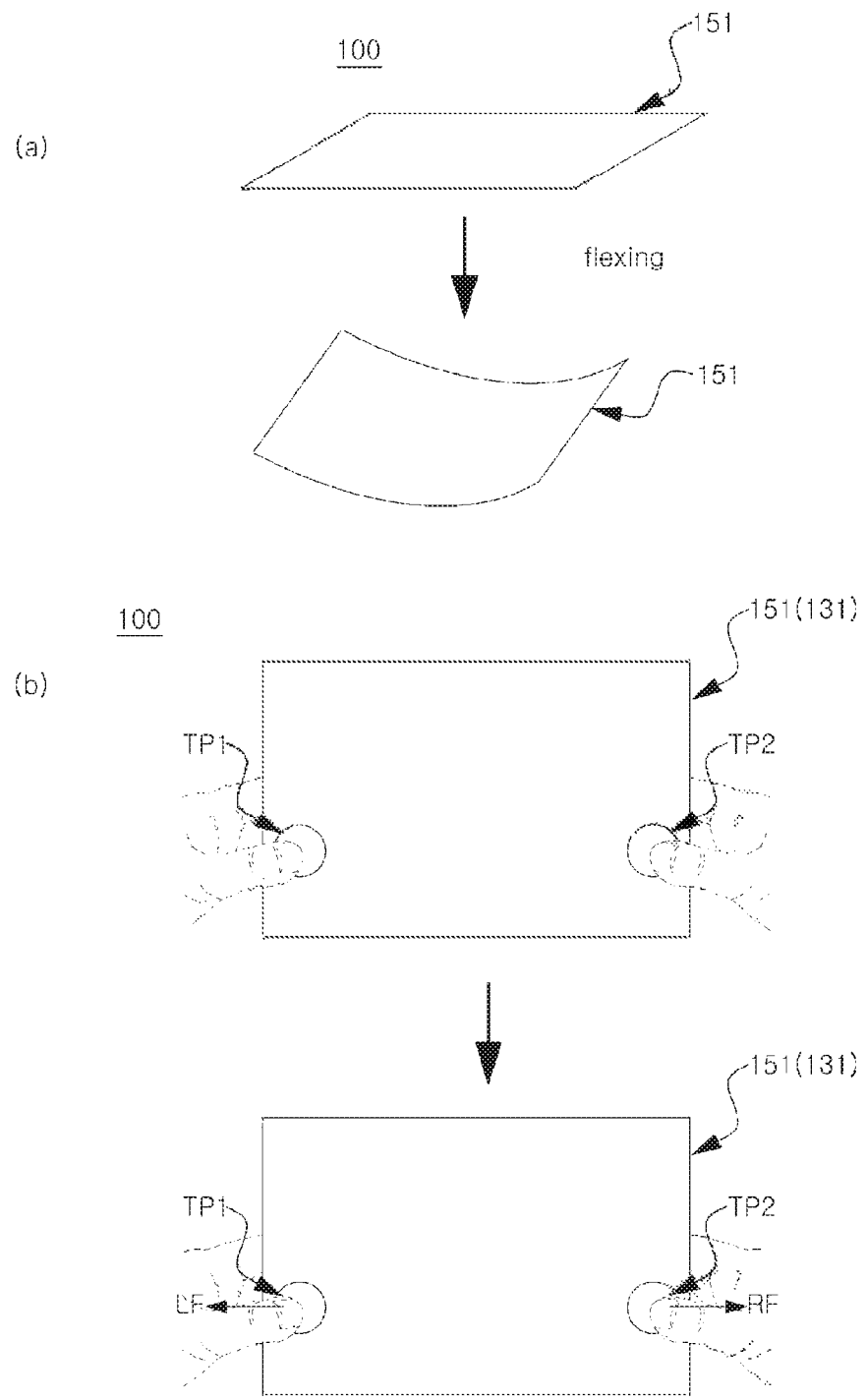

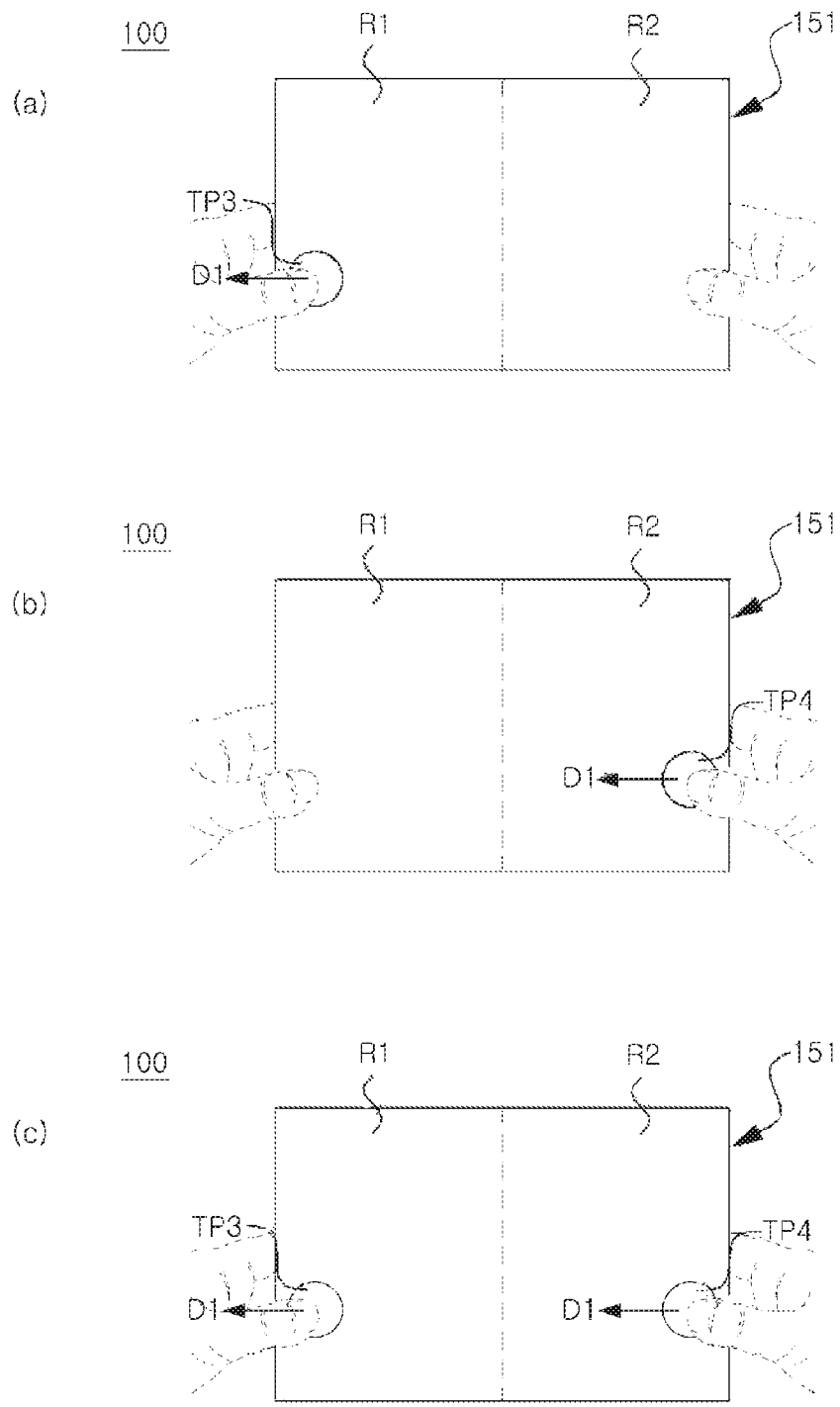
[Fig. 10]

[Fig. 11]
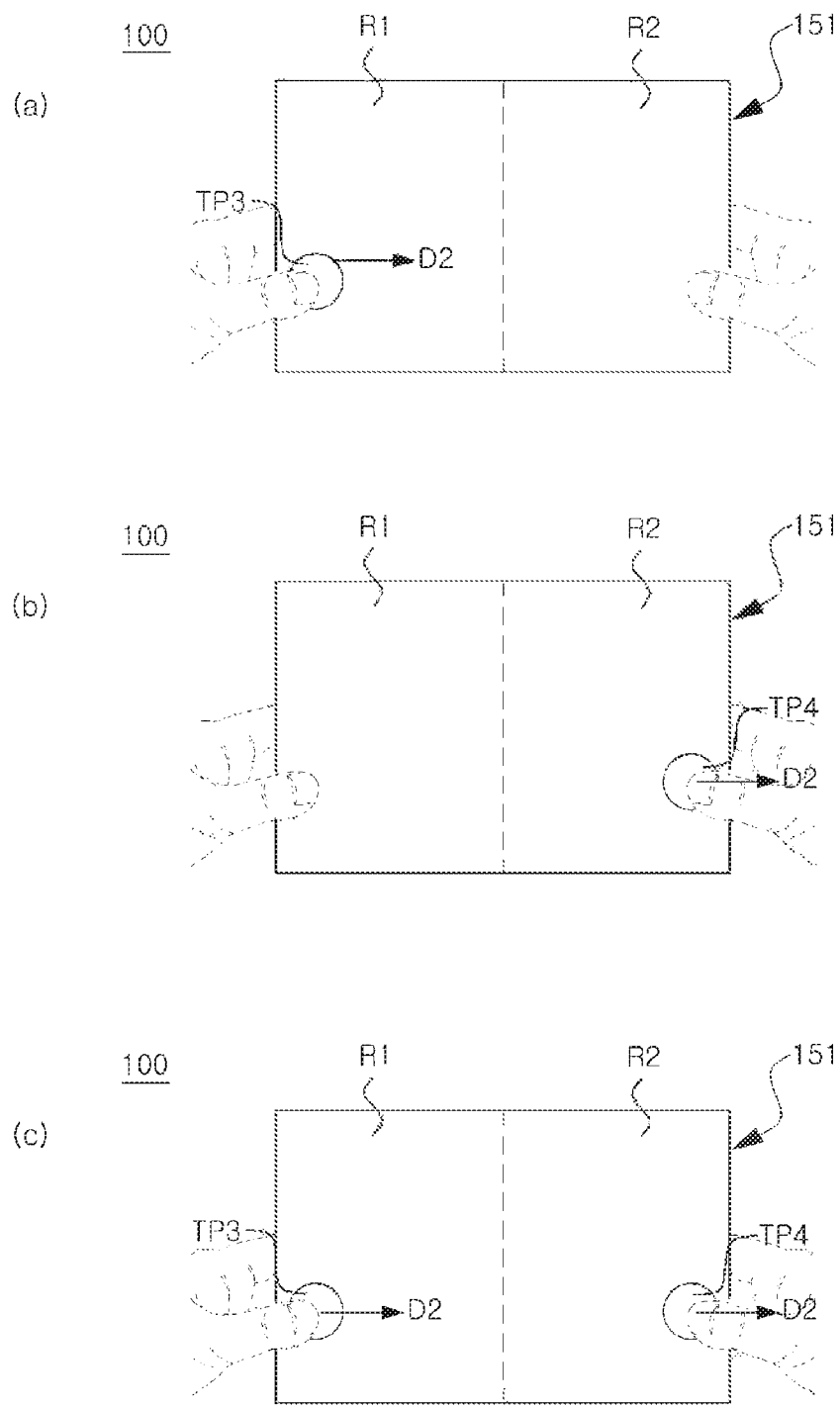

[Fig. 12]
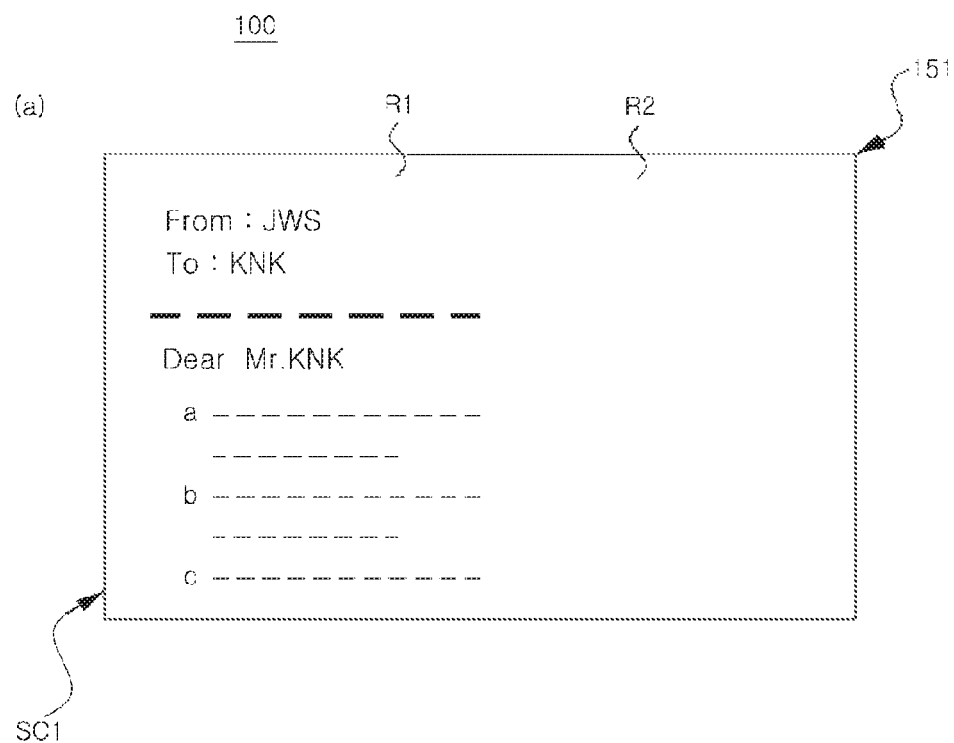
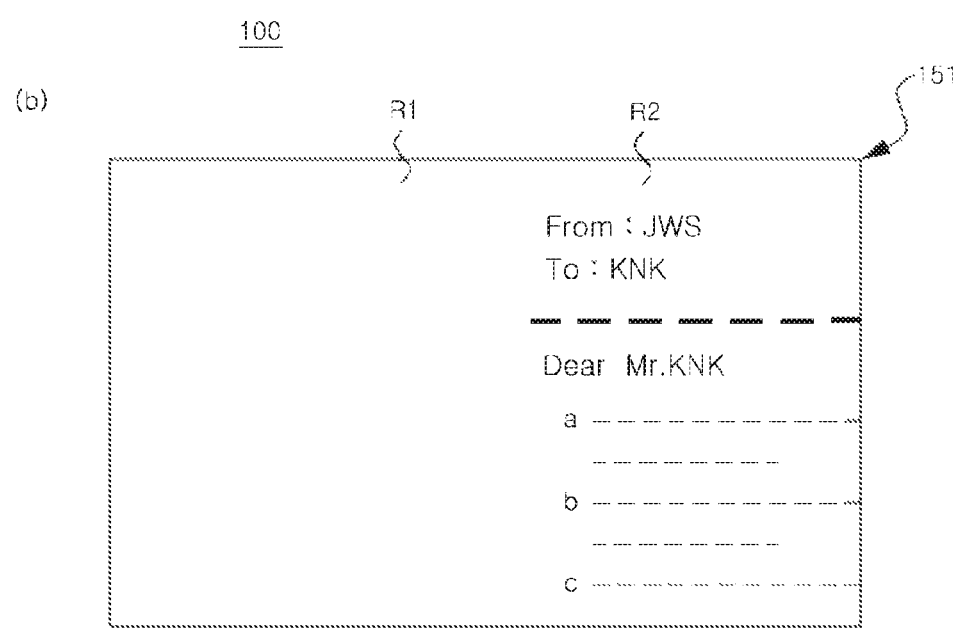

[Fig. 13]
(a)
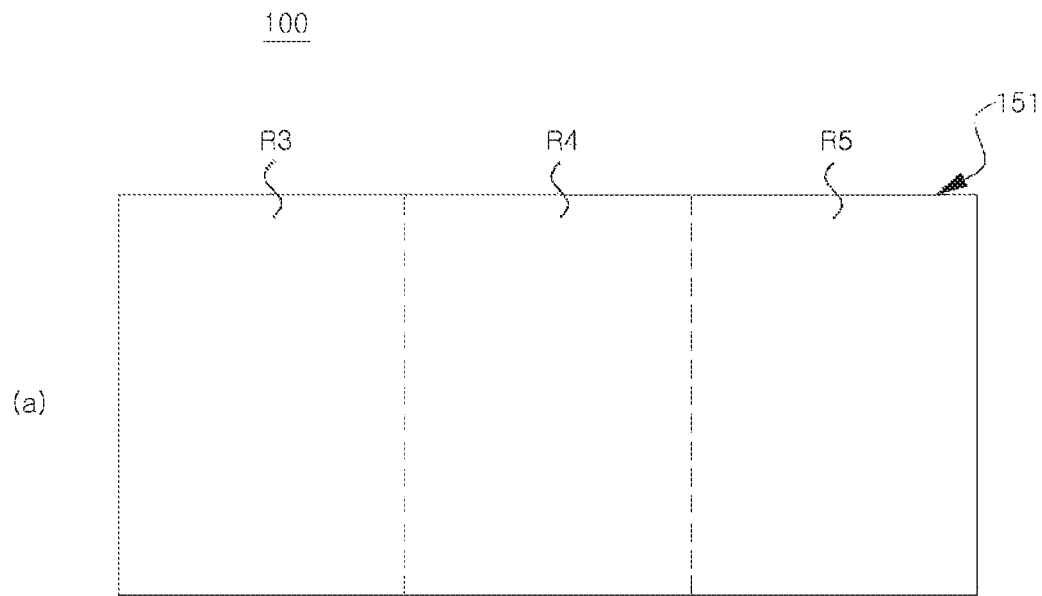
(b)
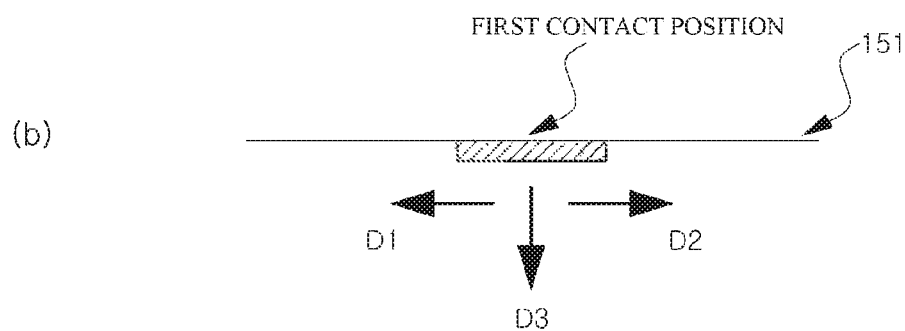

[Fig. 14]
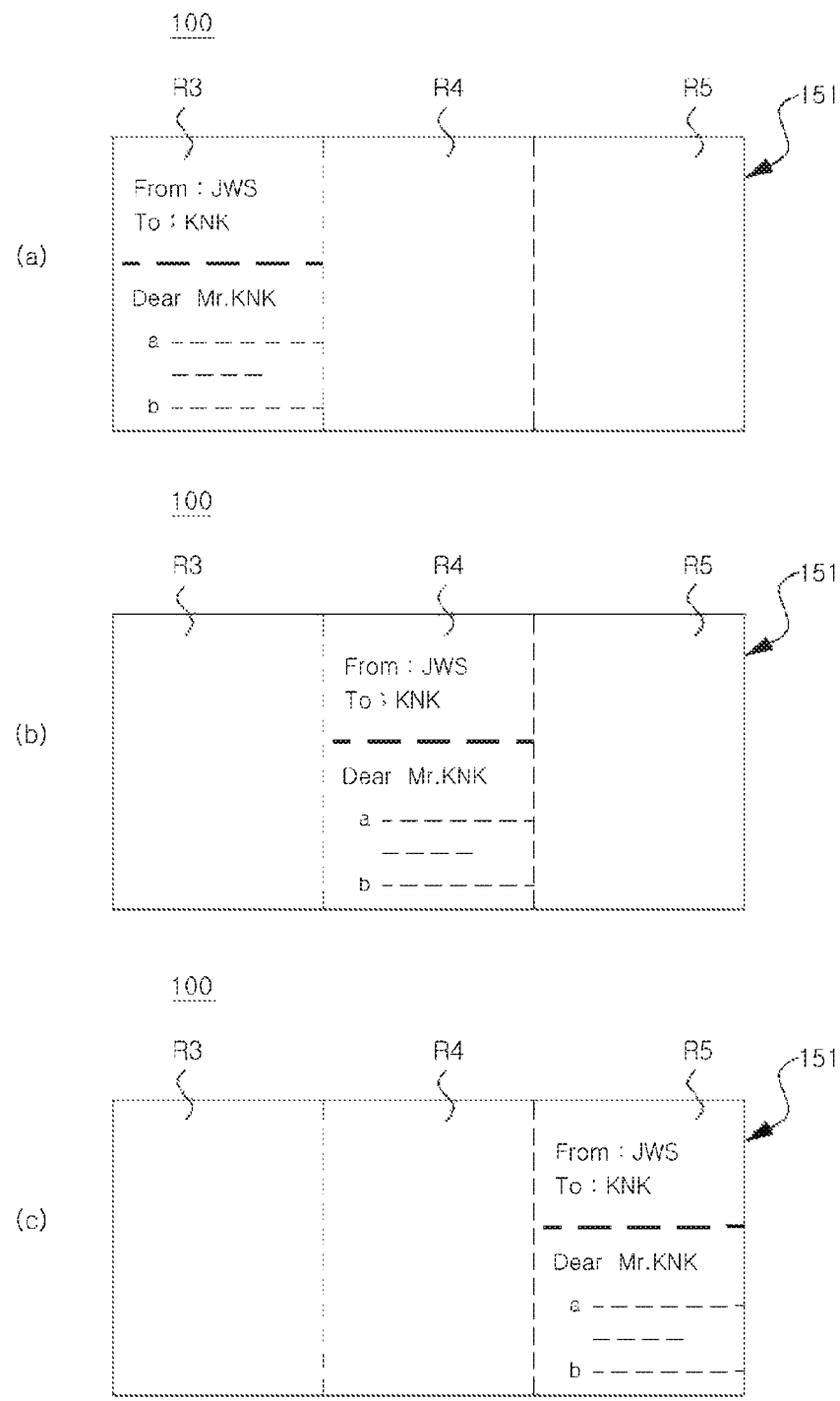

[Fig. 15]
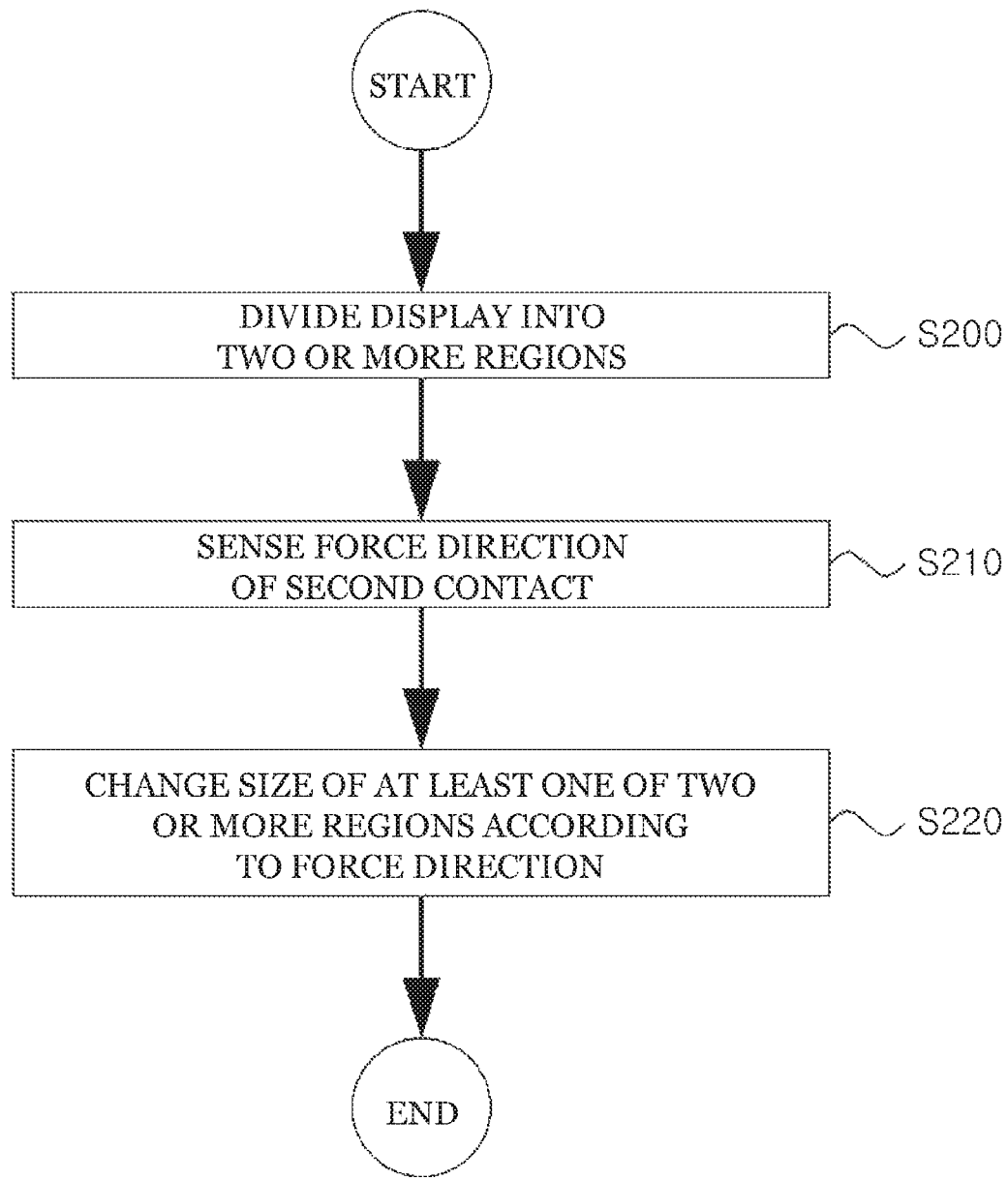

[Fig. 16]
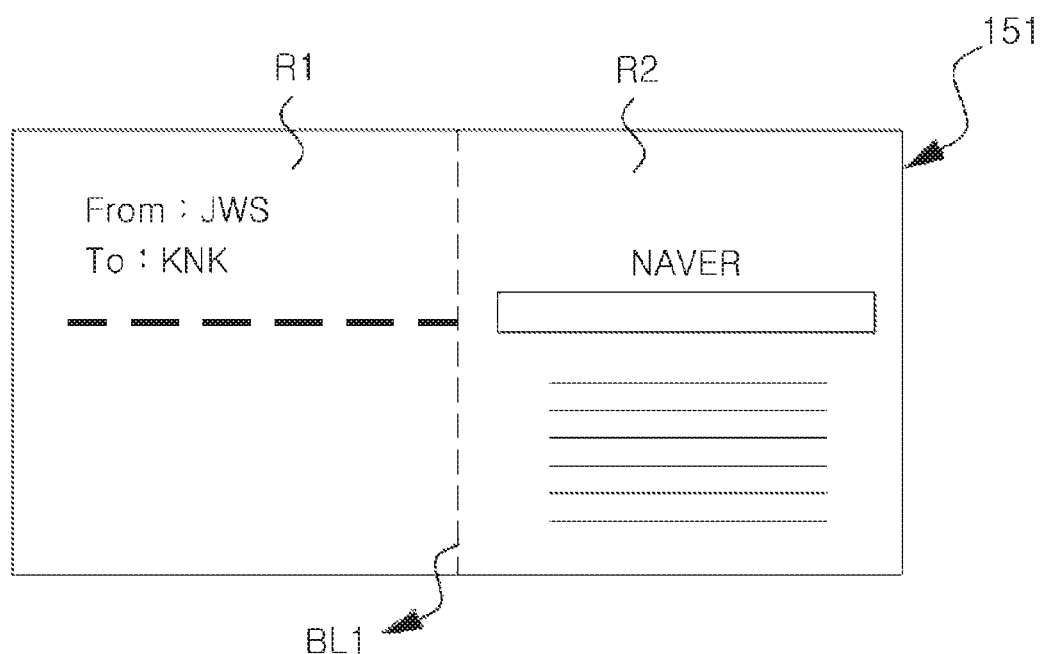

[Fig. 17]
(a)
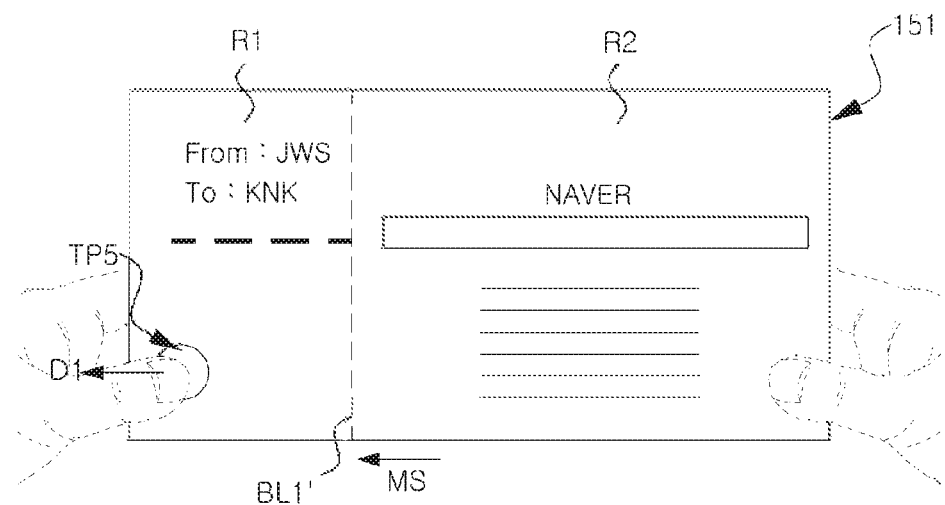
(b)
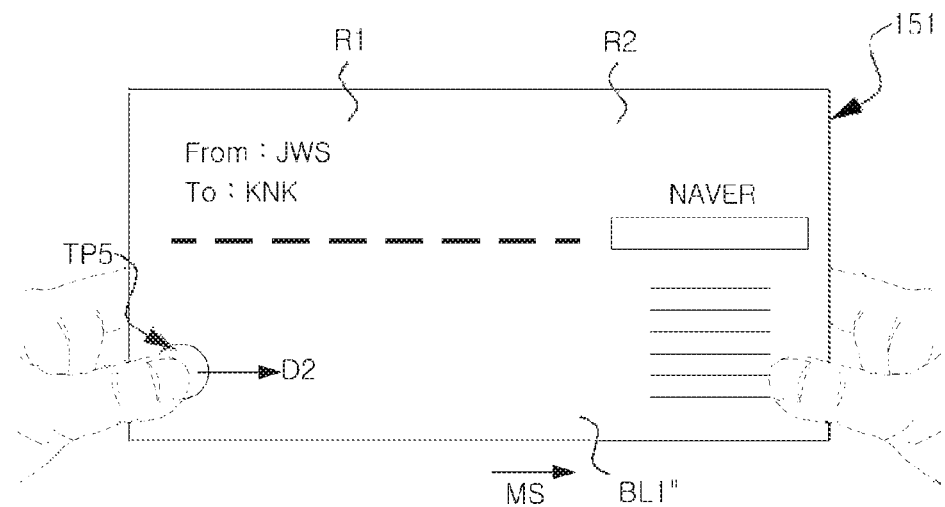

[Fig. 18]
(a)
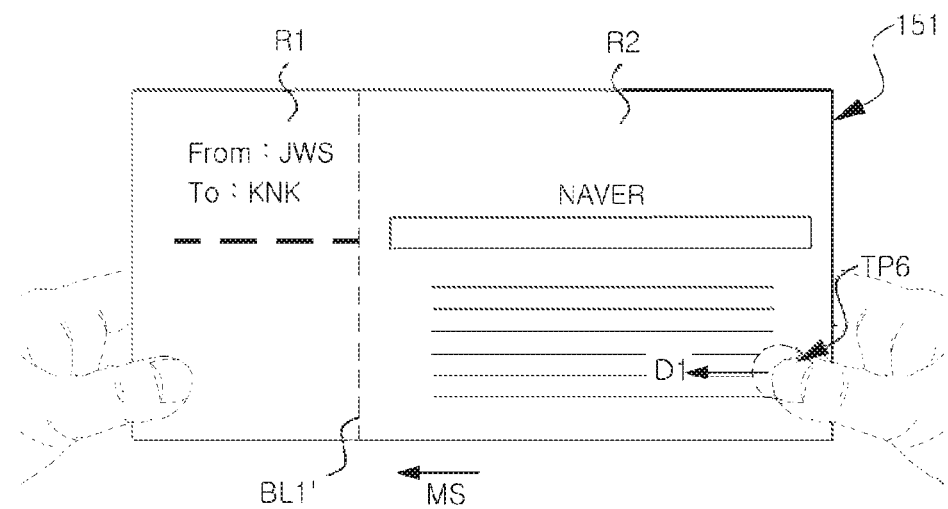
(b)
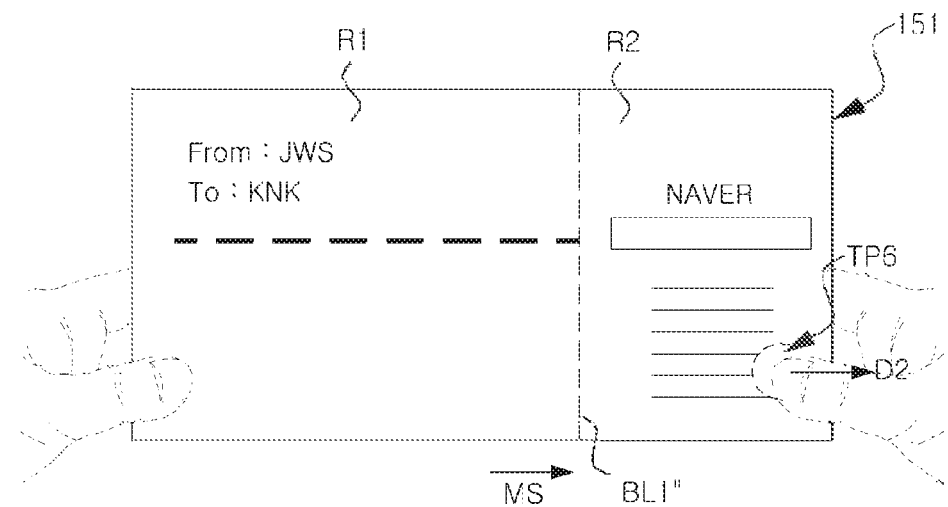

[Fig. 19]
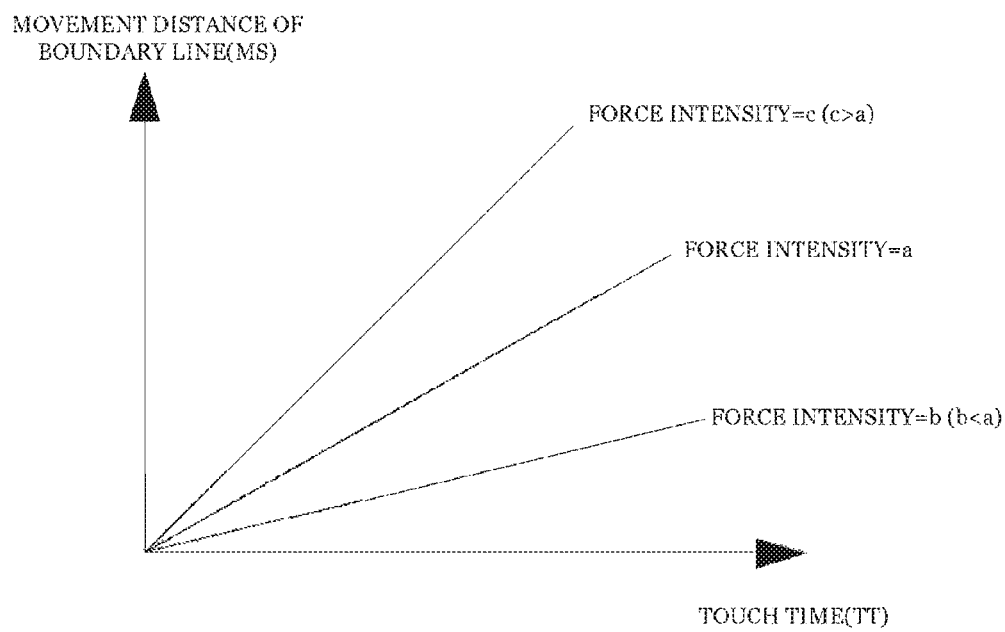
[Fig. 20]
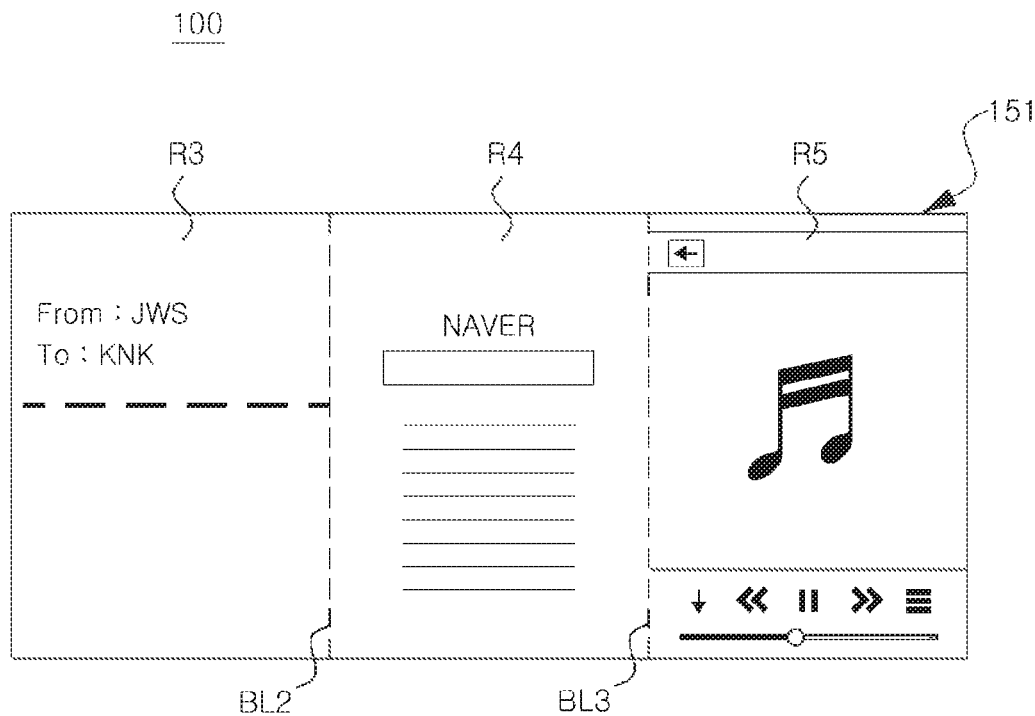

[Fig. 21]
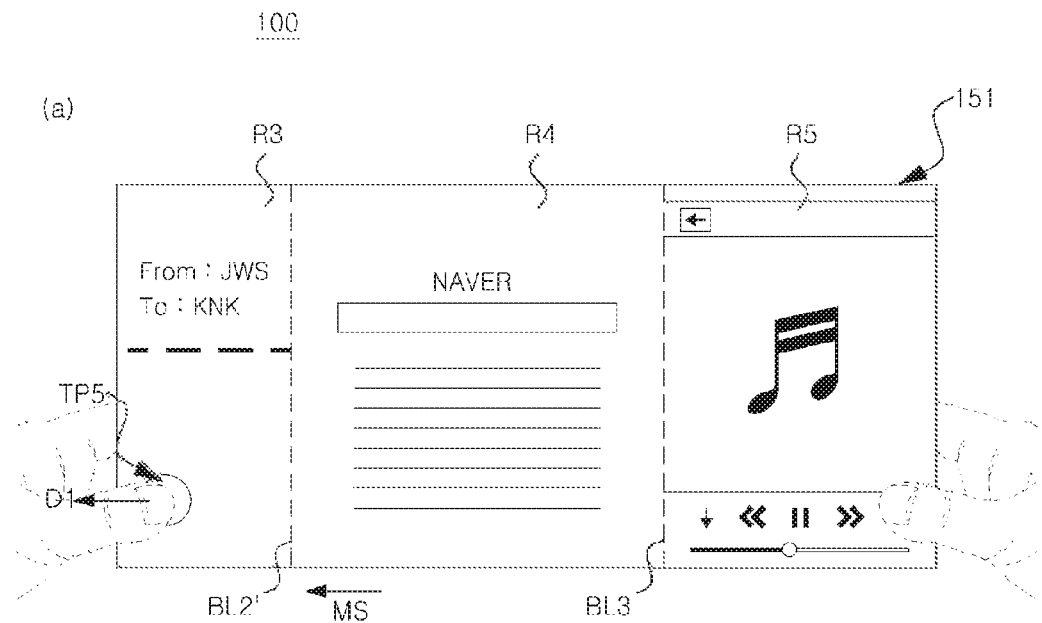
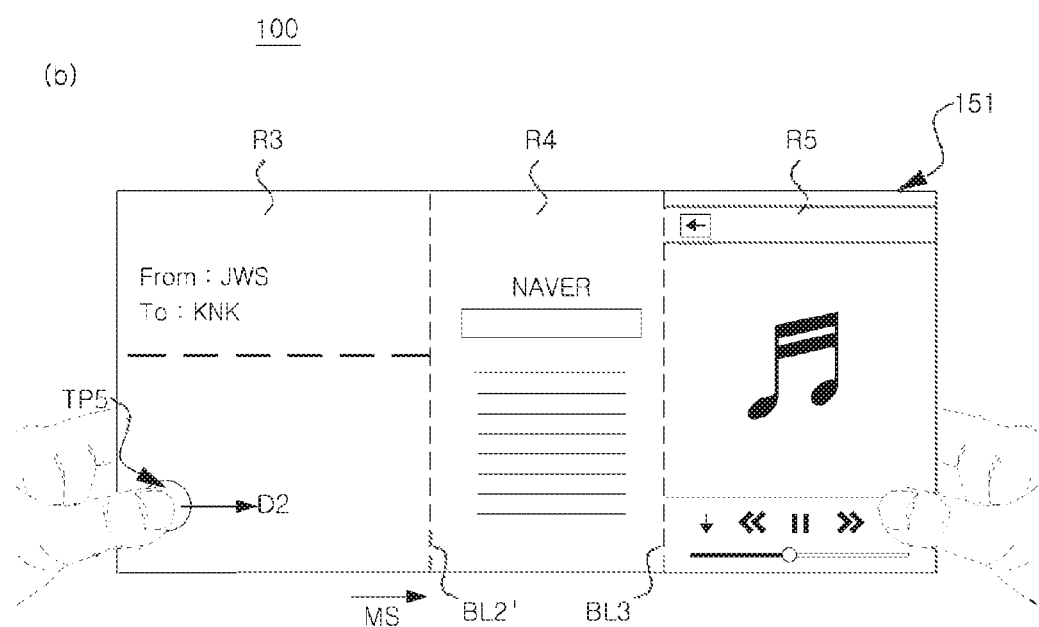

[Fig. 22]
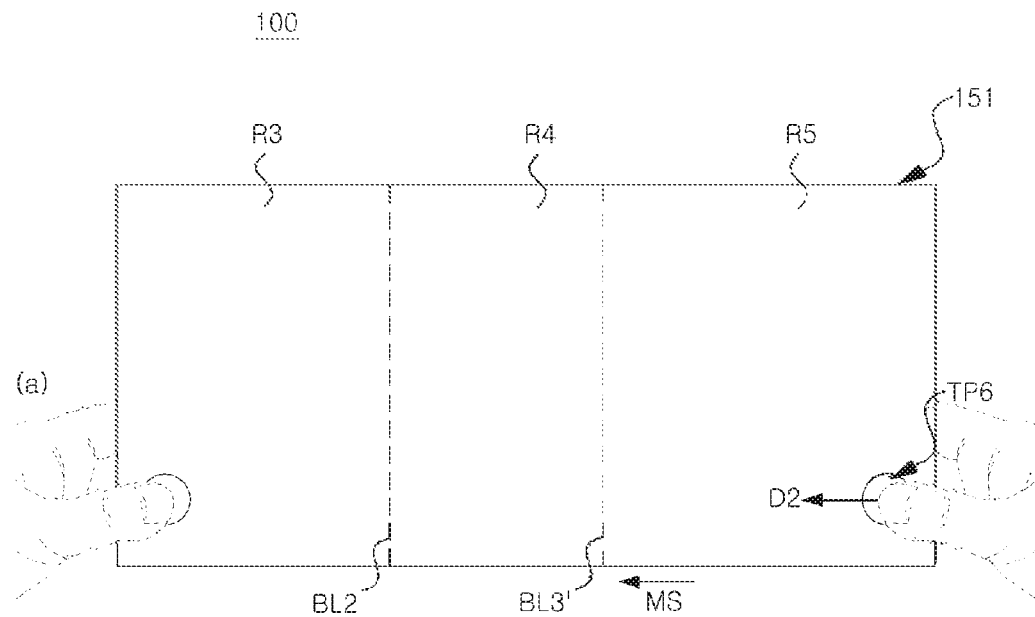
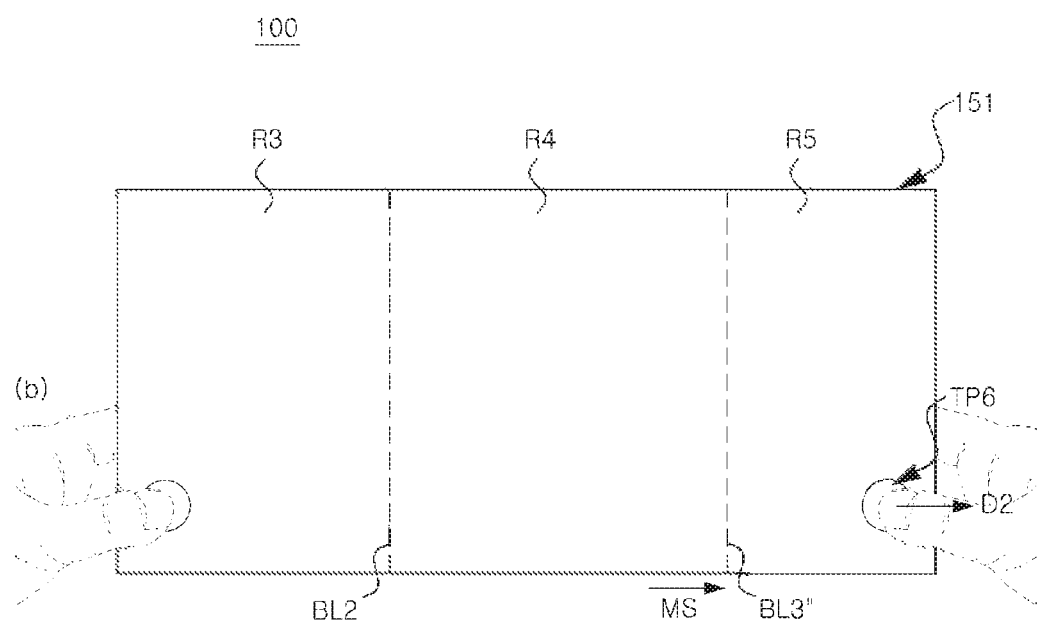

[Fig. 23]
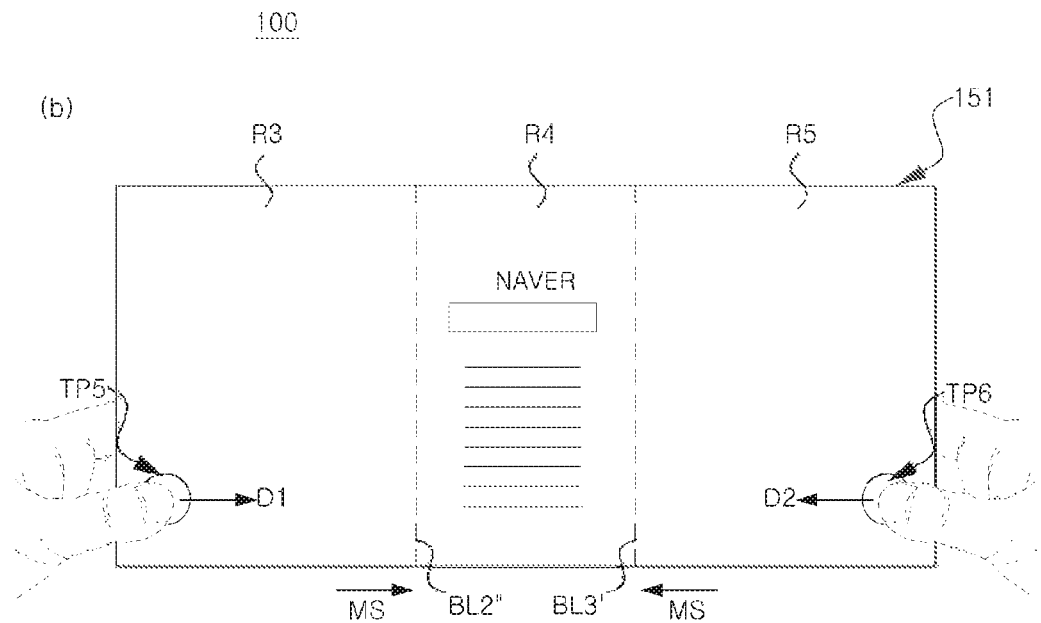
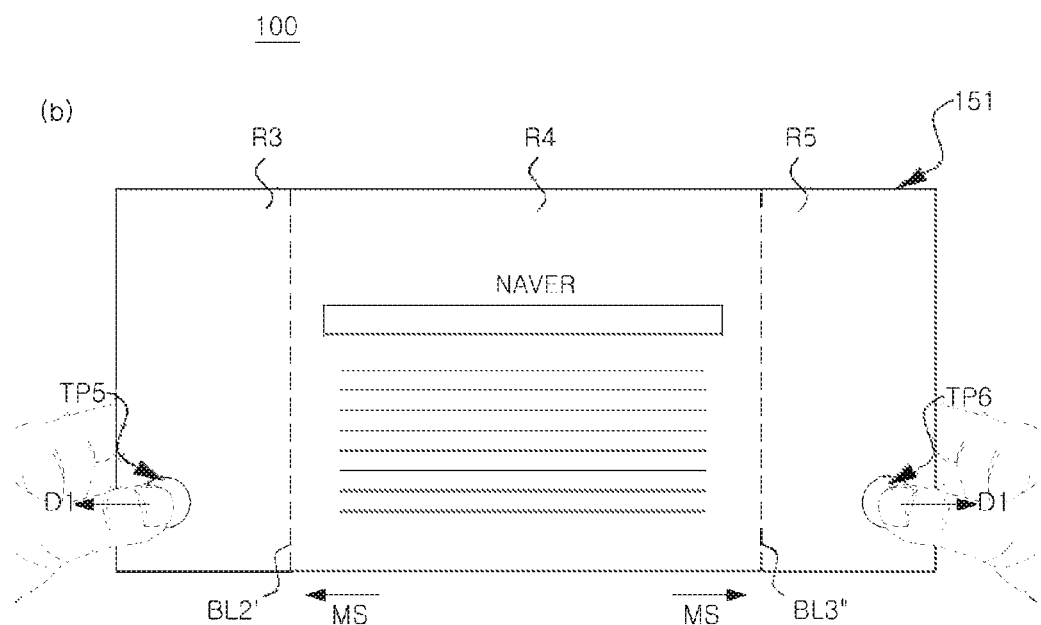

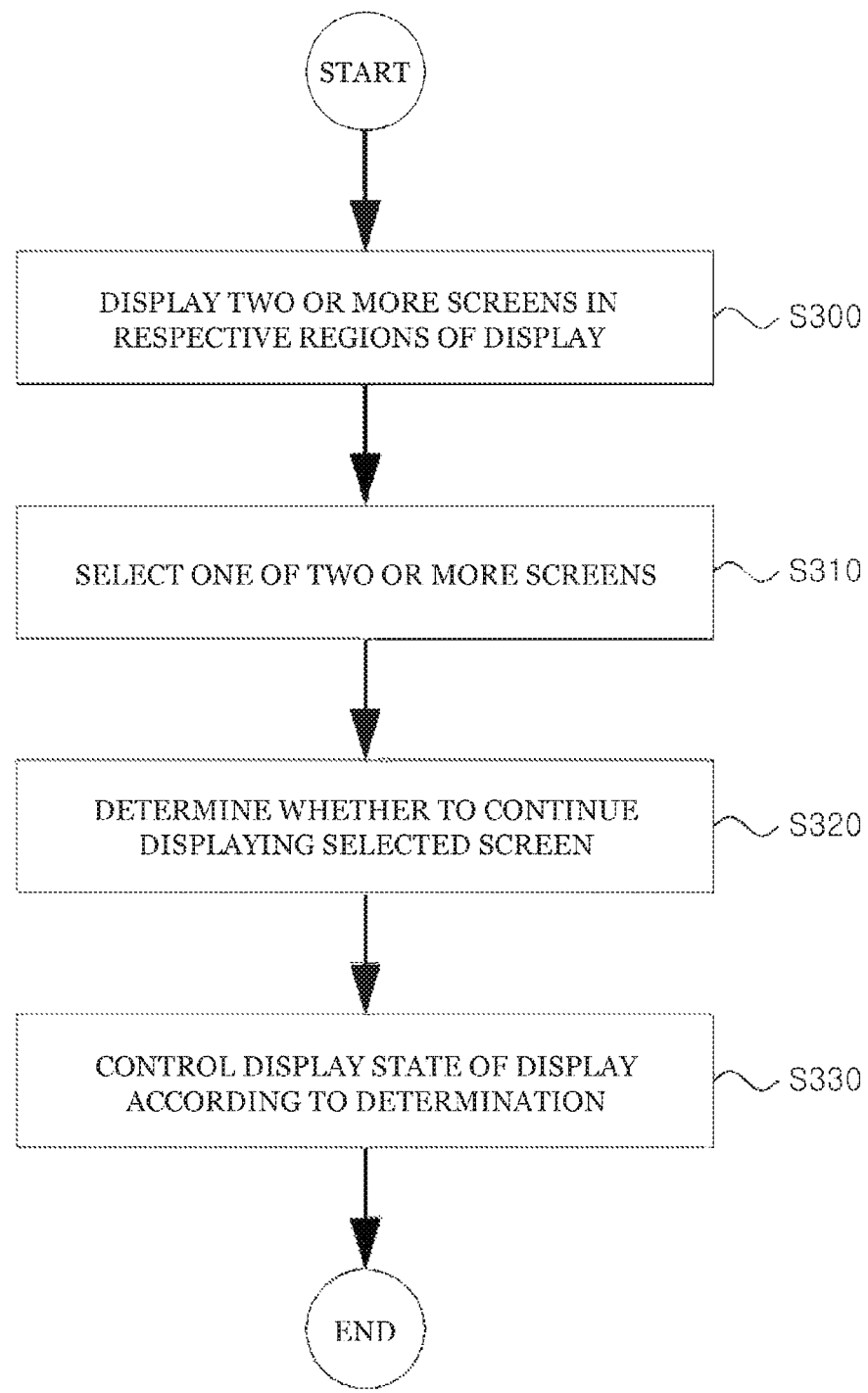
[Fig. 24]

[Fig. 25]
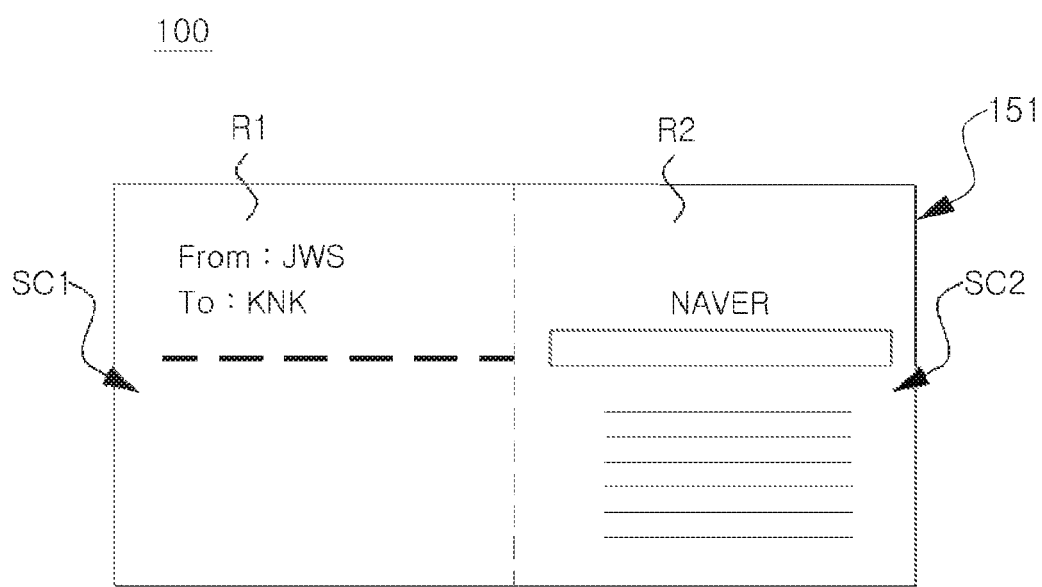

[Fig. 26]
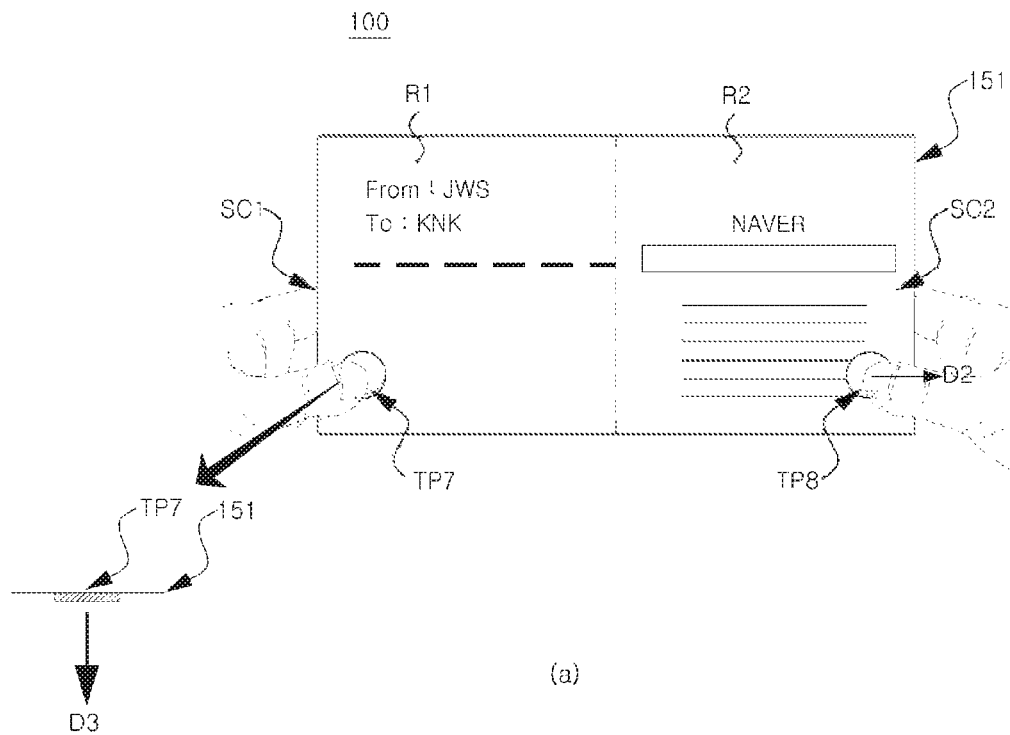
(a)
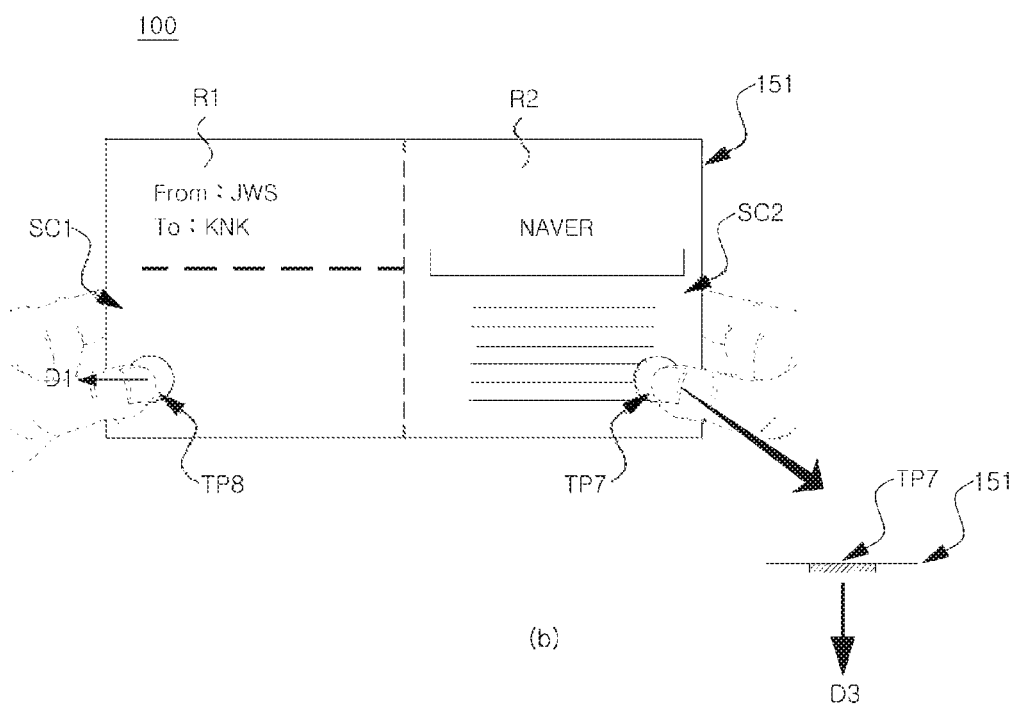
(b)

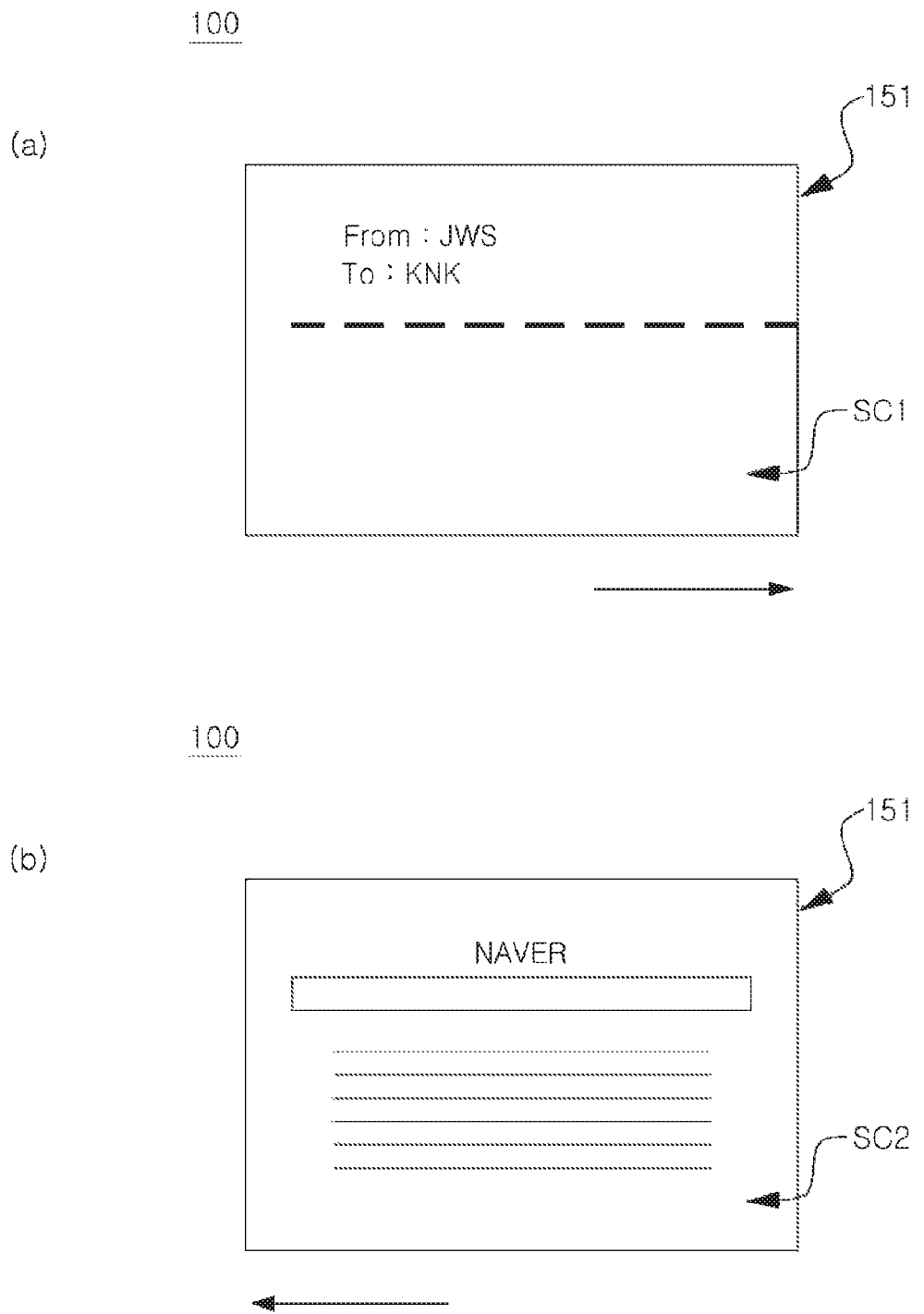
[Fig. 27]

[Fig. 28]
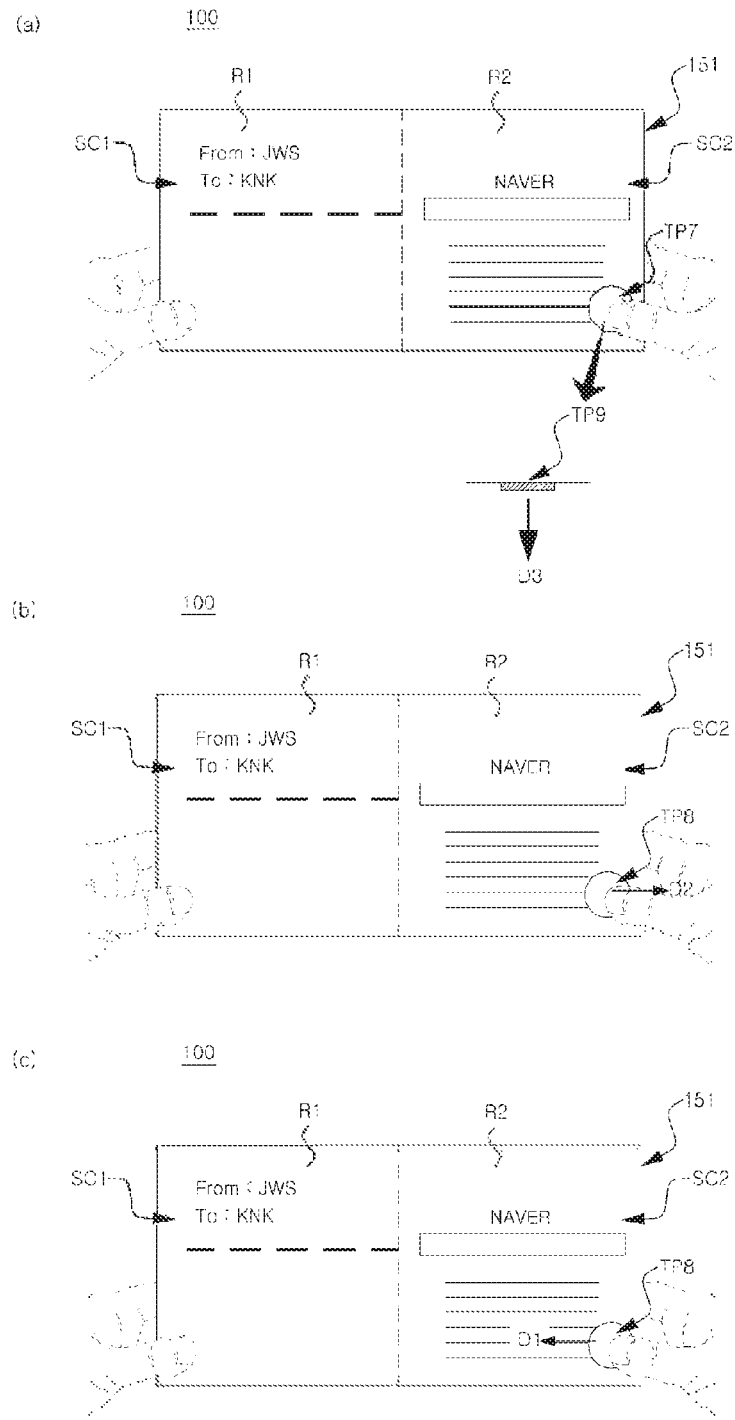

[Fig. 29]
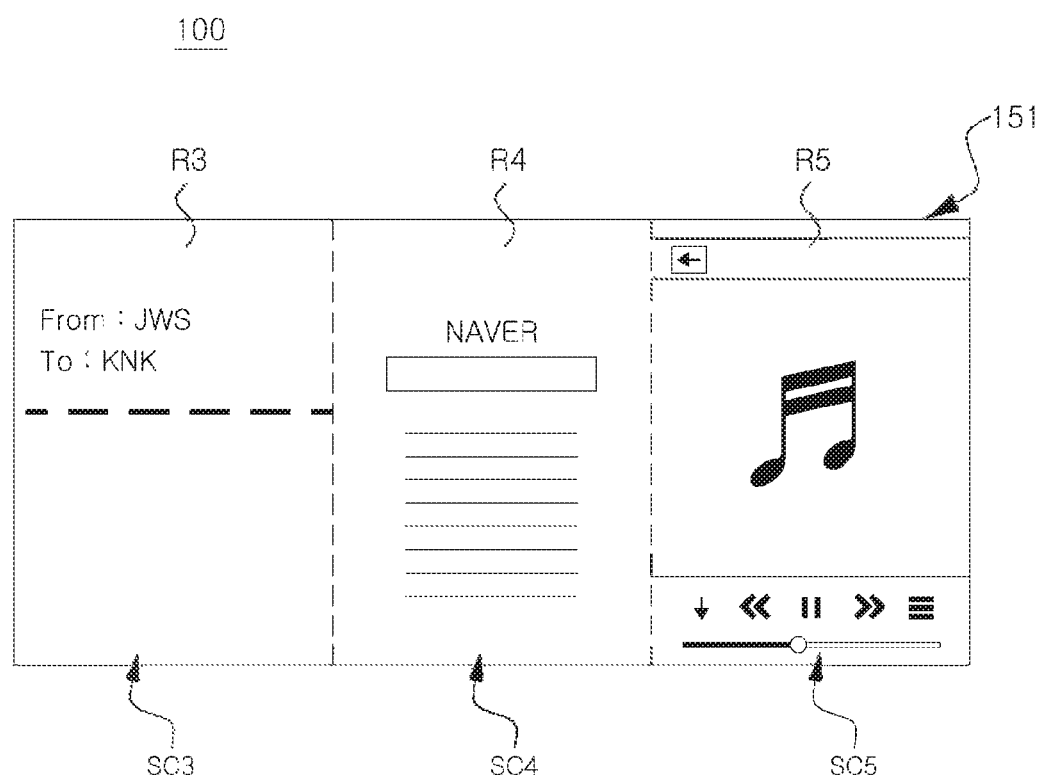

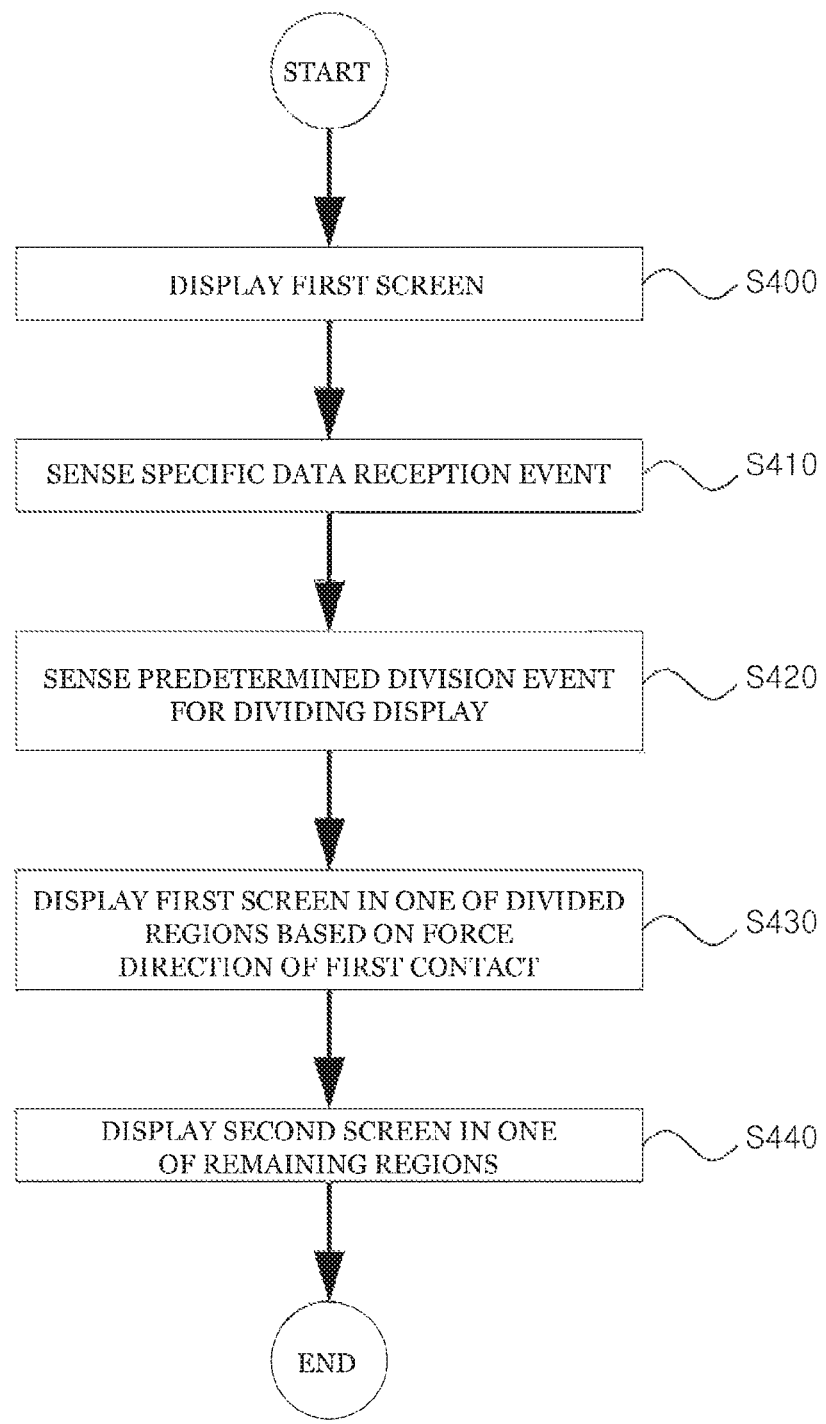
[Fig. 30]

[Fig. 31]
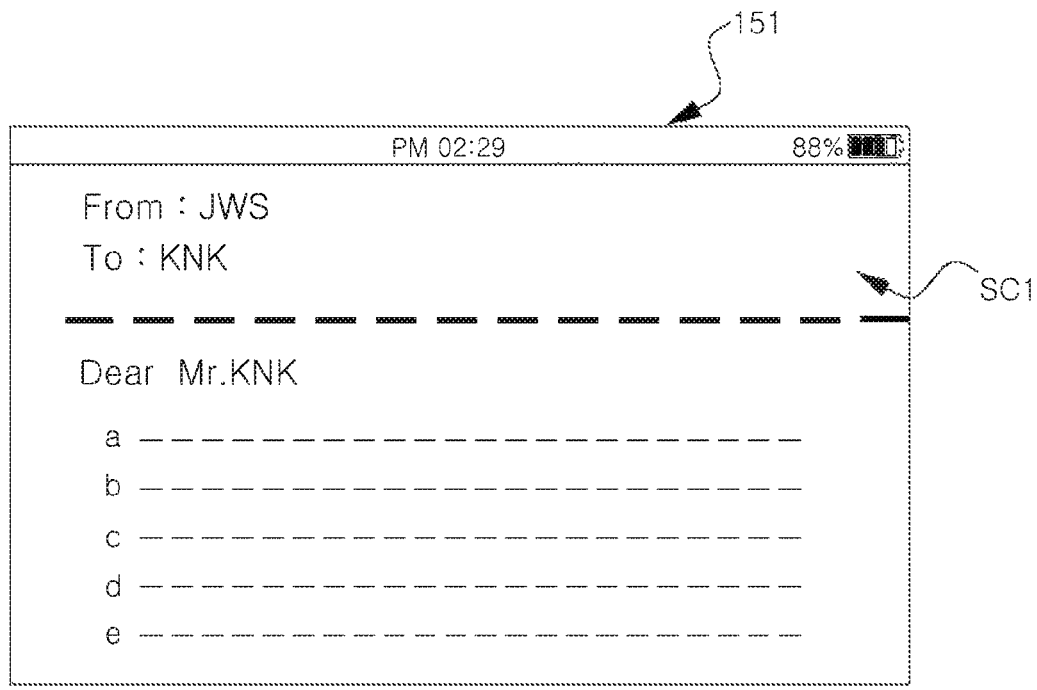
[Fig. 32]
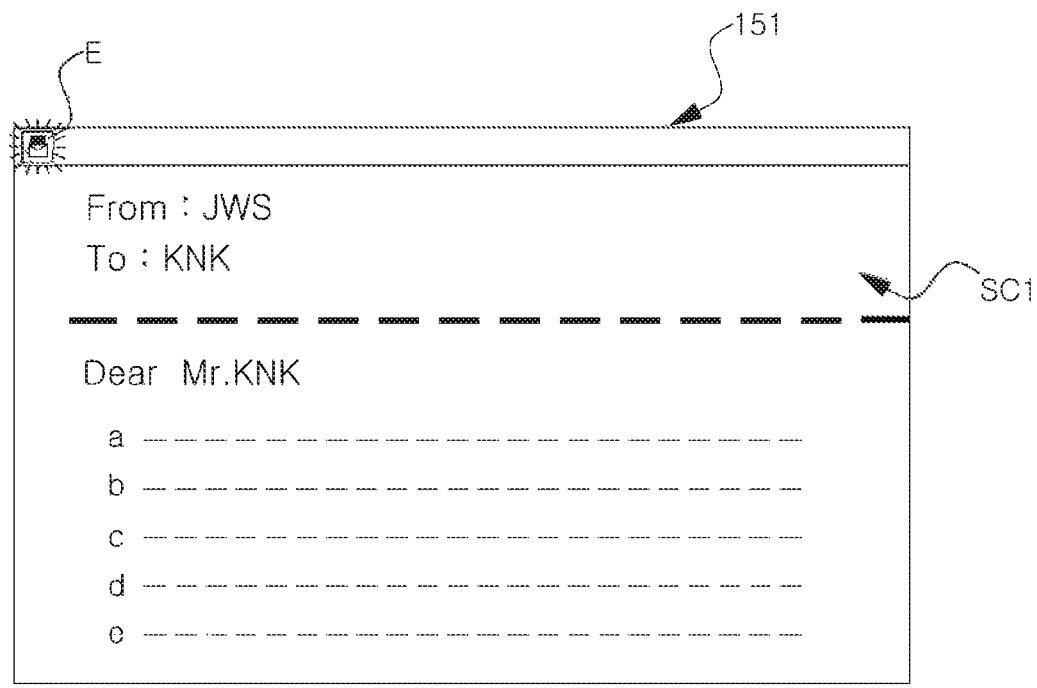

[Fig. 33]
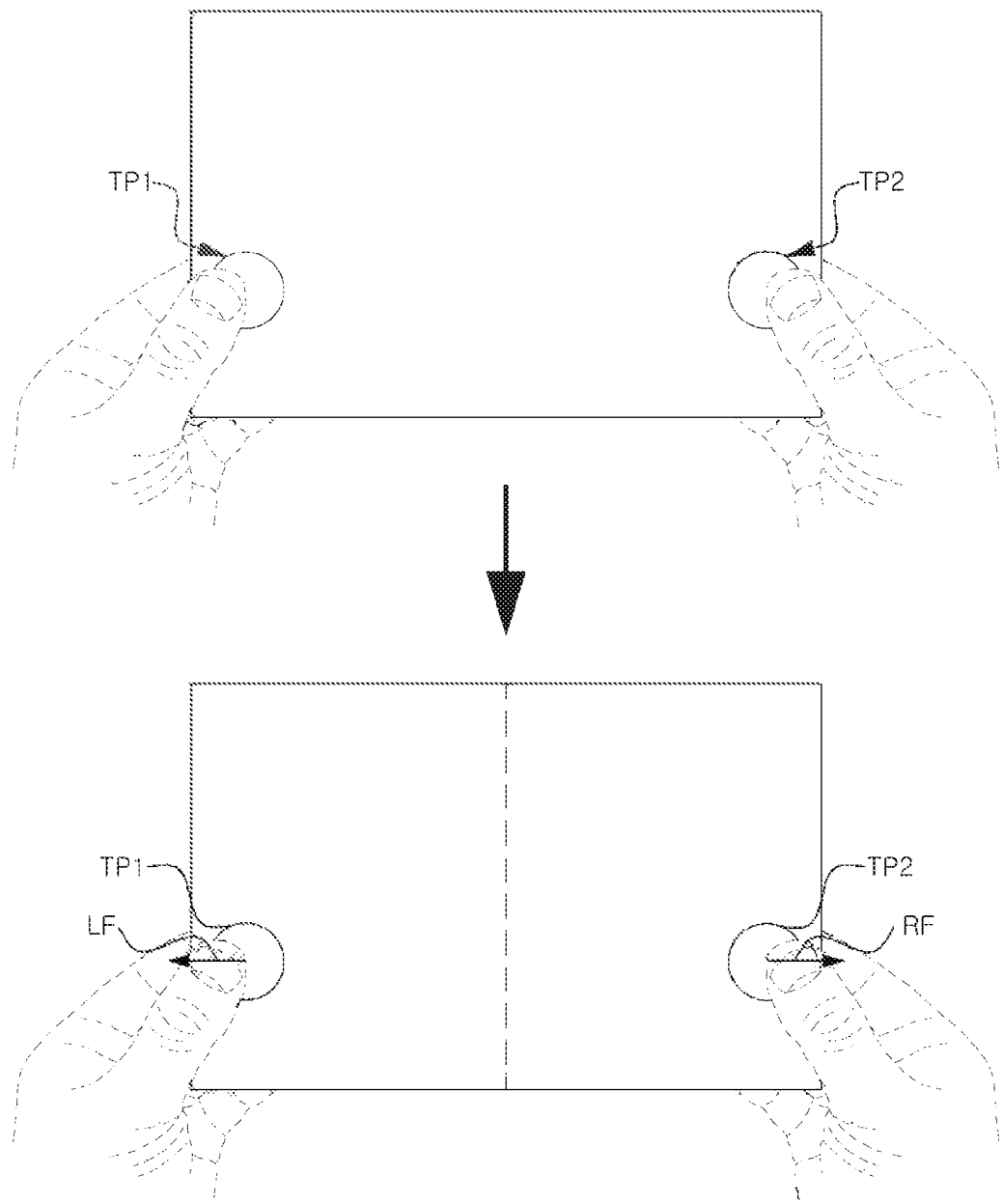

[Fig. 34]
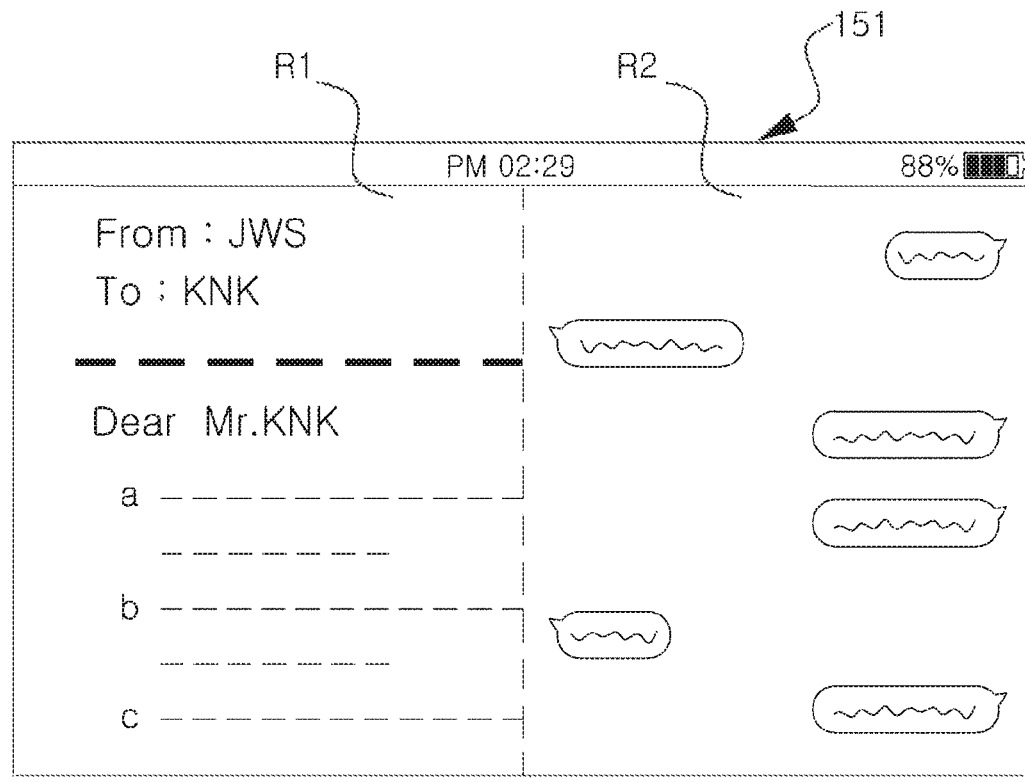
[Fig. 35]
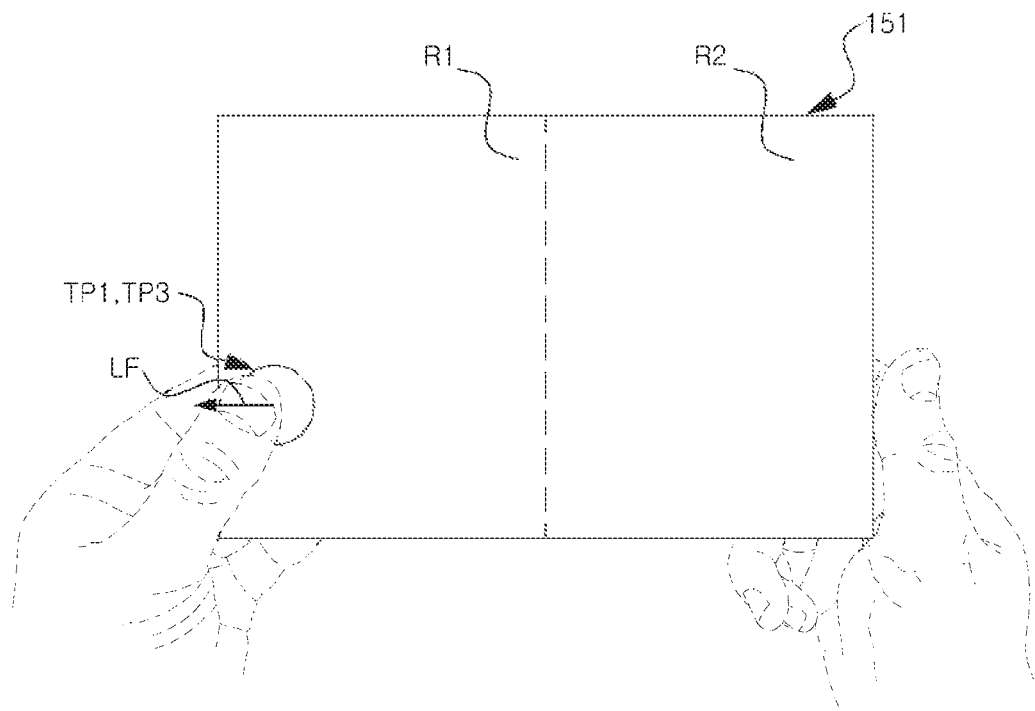

[Fig. 36]
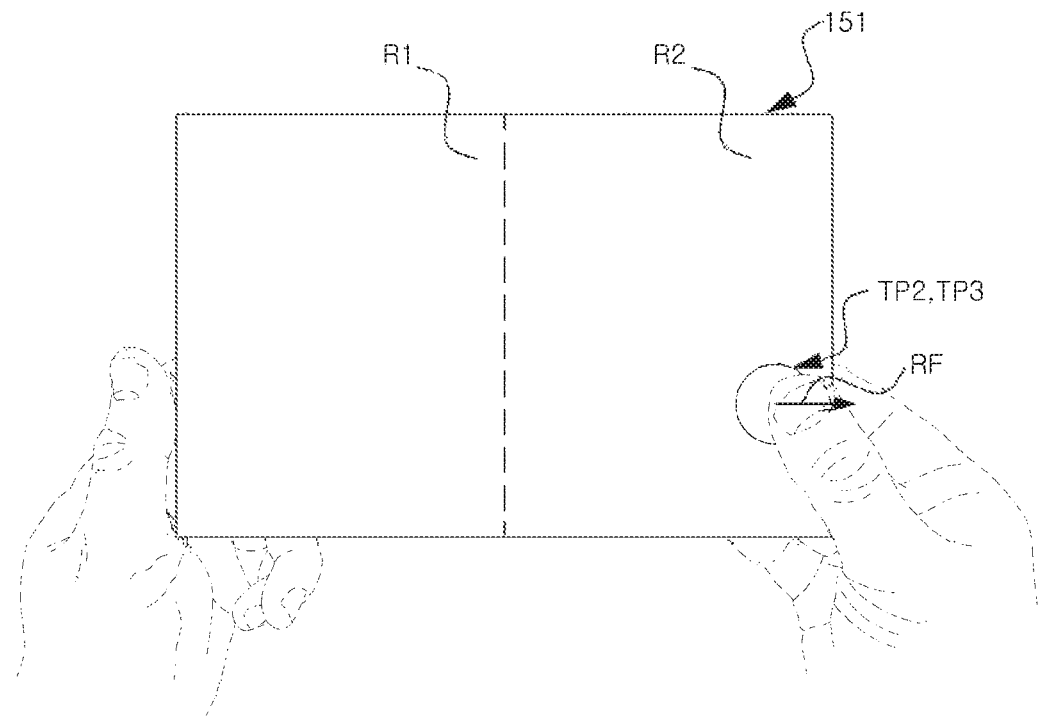
[Fig. 37]
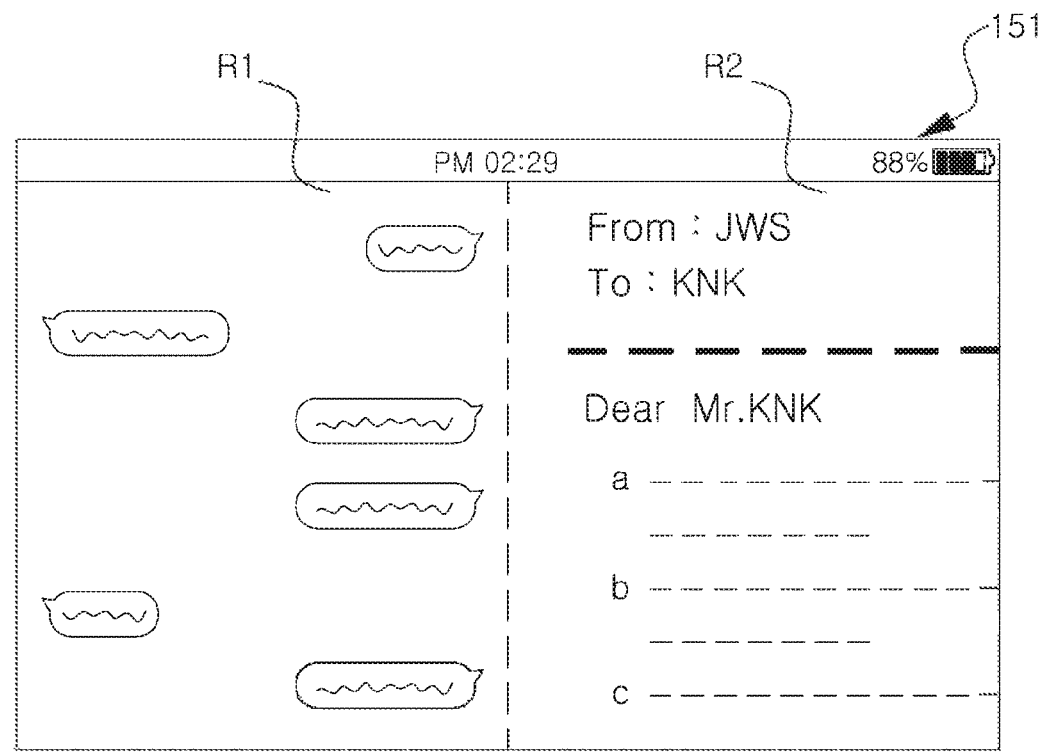

[Fig. 38]
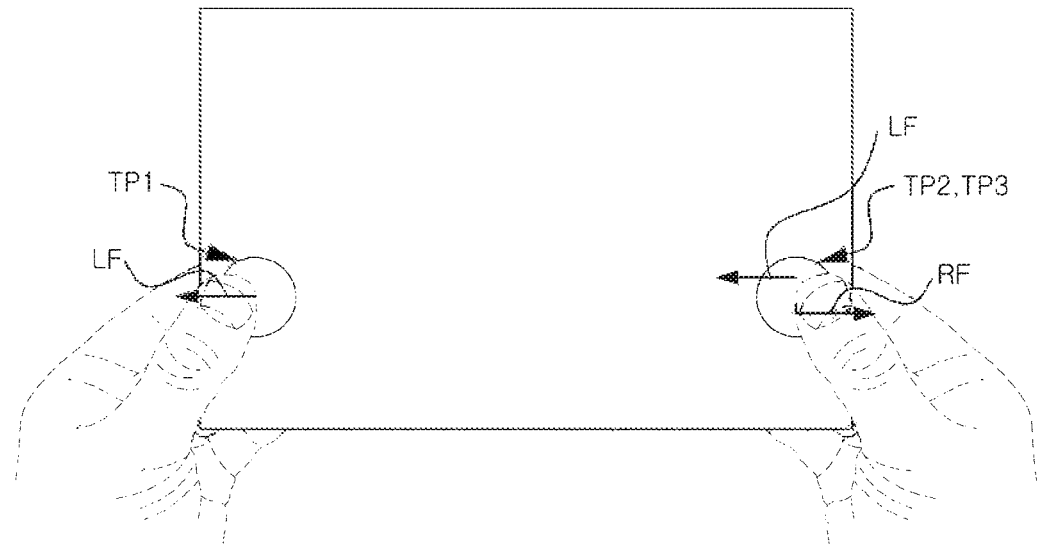
[Fig. 39]
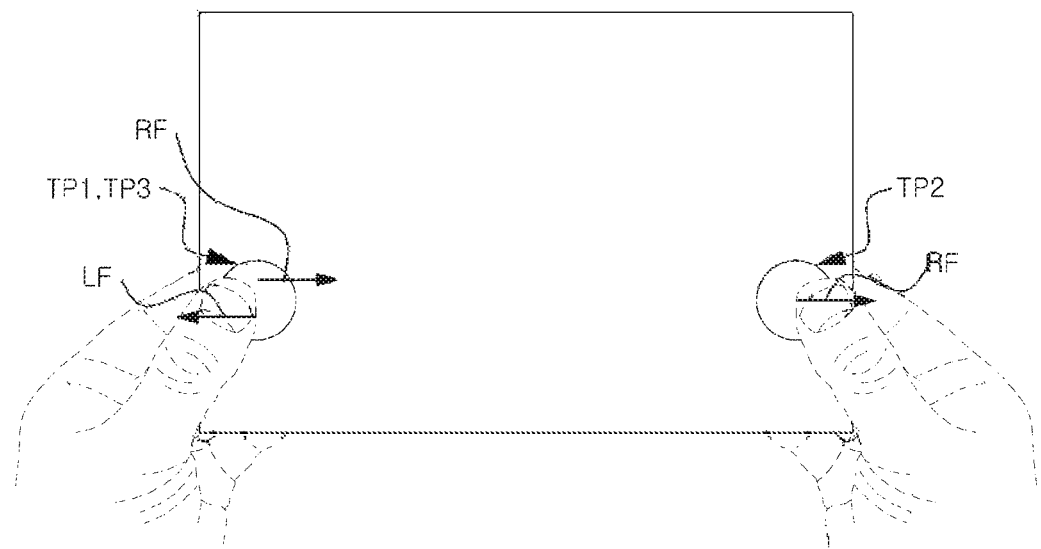

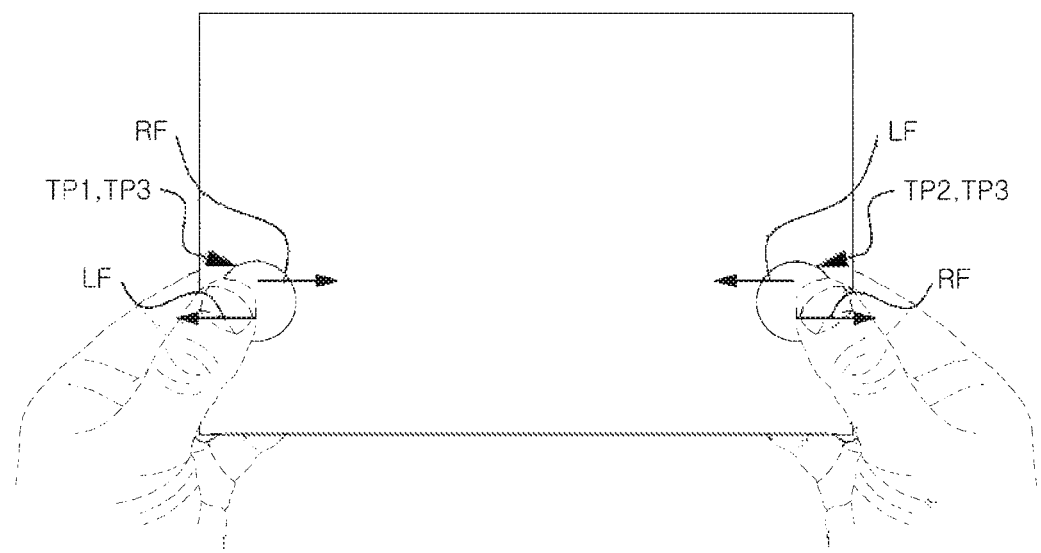
[Fig. 40]

[Fig. 41]
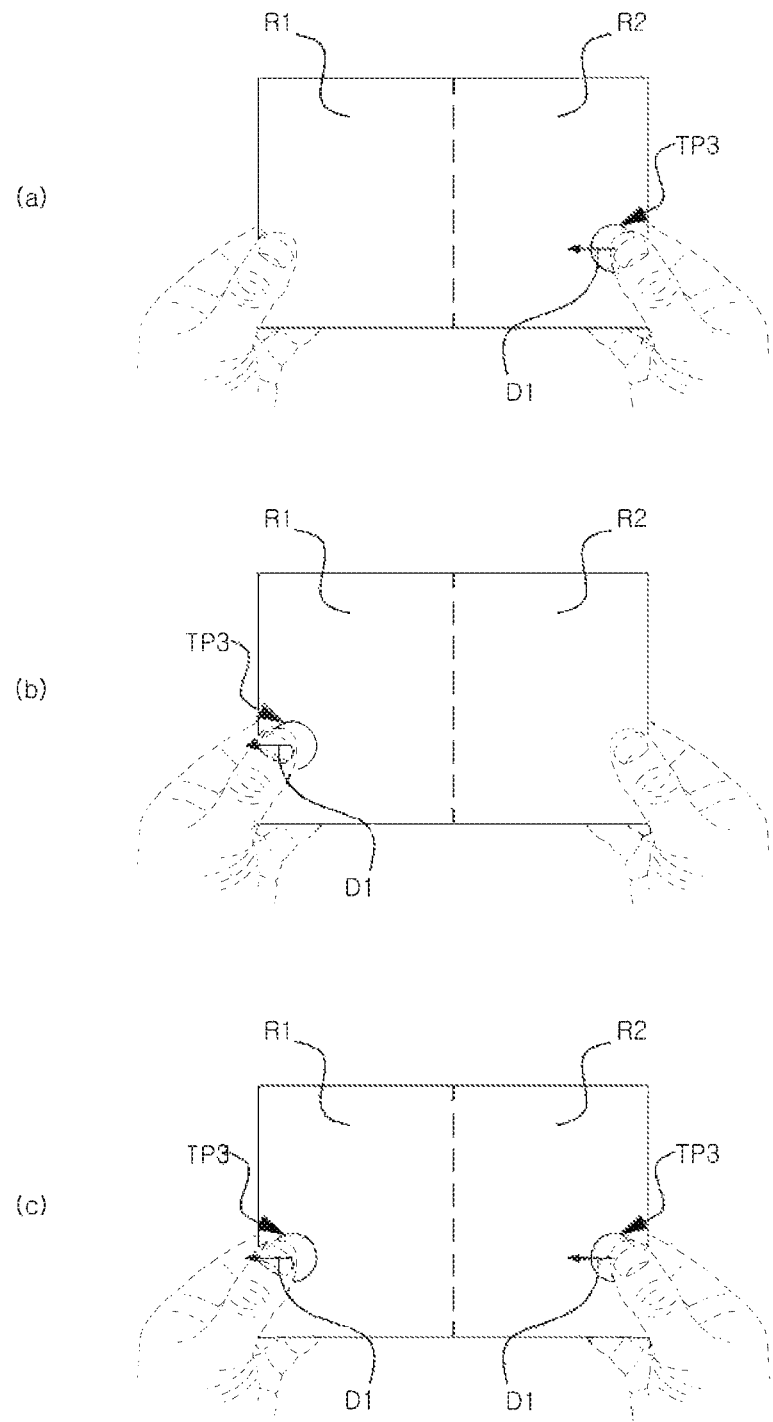

[Fig. 42]
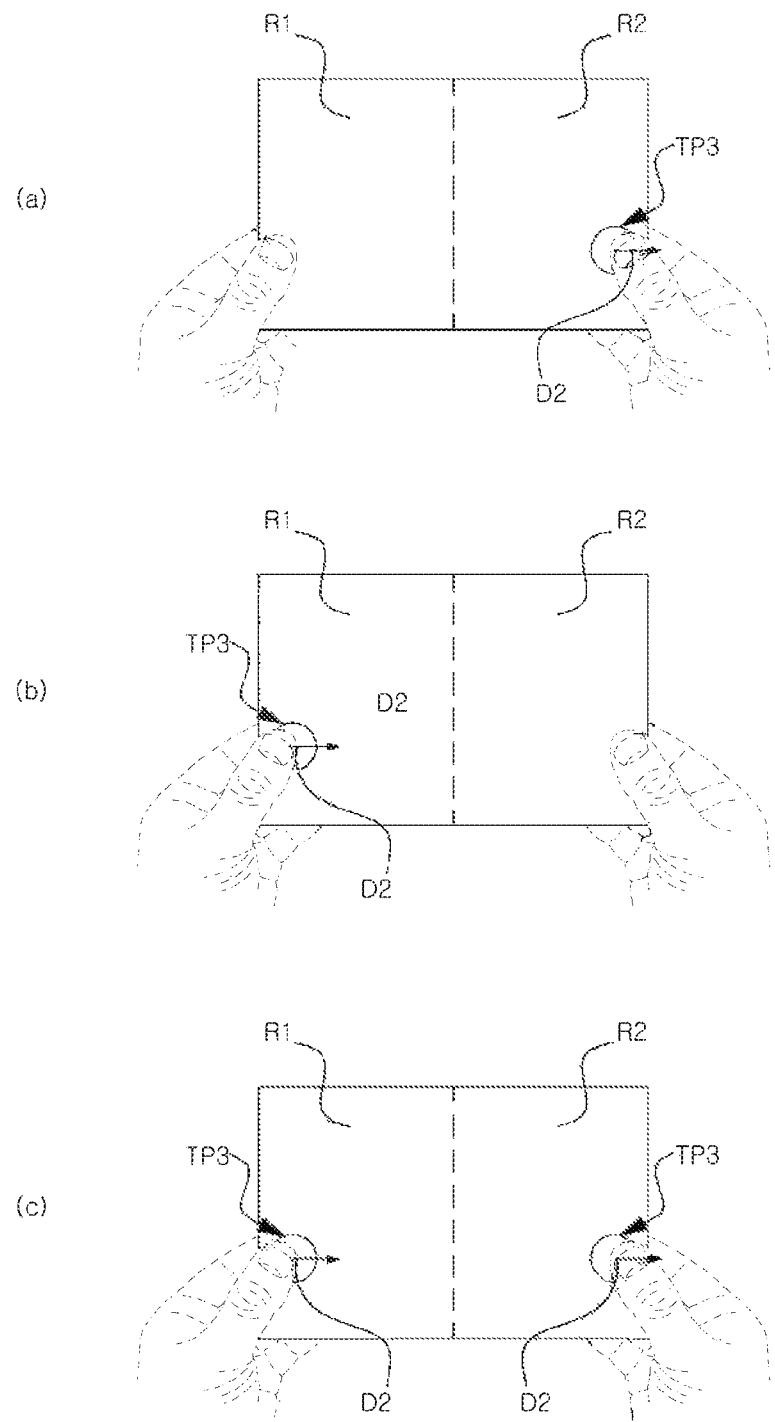

[Fig. 43]
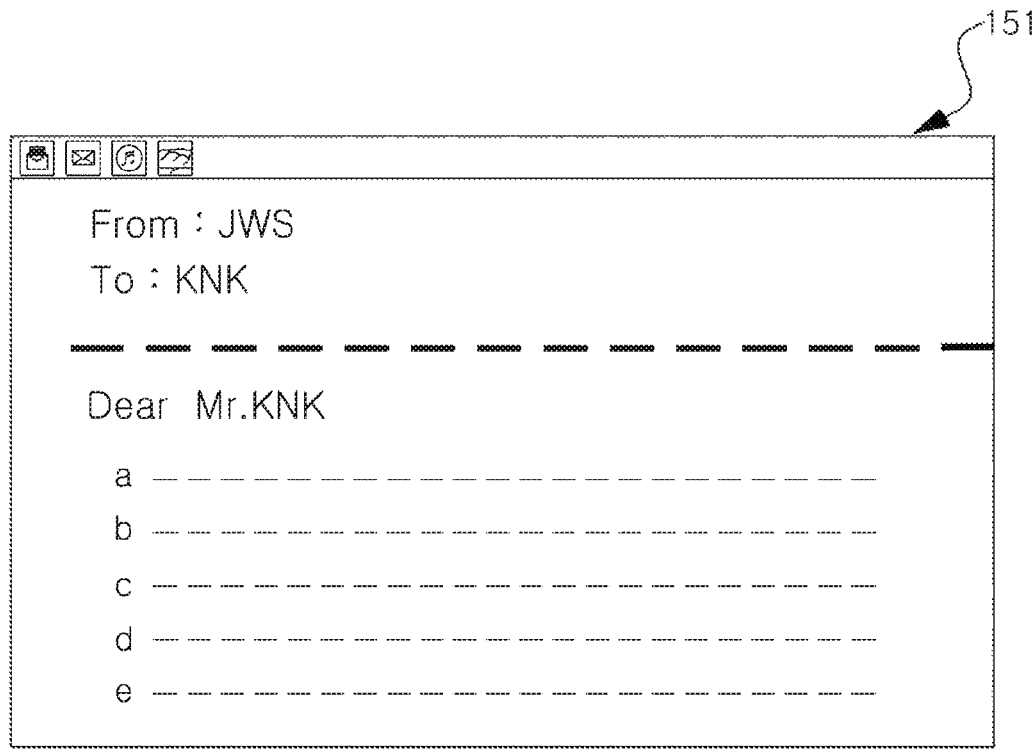
[Fig. 44]
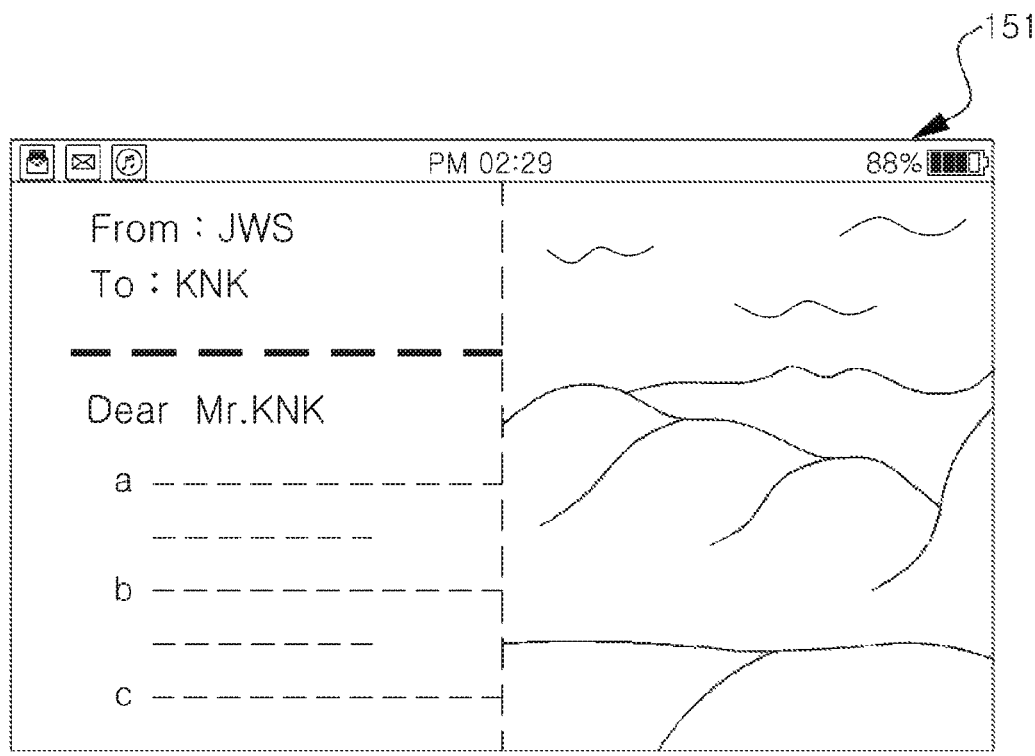

[Fig. 45]
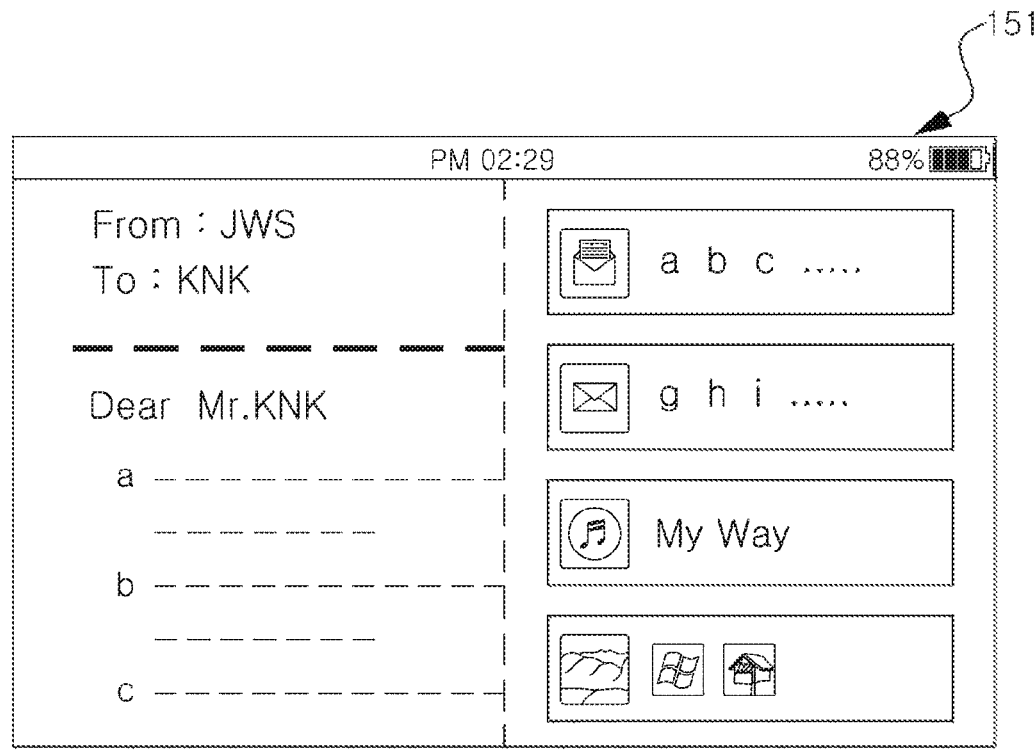
[Fig. 46]
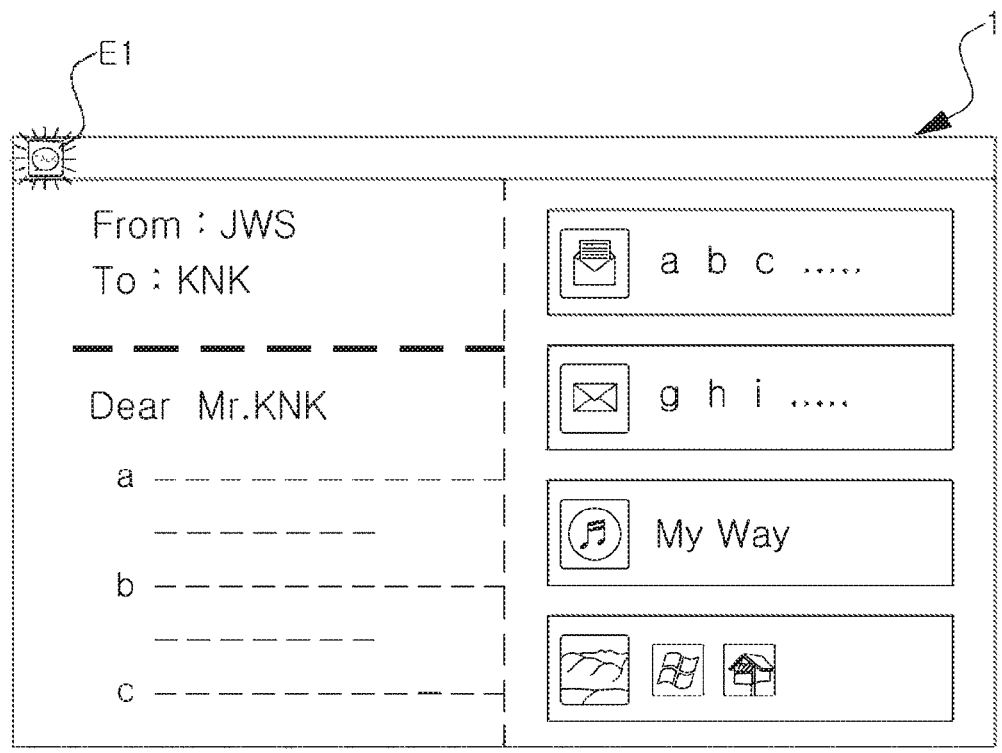

[Fig. 47]
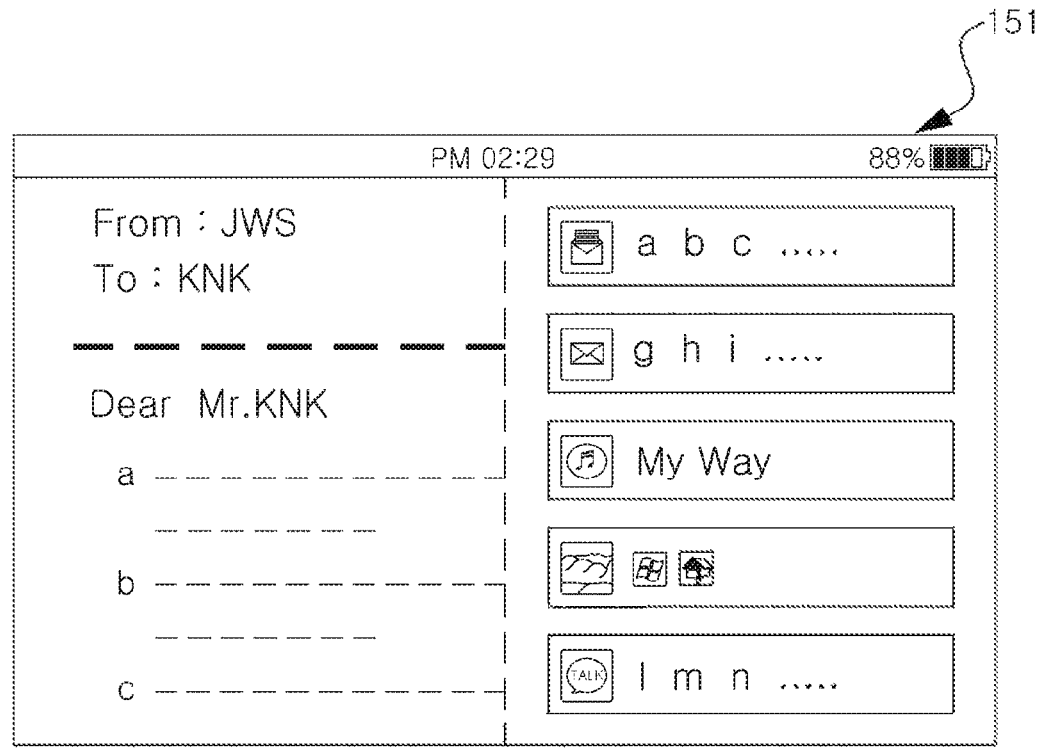
[Fig. 48]
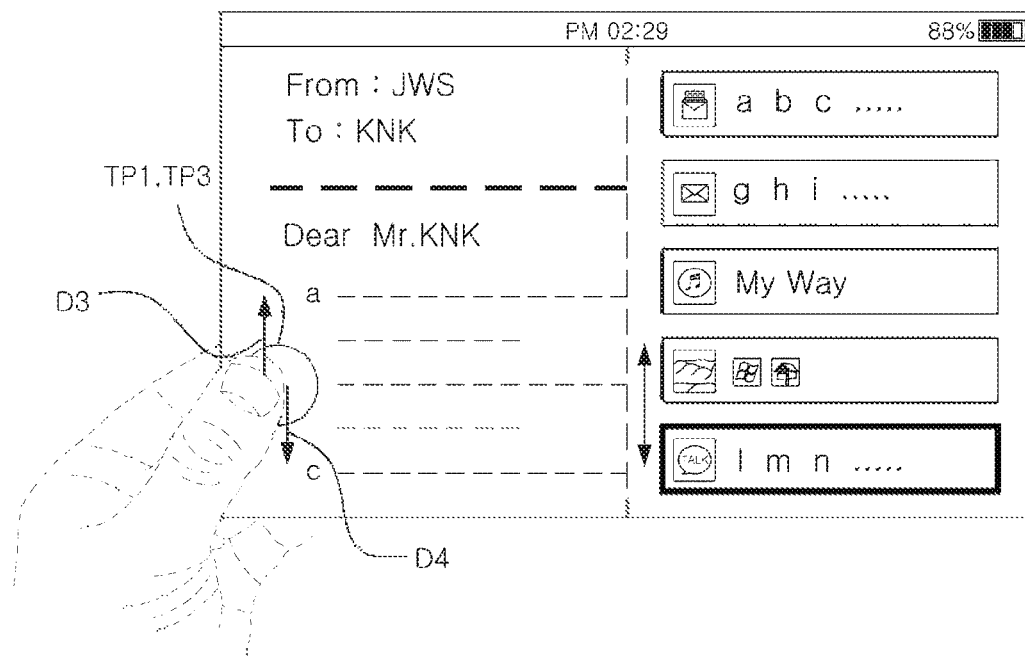

[Fig. 49]
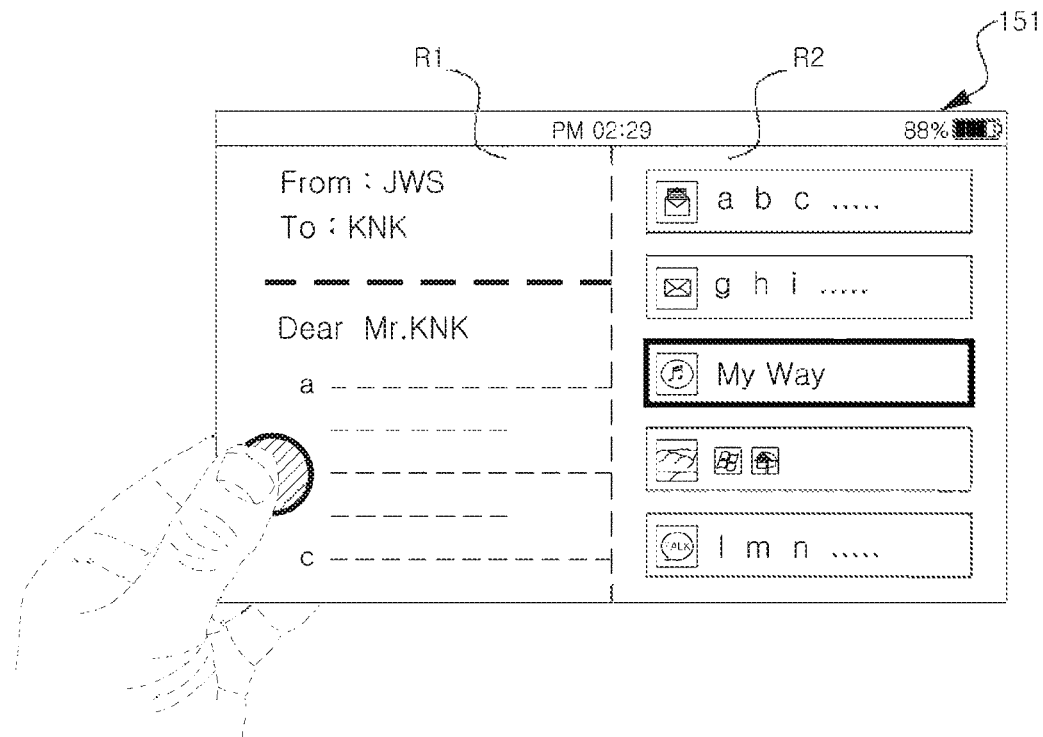
[Fig. 50]
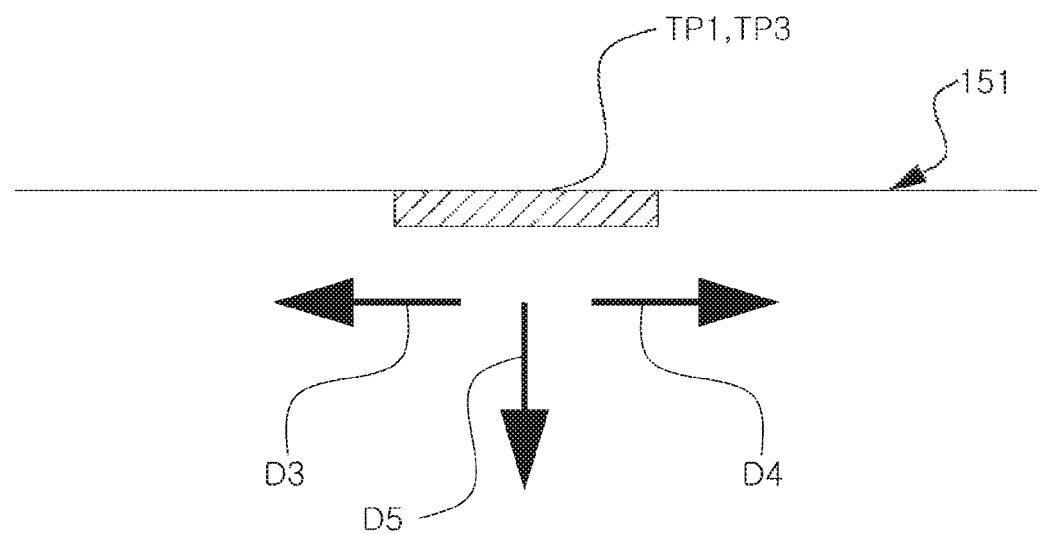

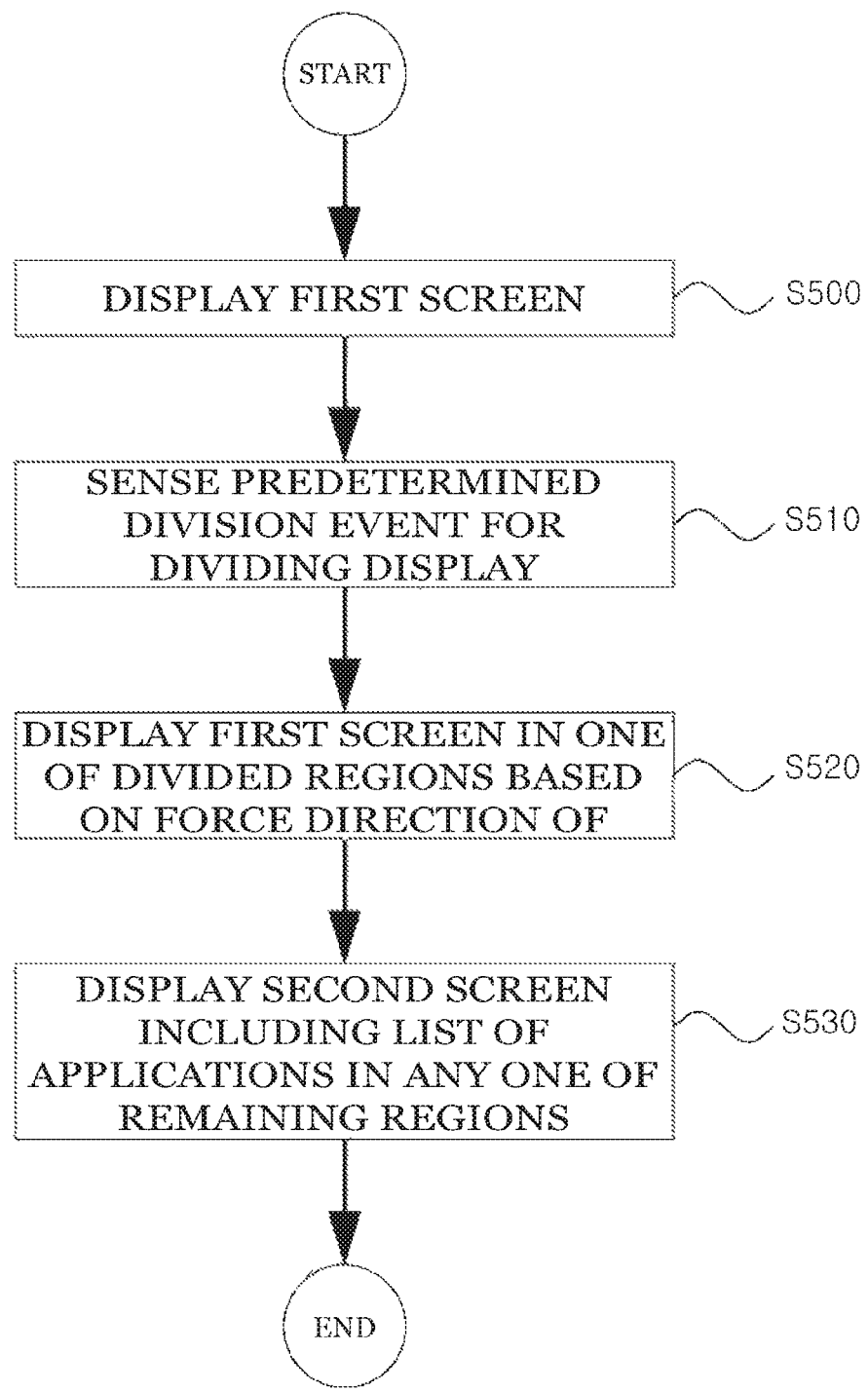
[Fig. 51]

[Fig. 52]
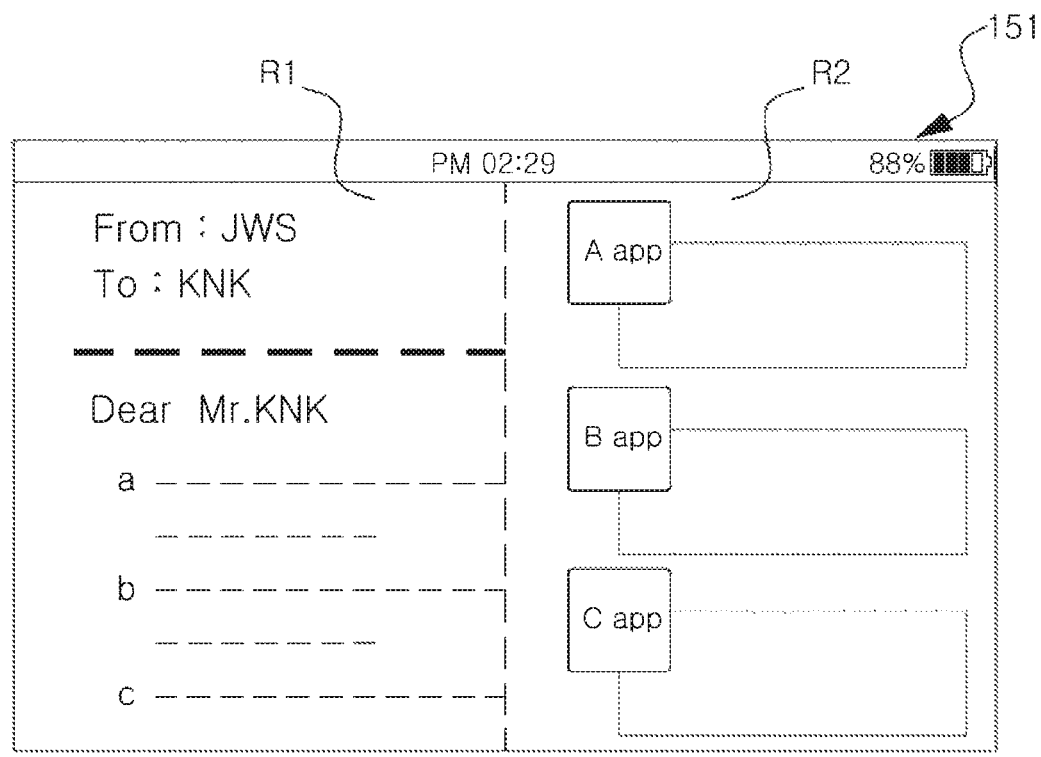

[Fig. 53]
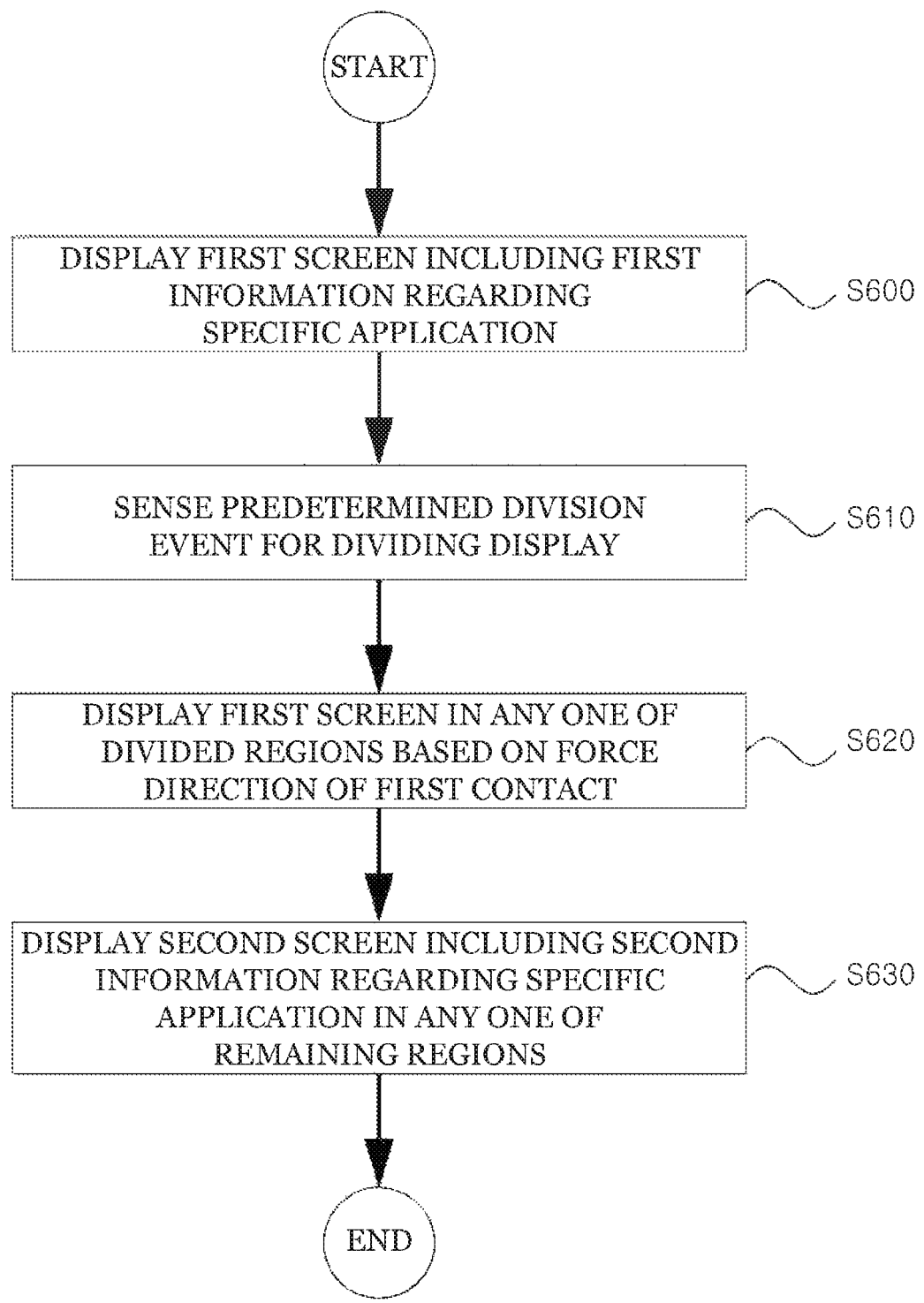

[Fig. 54]
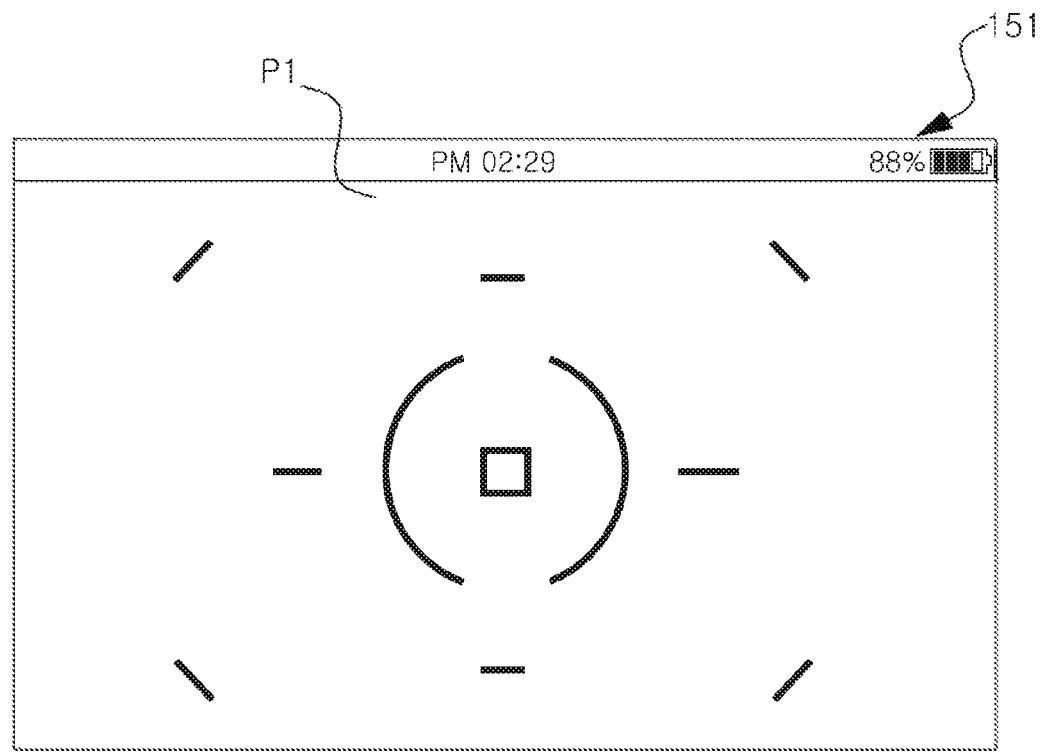
[Fig. 55]
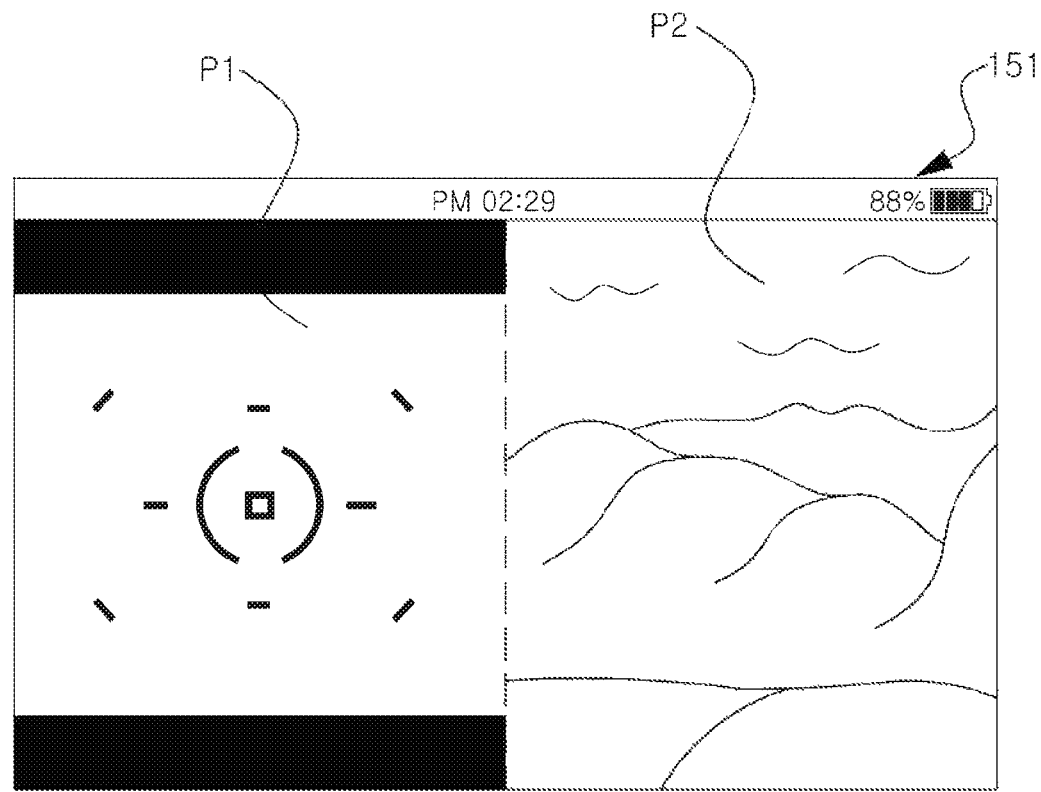

[Fig. 56]
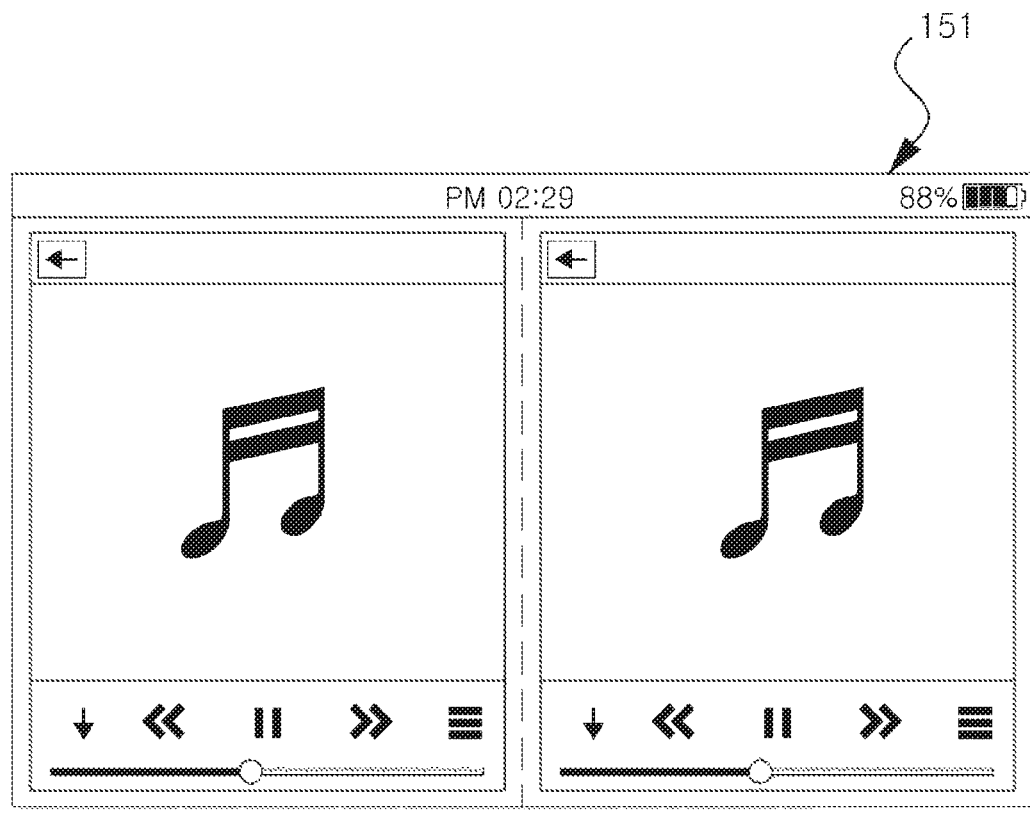

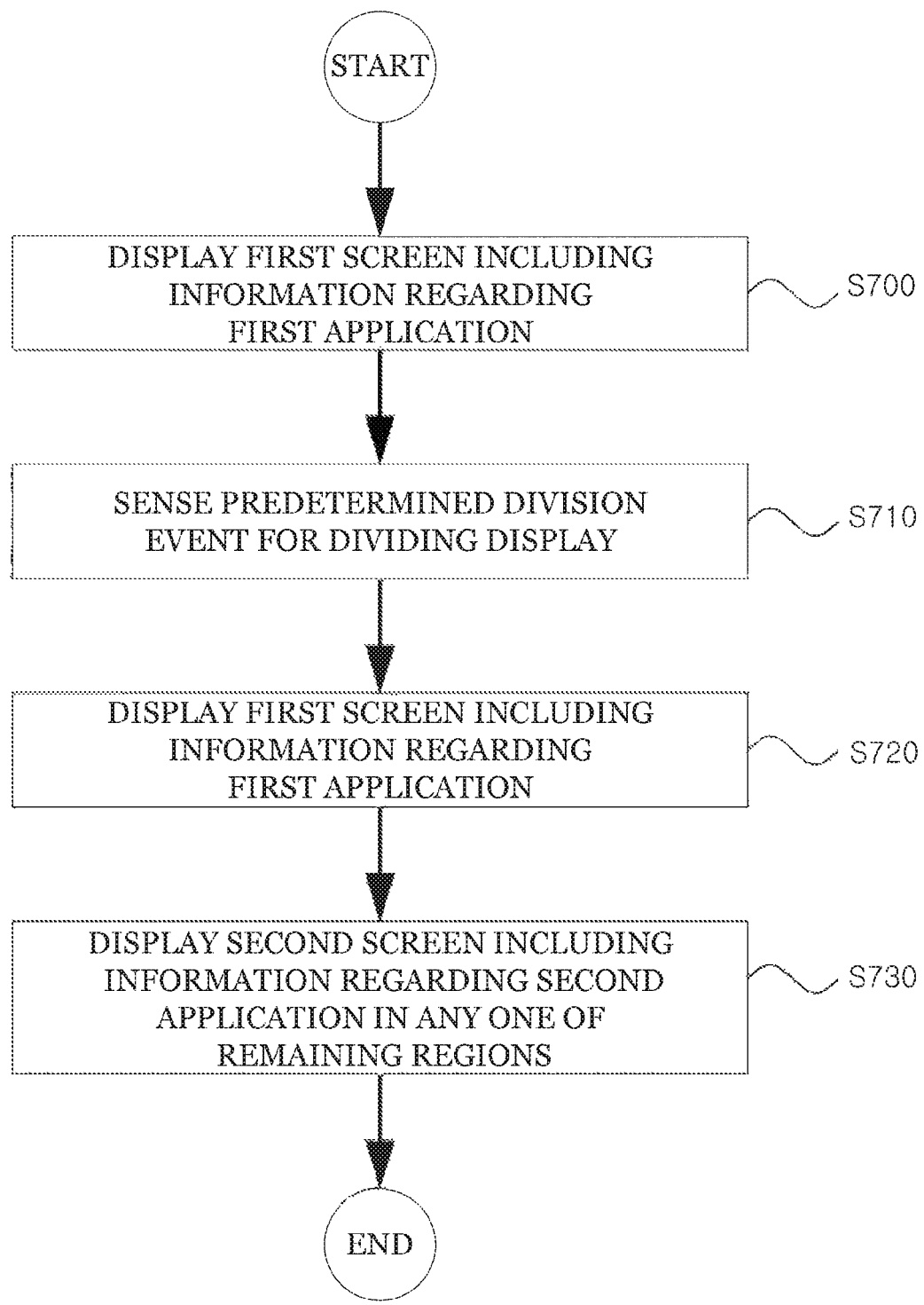
[Fig. 57]

[Fig. 58]
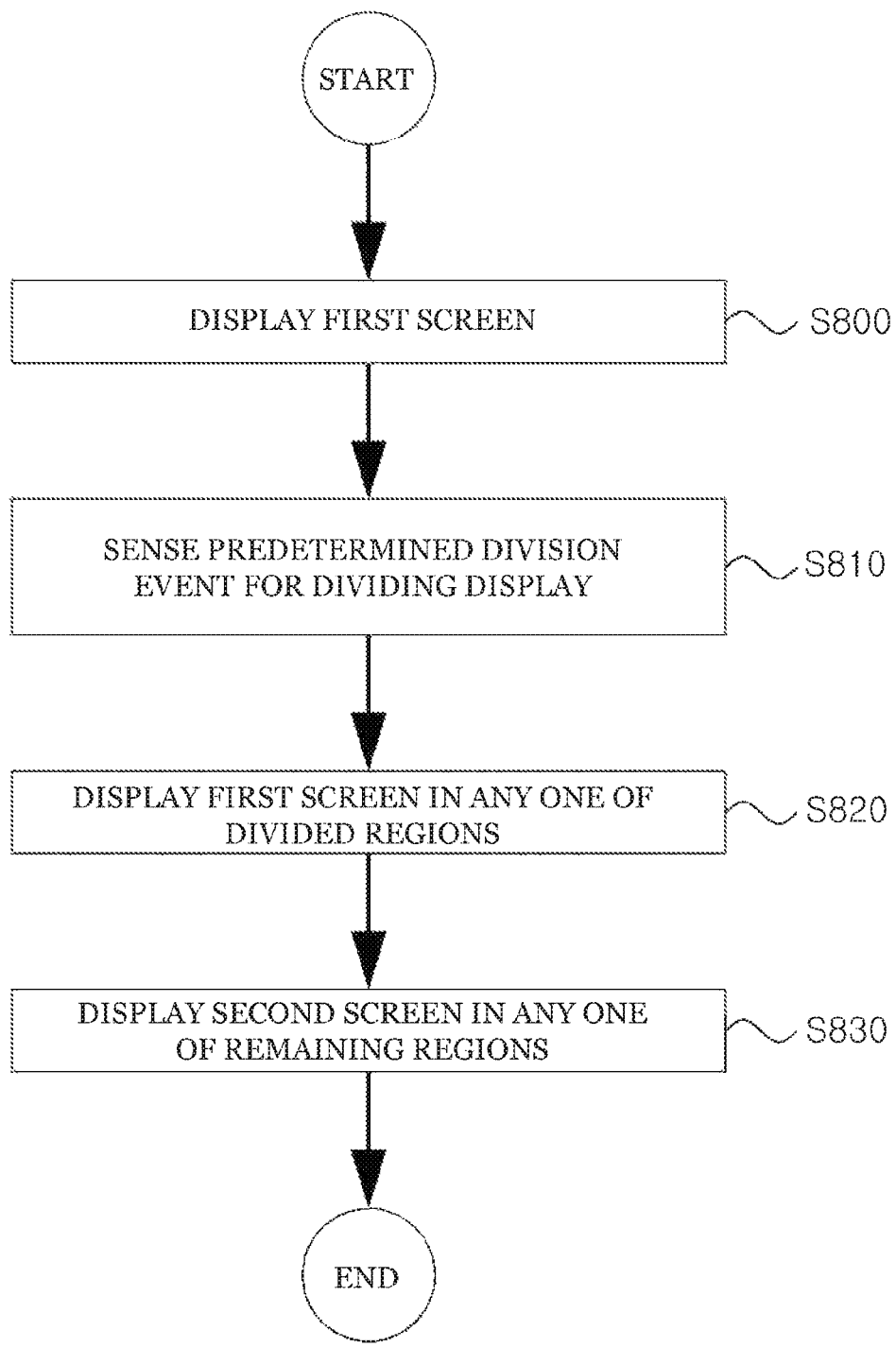

[Fig. 59]
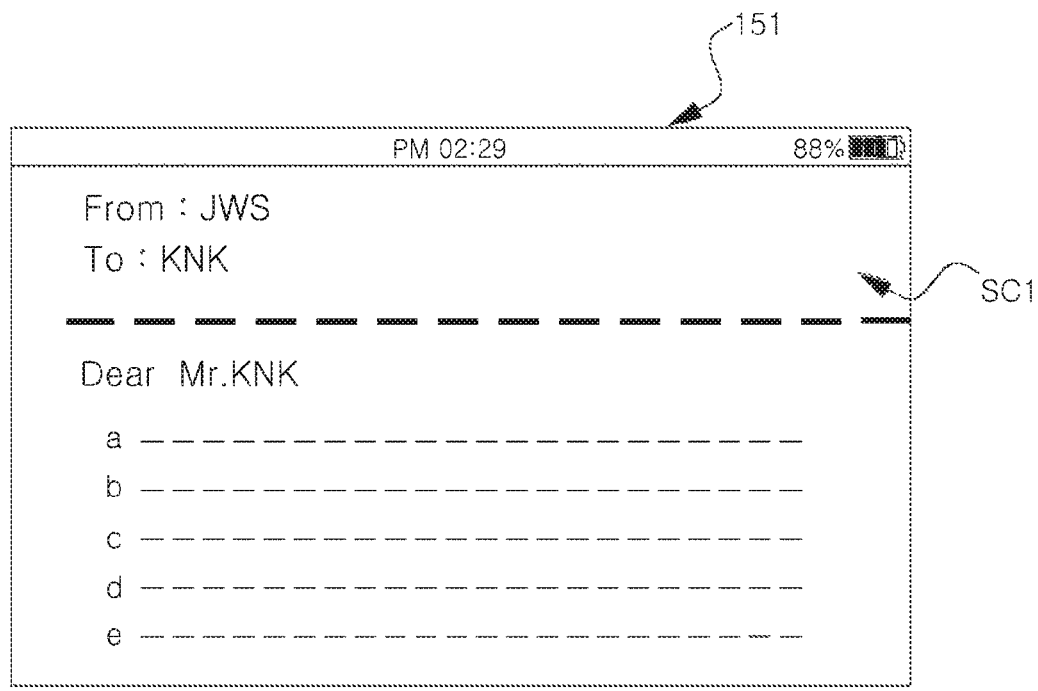

[Fig. 60]
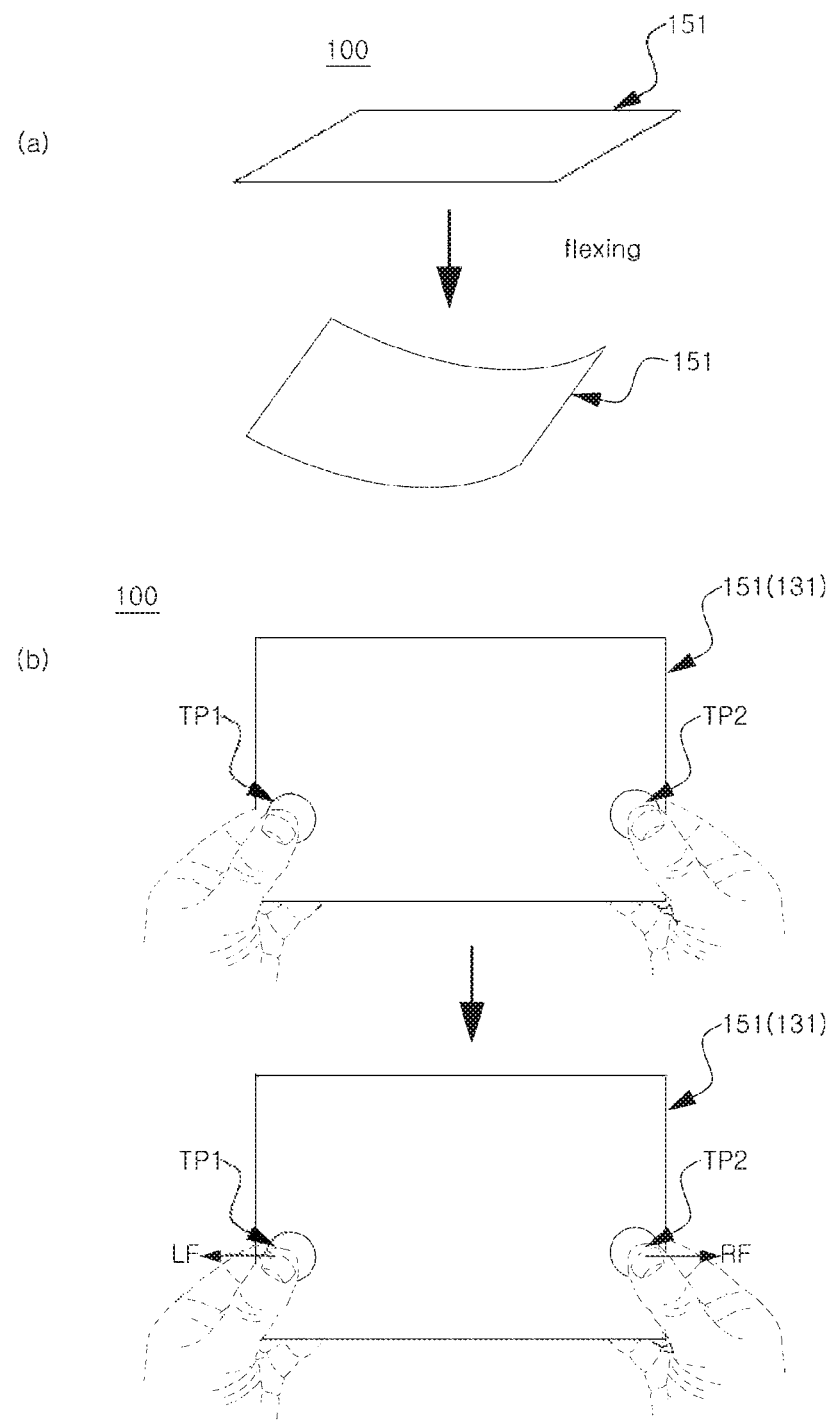

[Fig. 61]
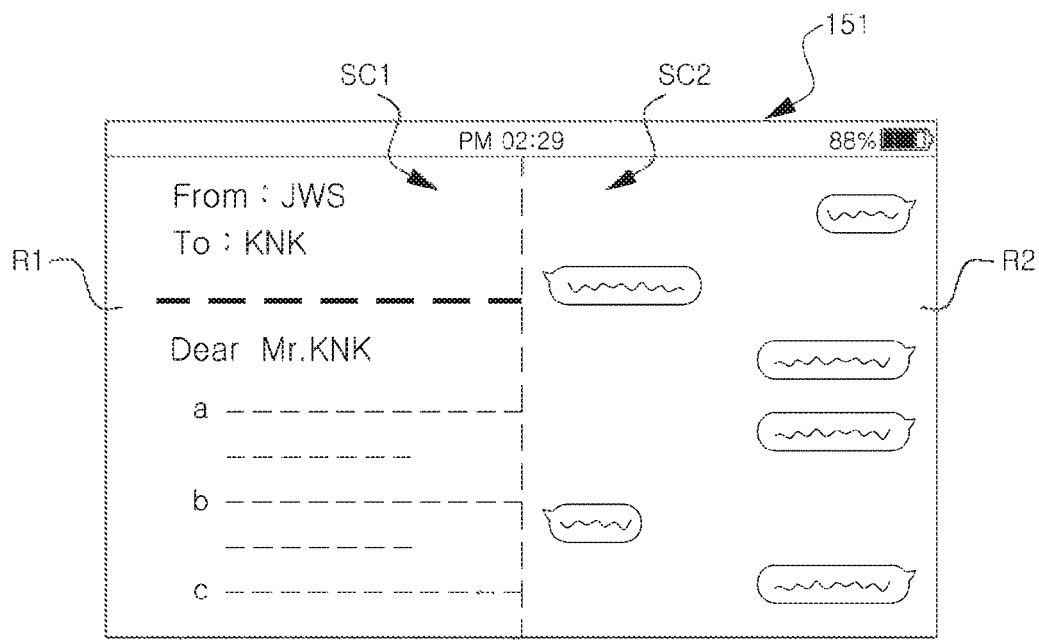

[Fig. 62]
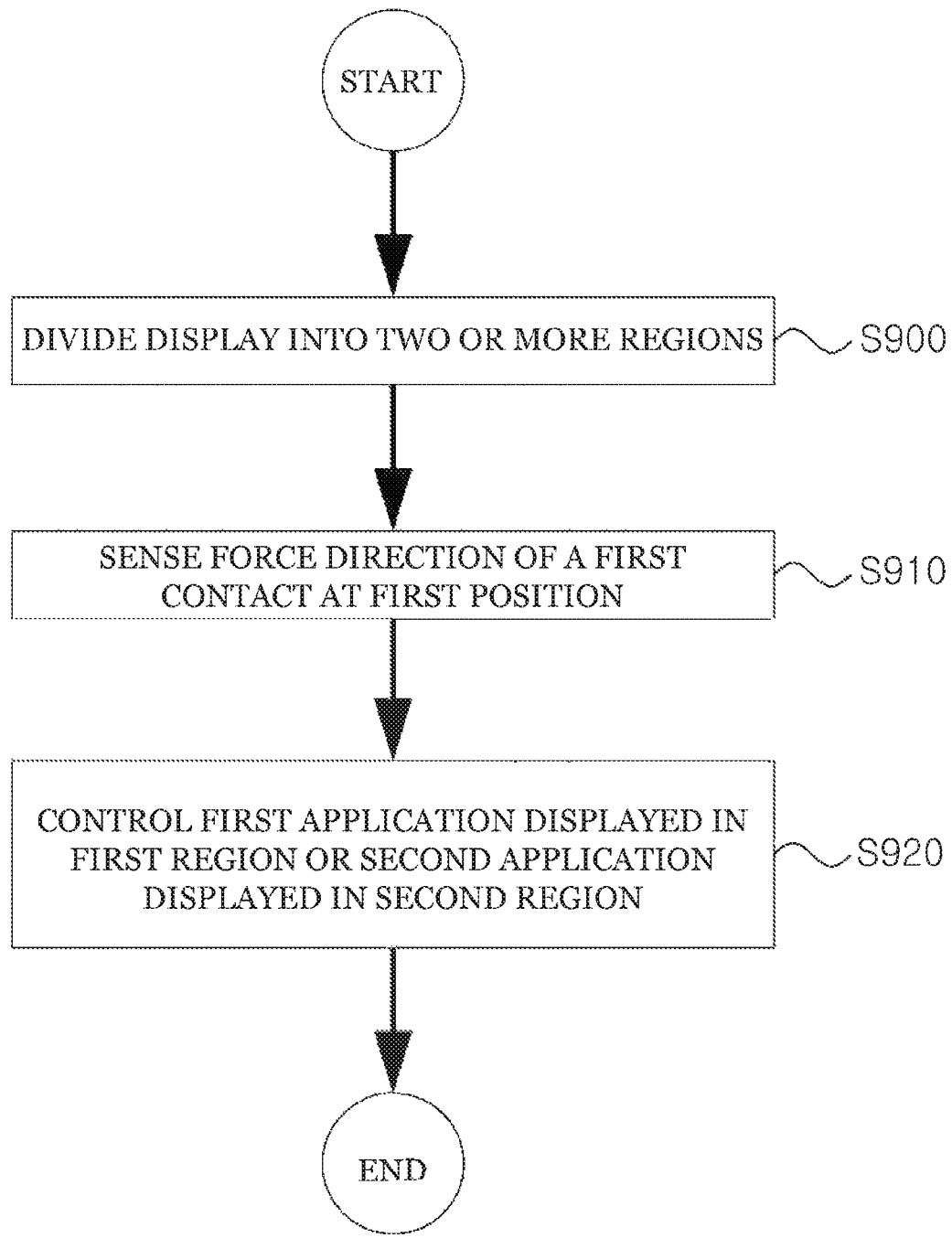

[Fig. 63]
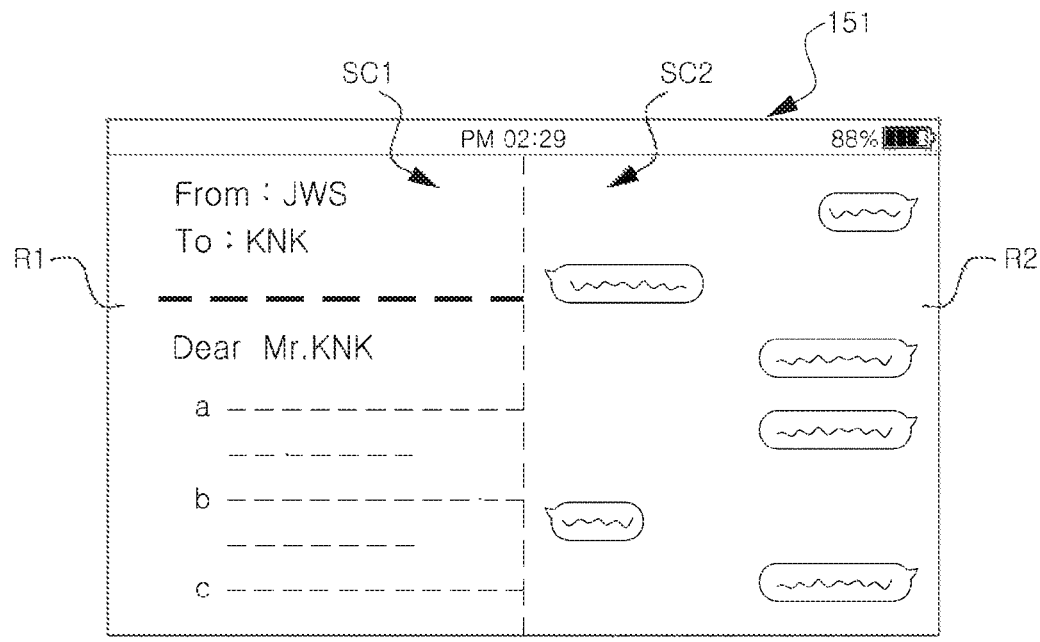
[Fig. 64]
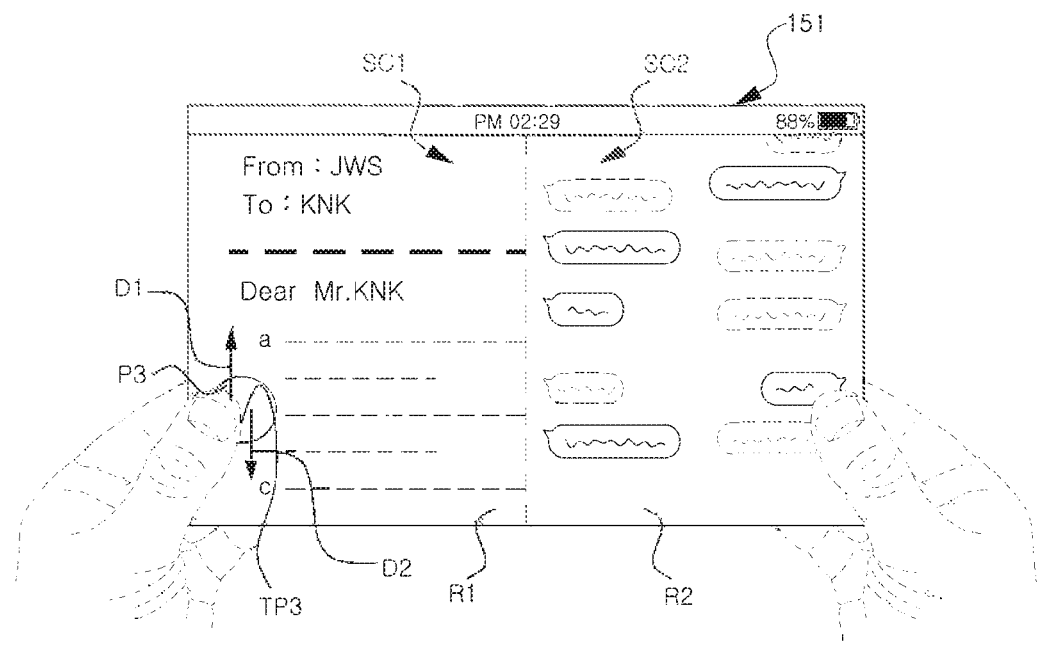

[Fig. 65]
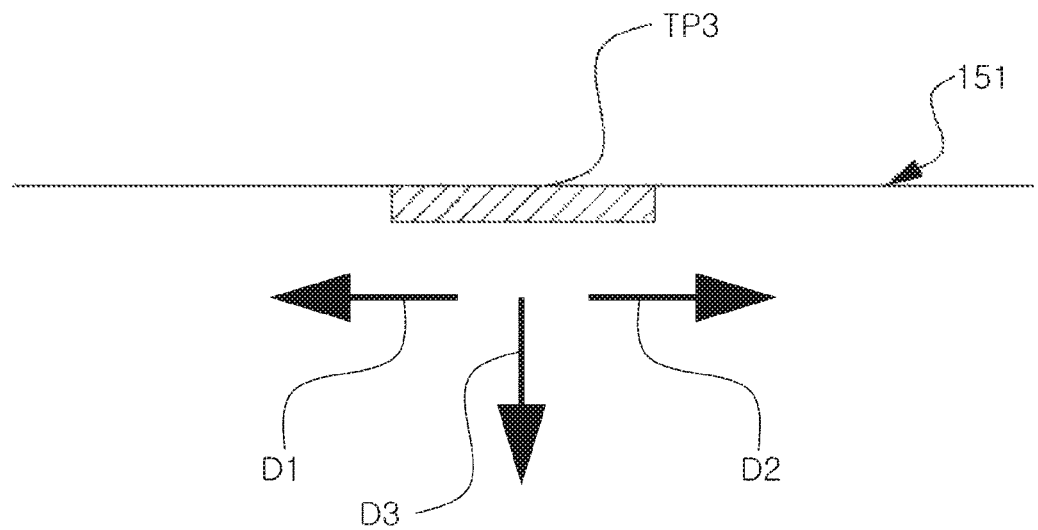
[Fig. 66]
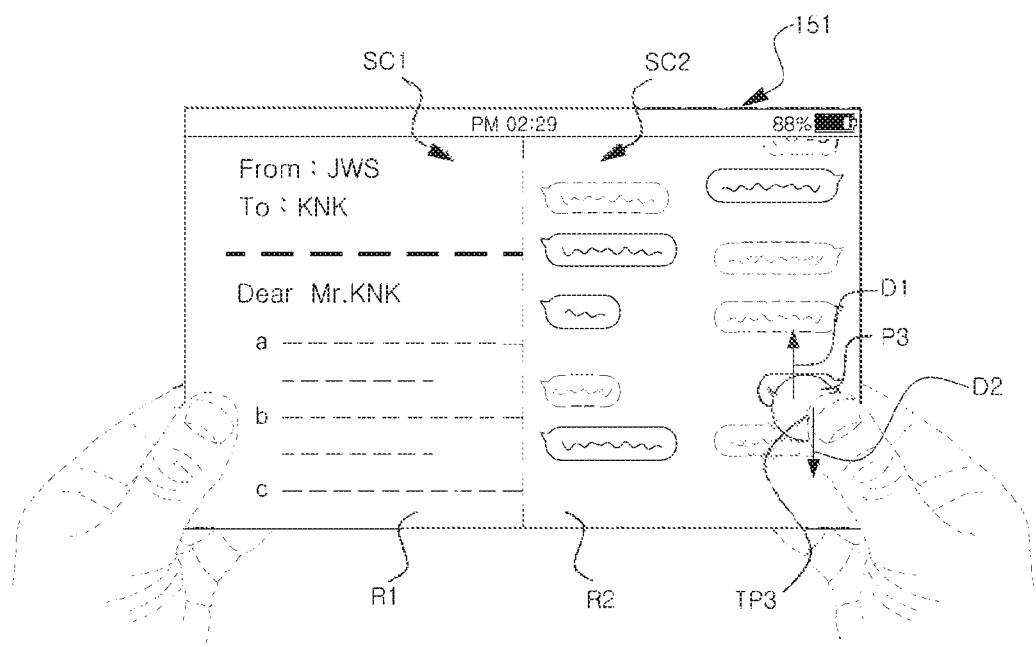

[Fig. 67]
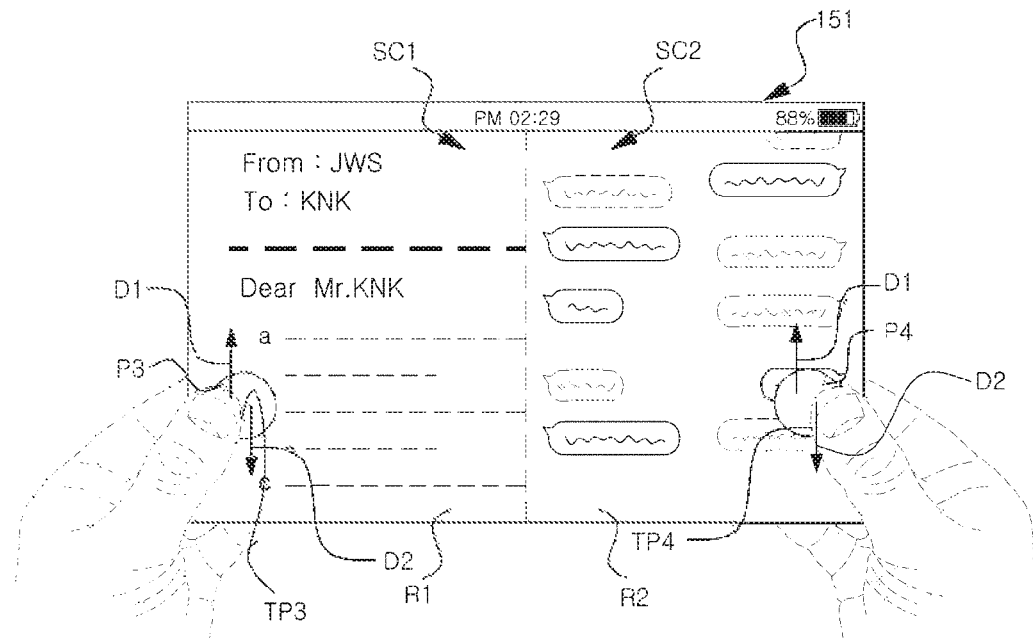
[Fig. 68]
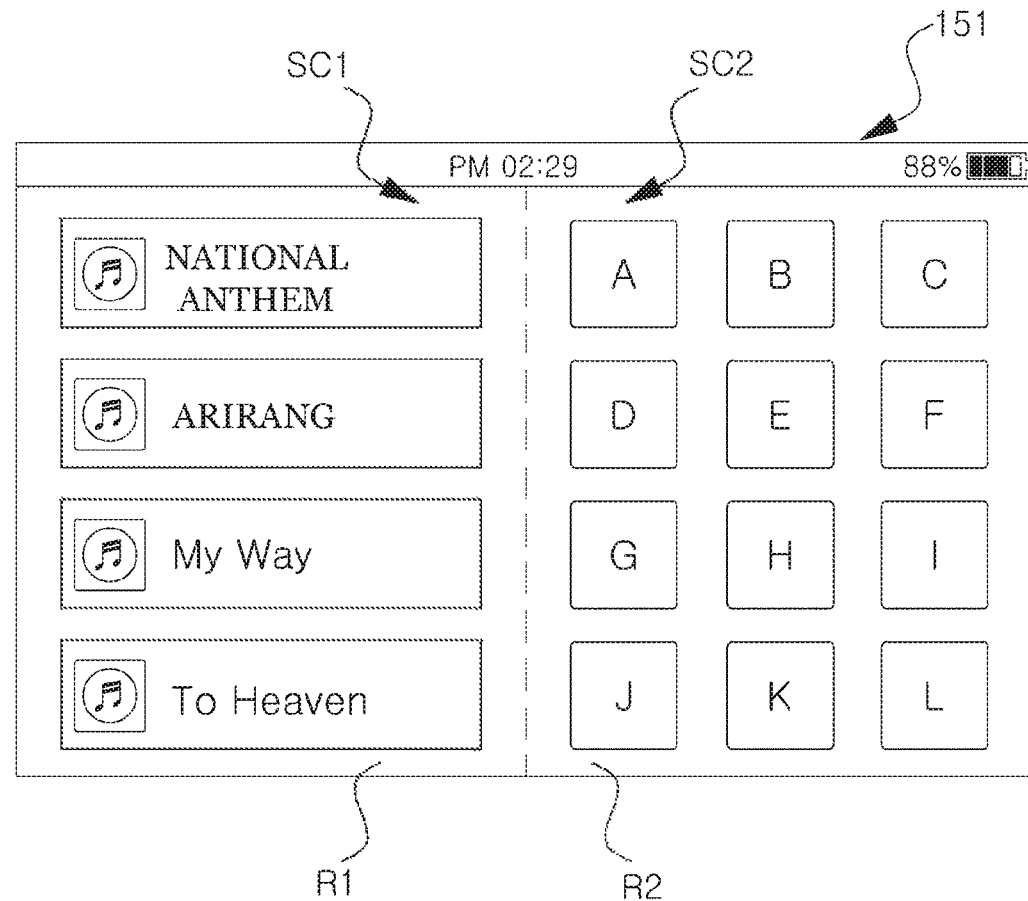

[Fig. 69]
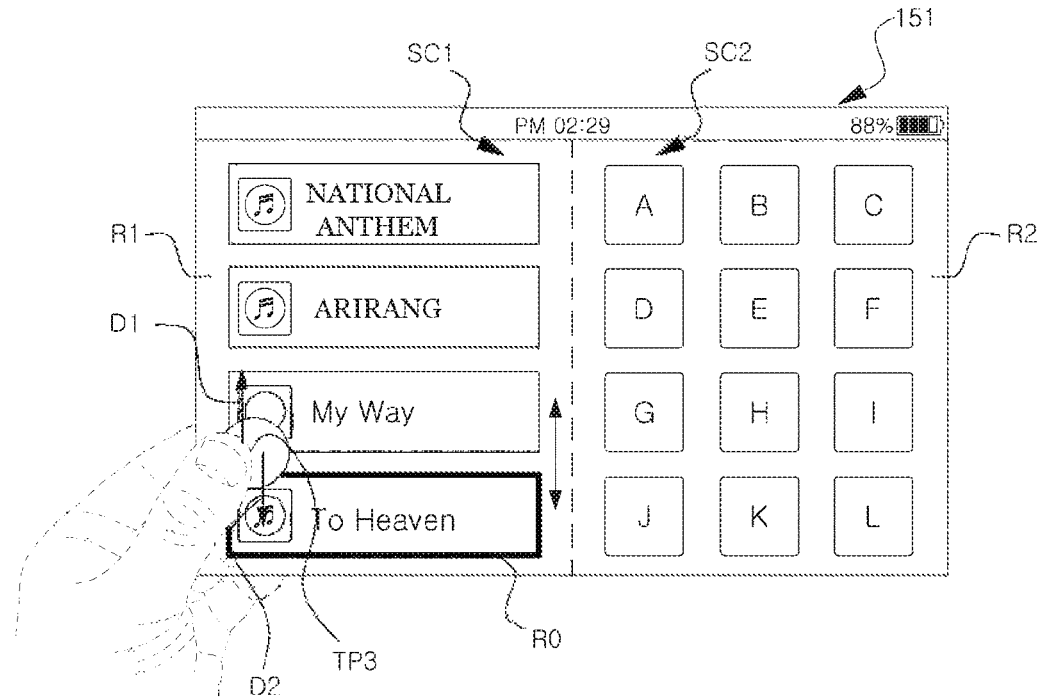
[Fig. 70]
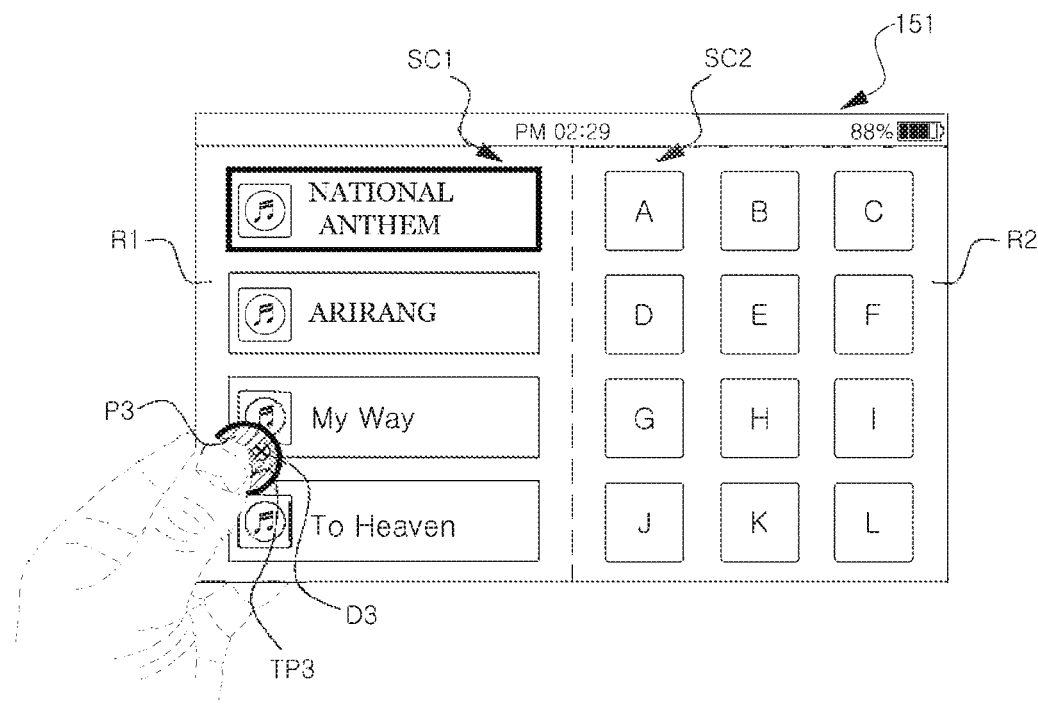

[Fig. 71]
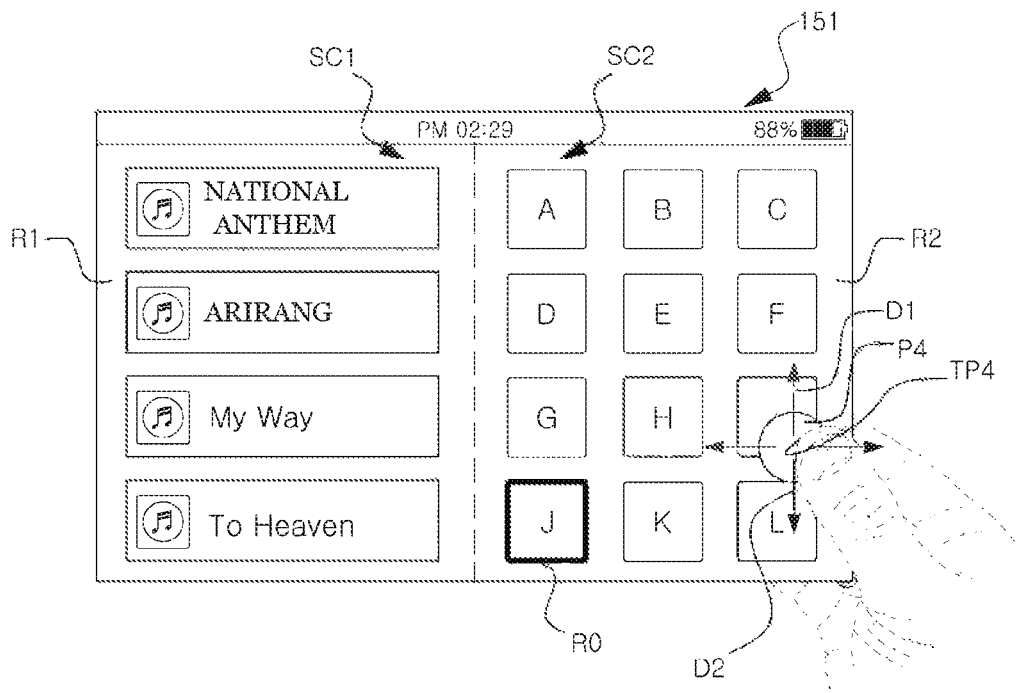
[Fig. 72]
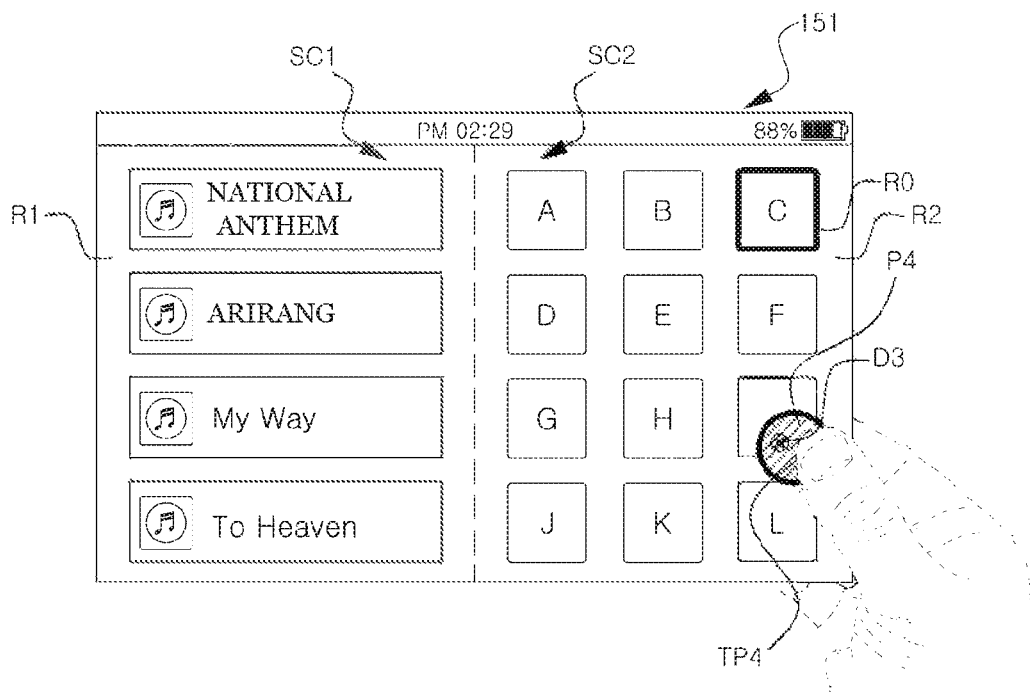

[Fig. 73]
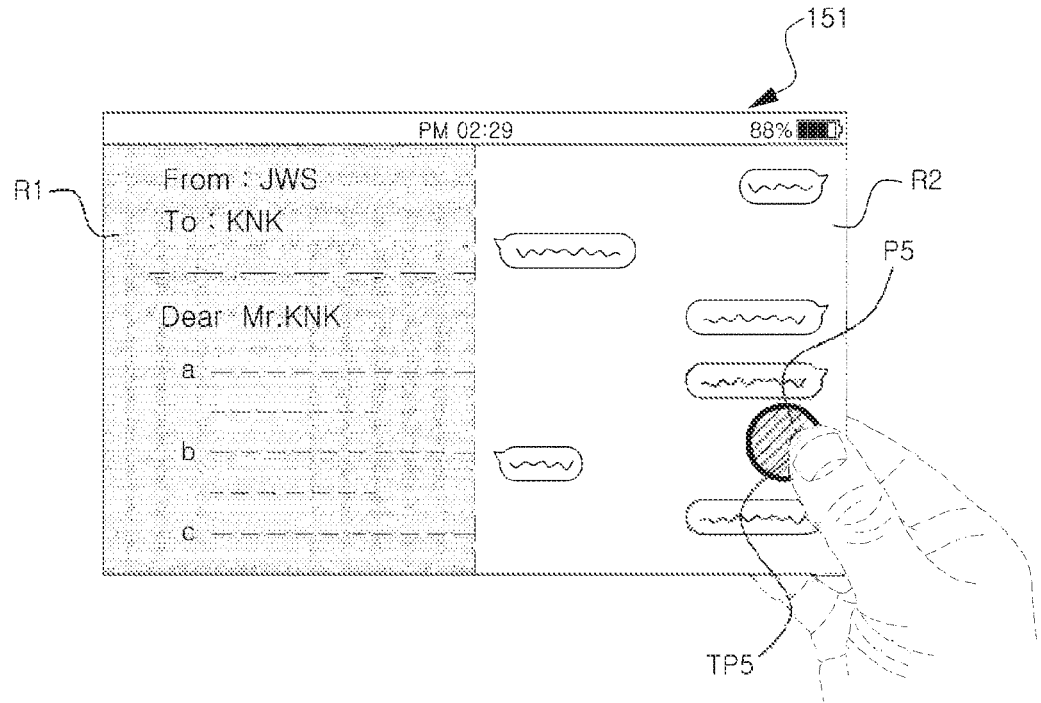
[Fig. 74]
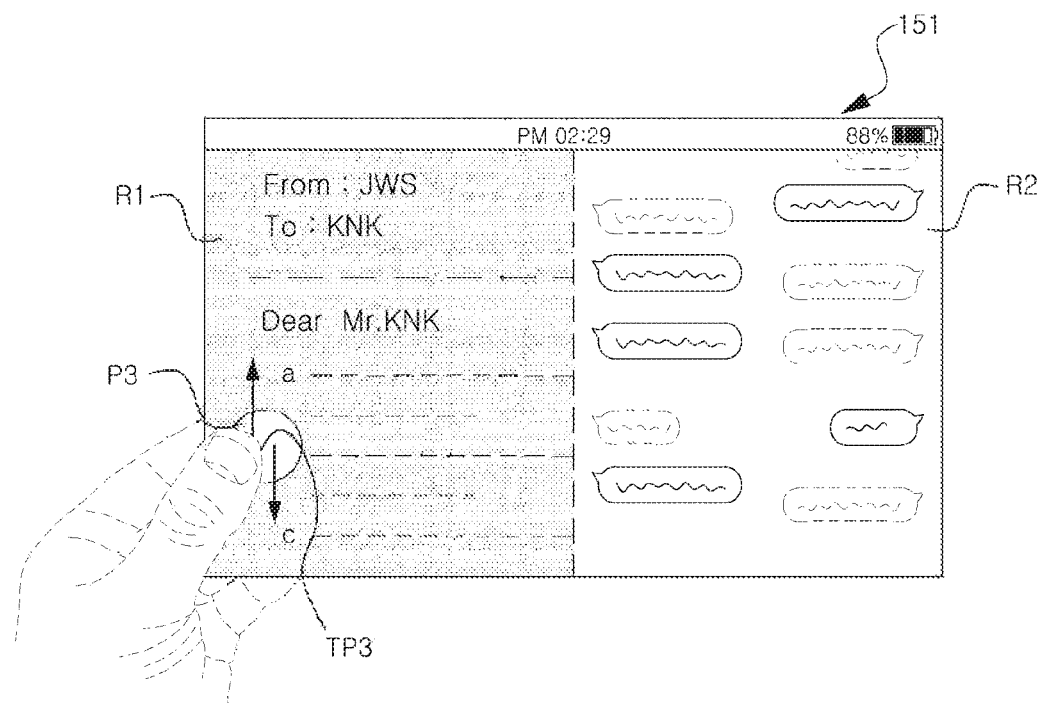

[Fig. 75]
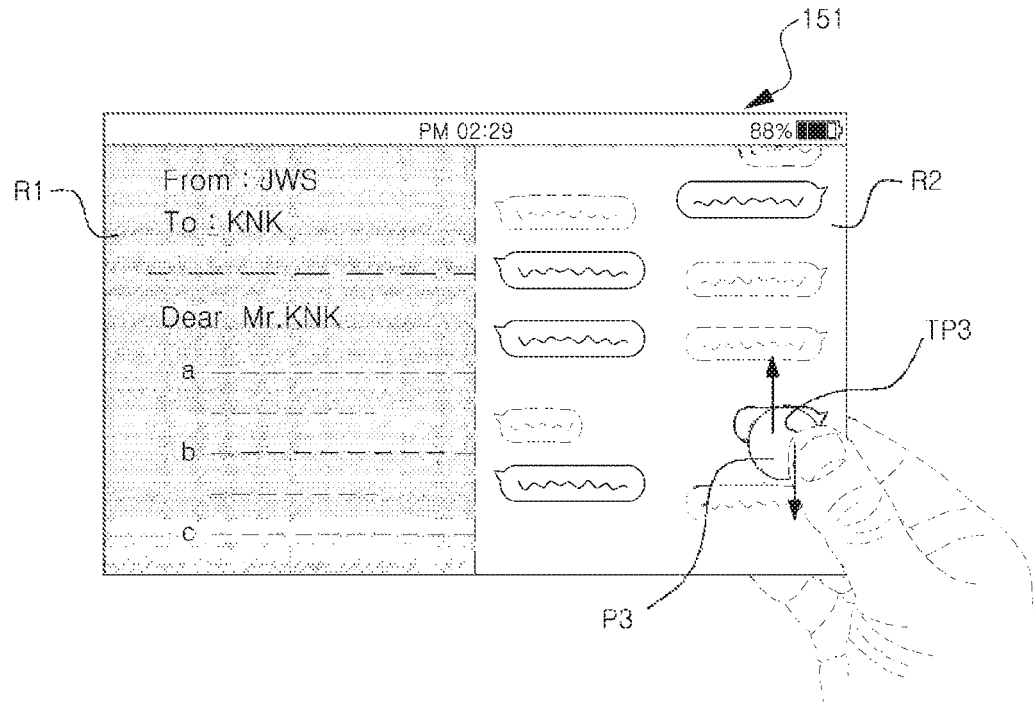
[Fig. 76]
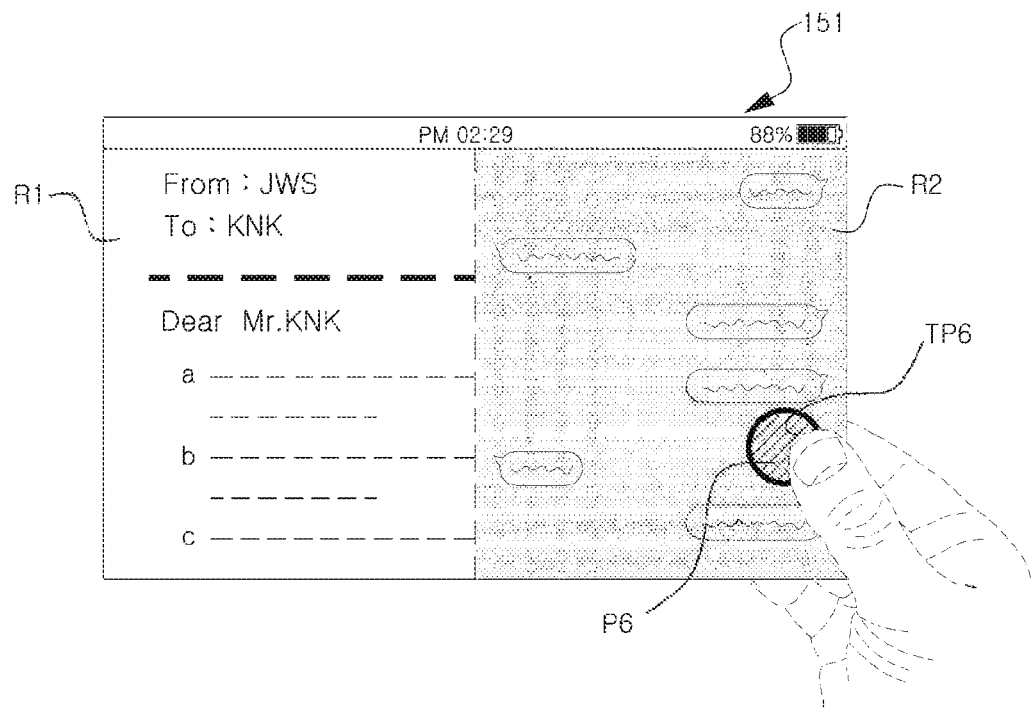

[Fig. 77]
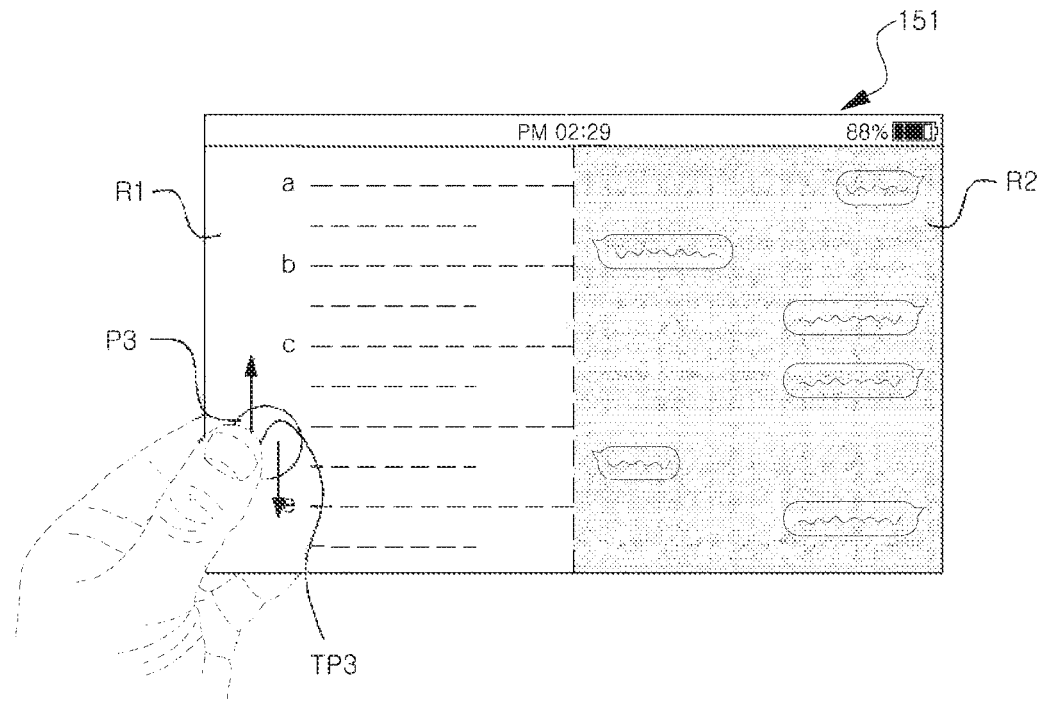
[Fig. 78]
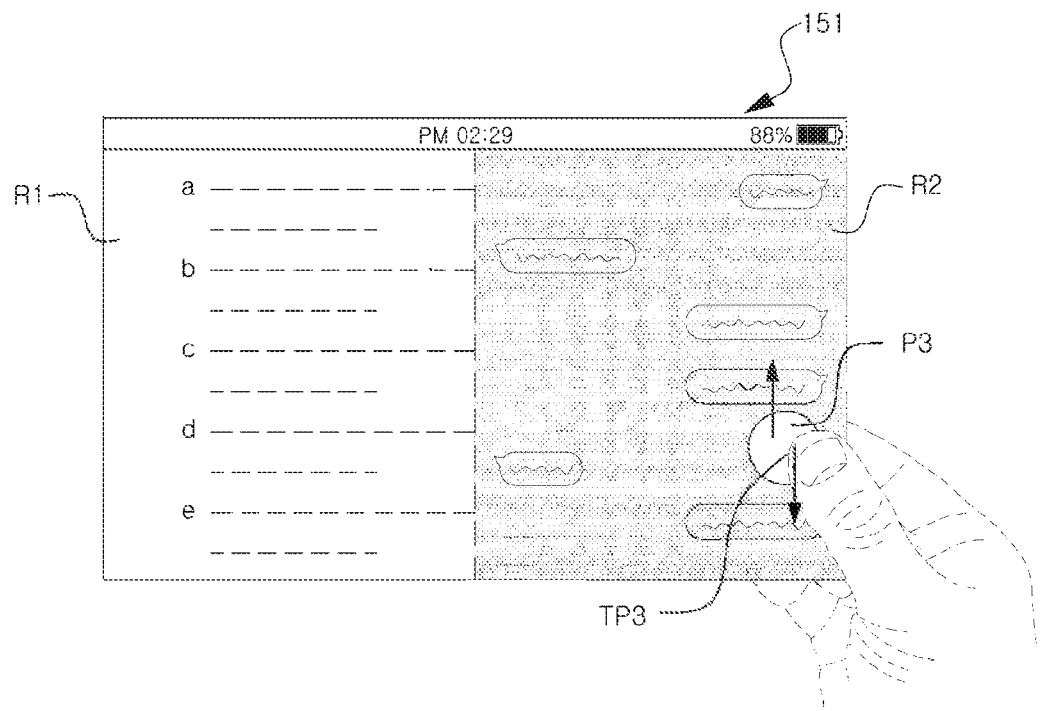

[Fig. 79]
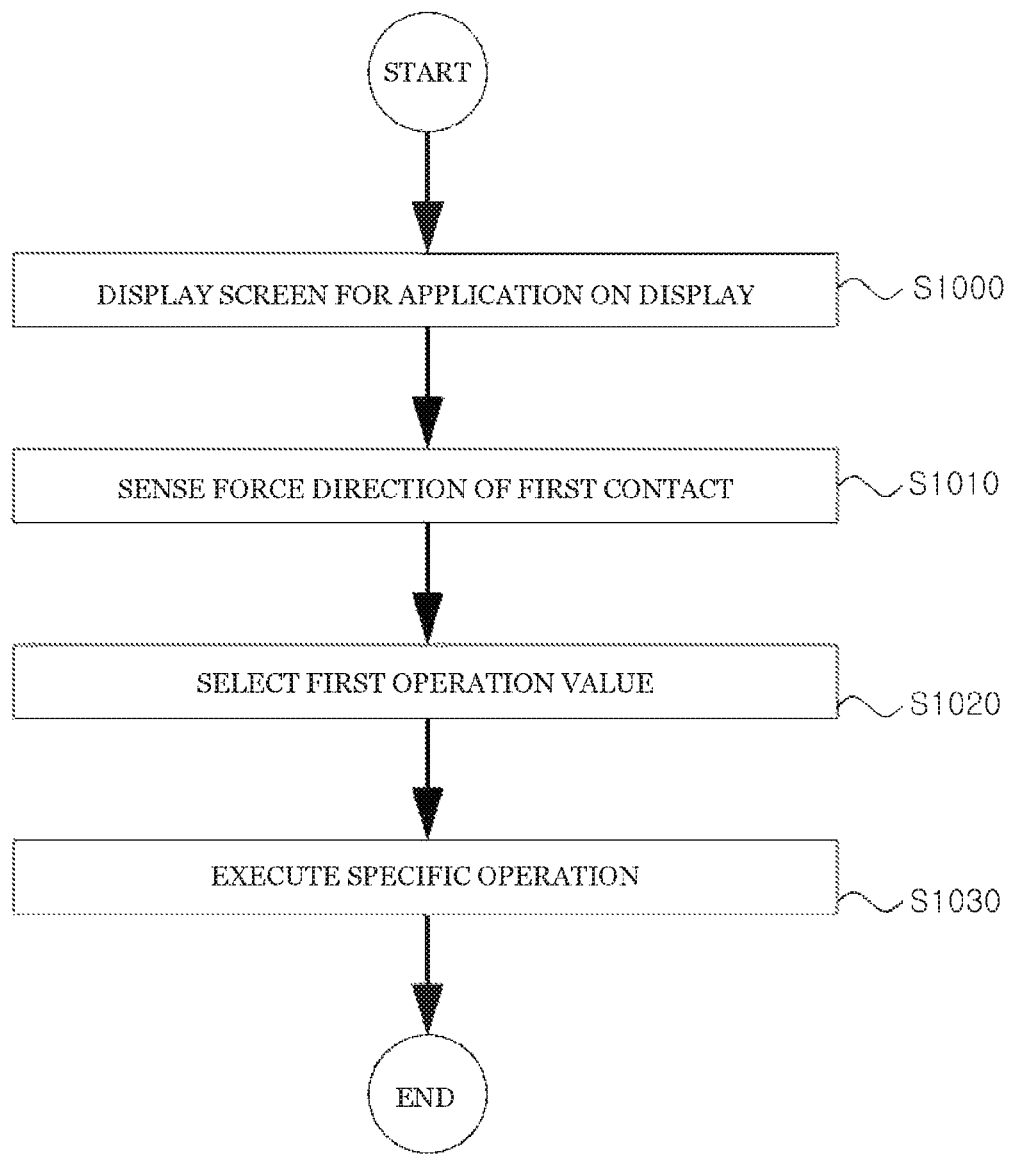

[Fig. 80]

[Fig. 81]
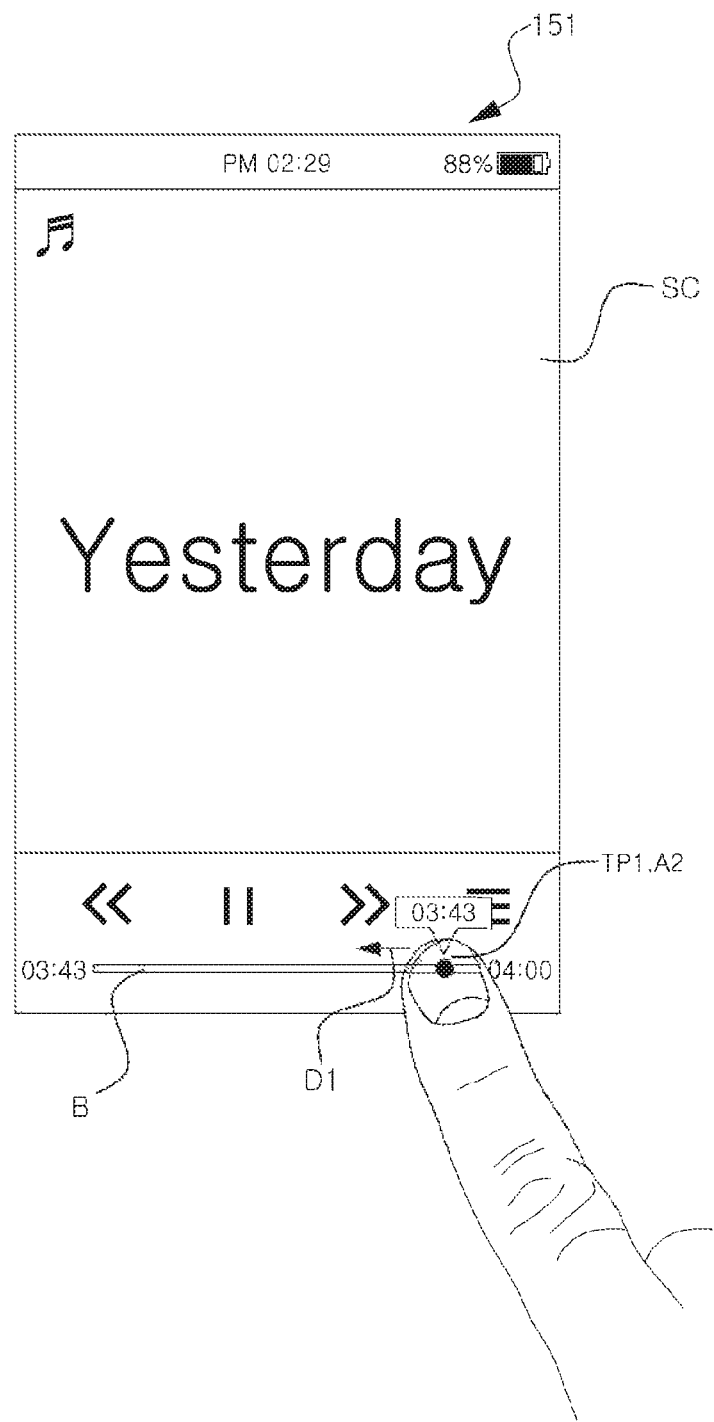

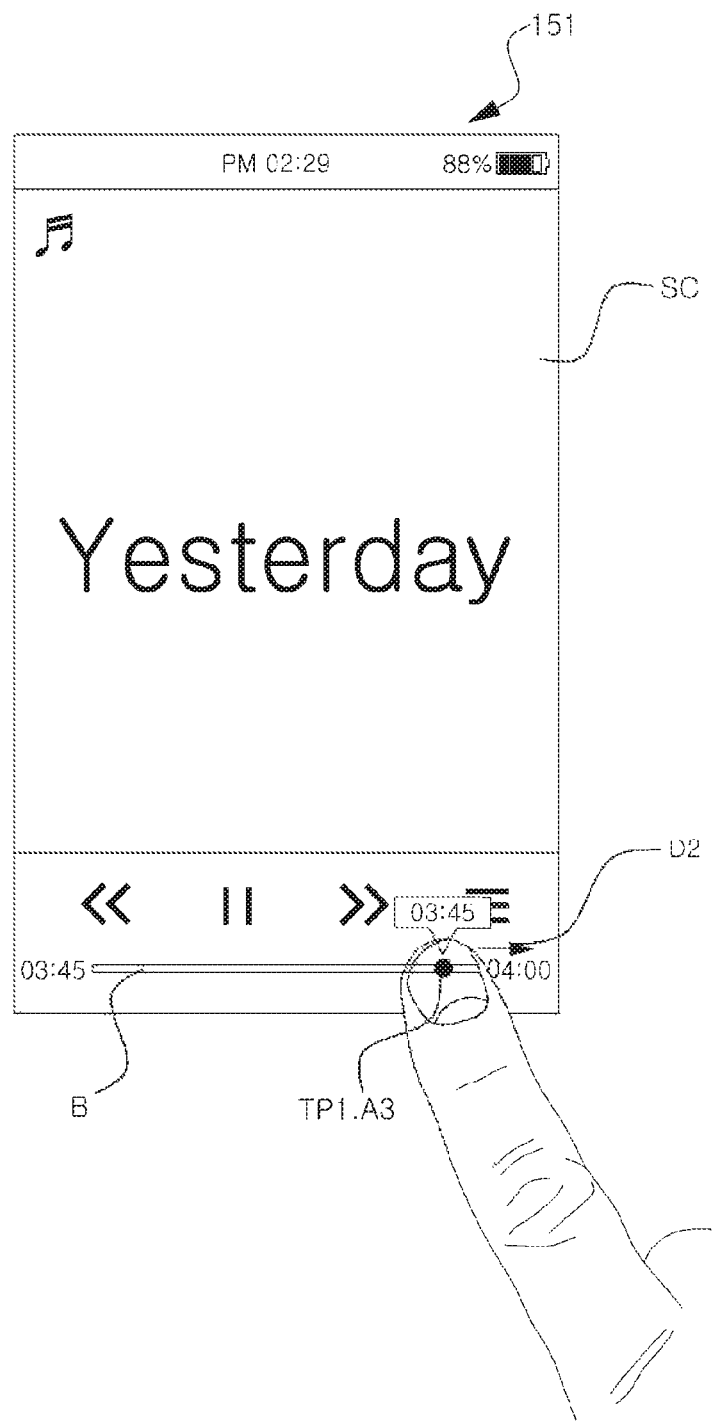
[Fig. 82]

[Fig. 83]
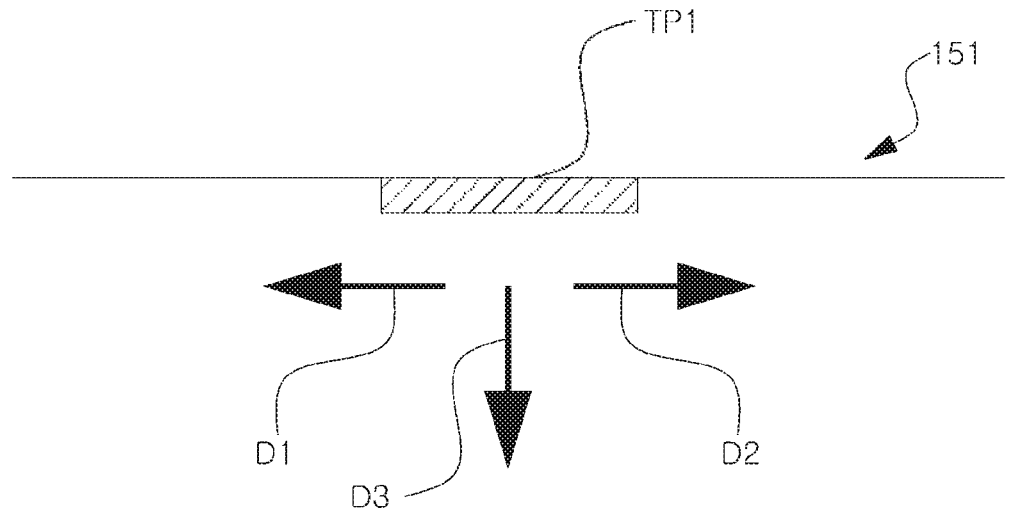
[Fig. 84]
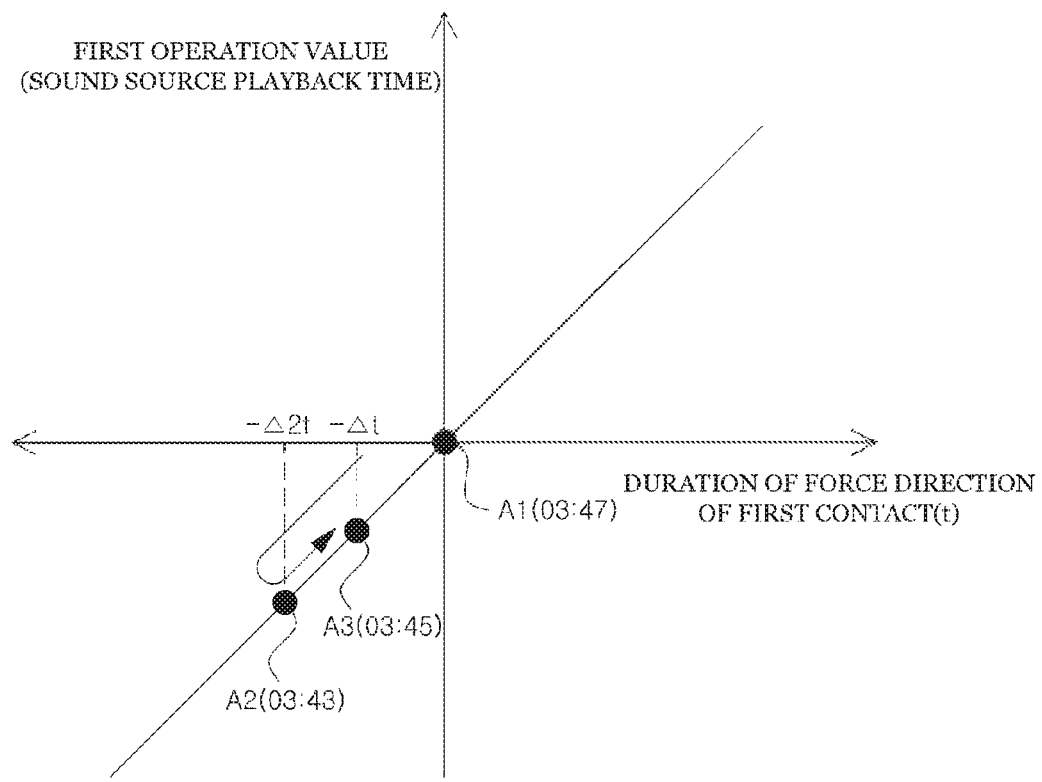

[Fig. 85]
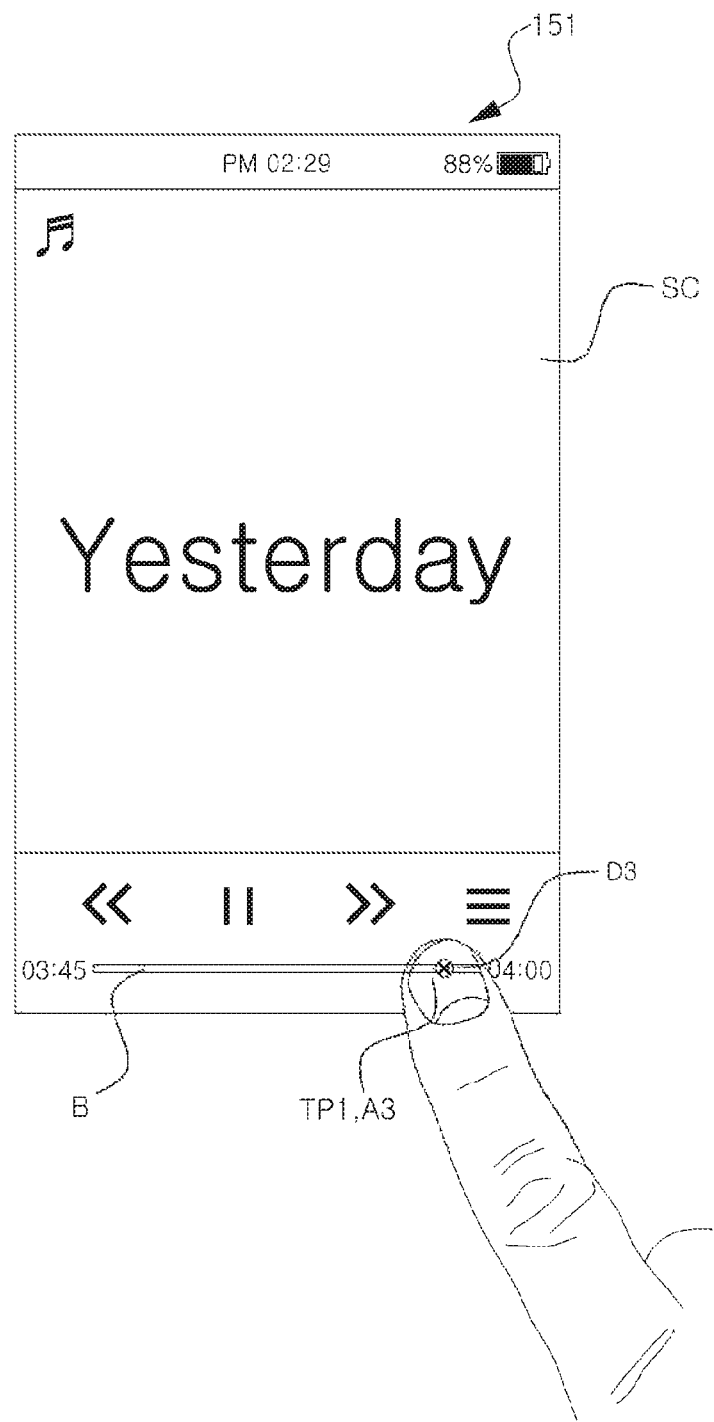

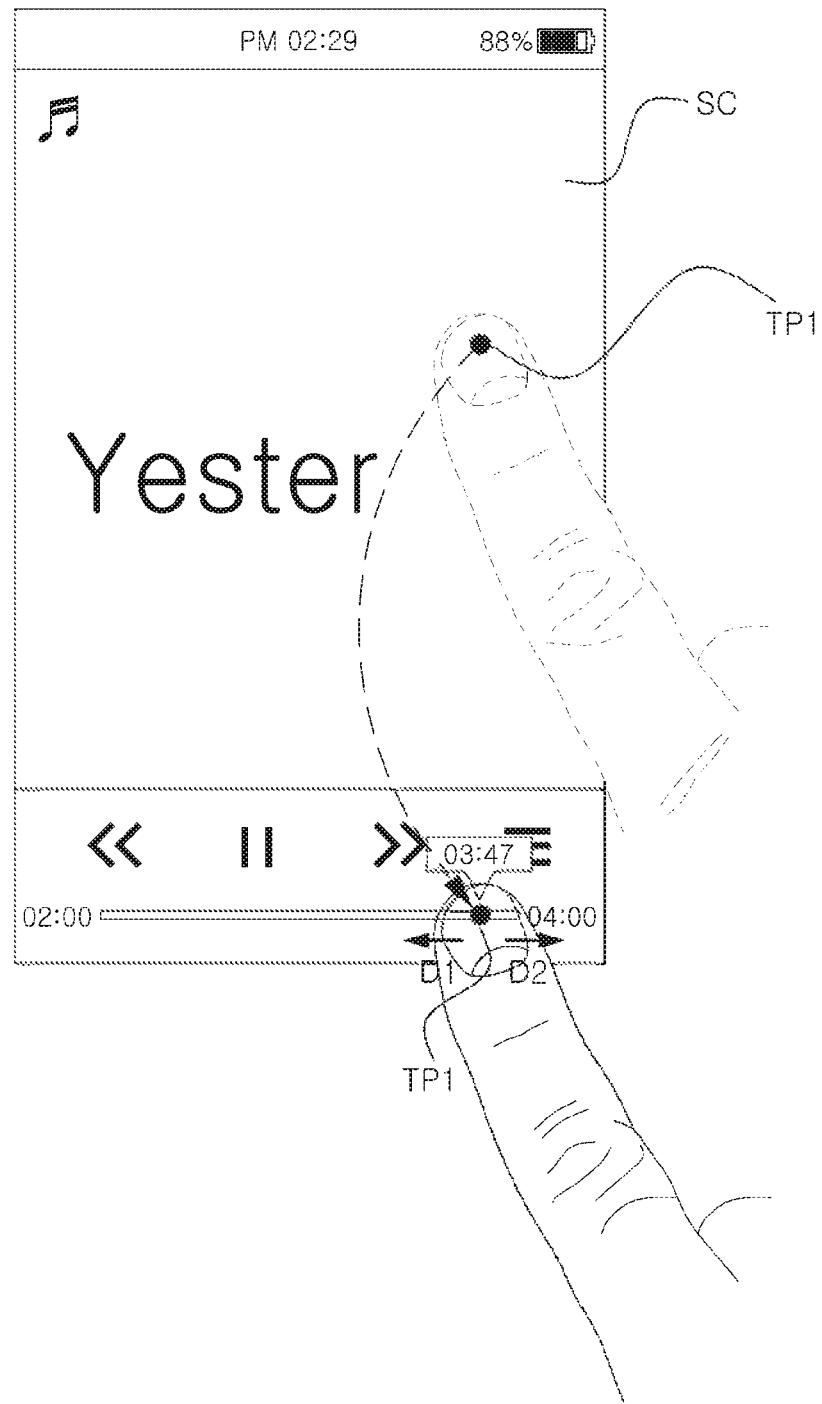
[Fig. 86]

[Fig. 87]
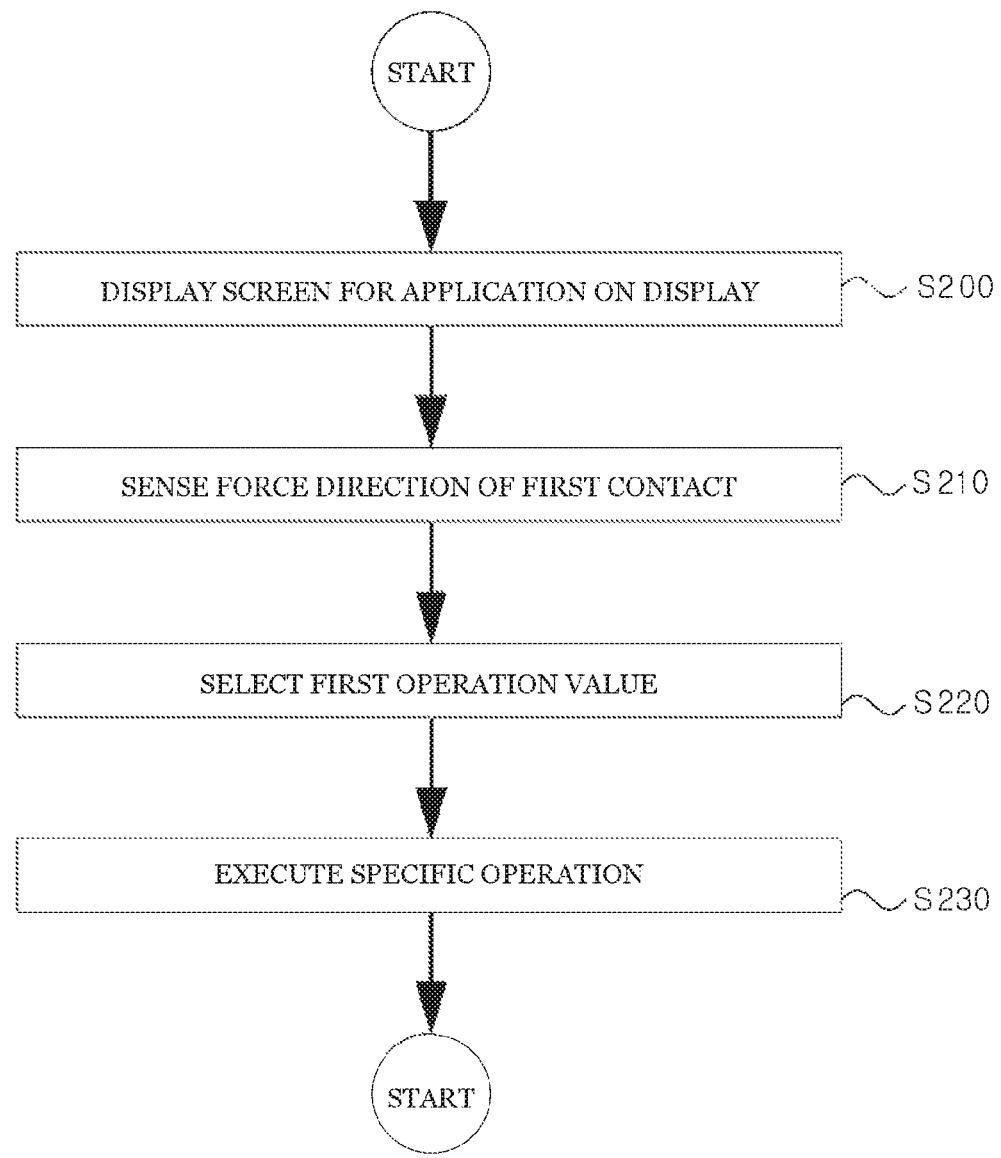

[Fig. 88]
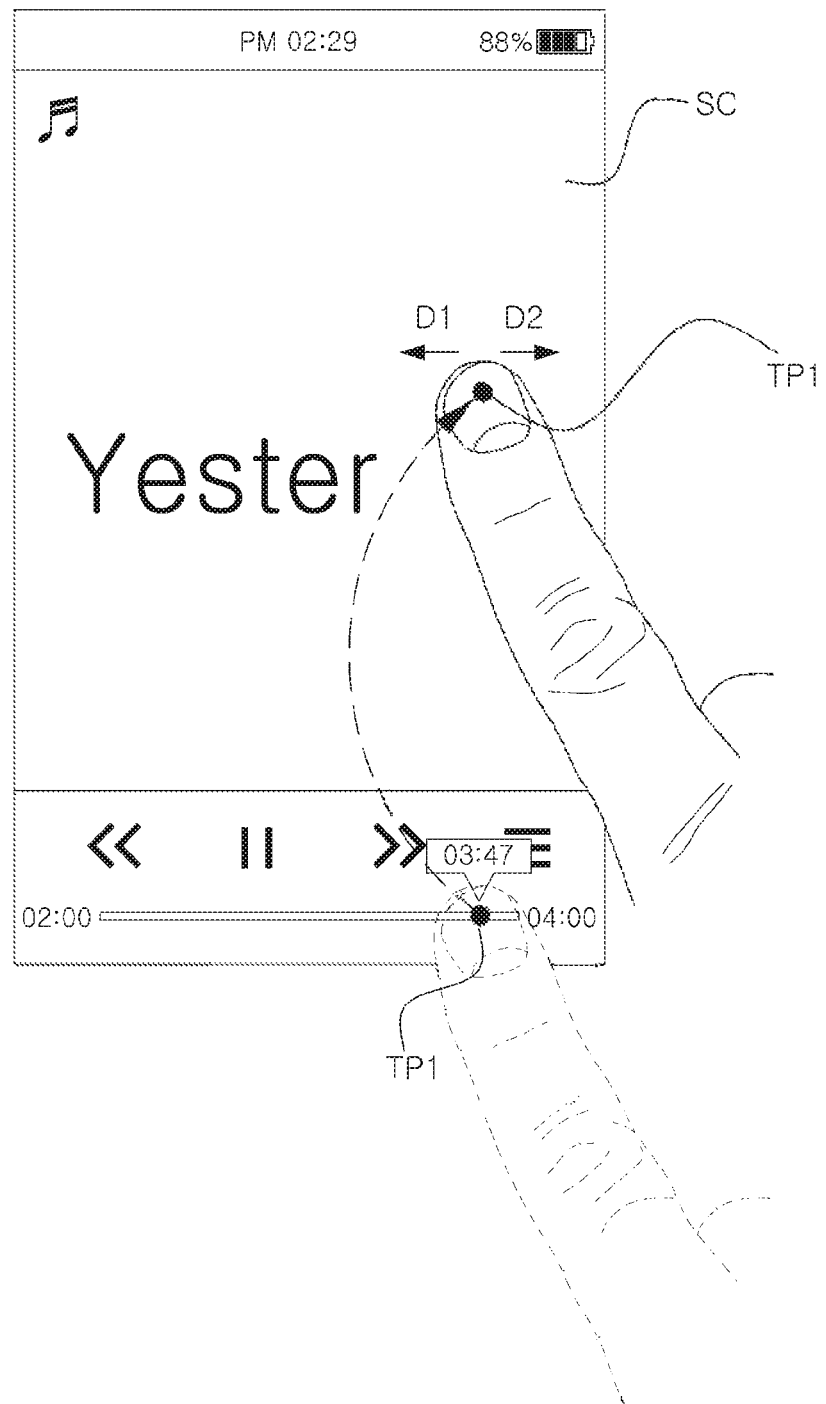

[Fig. 89]
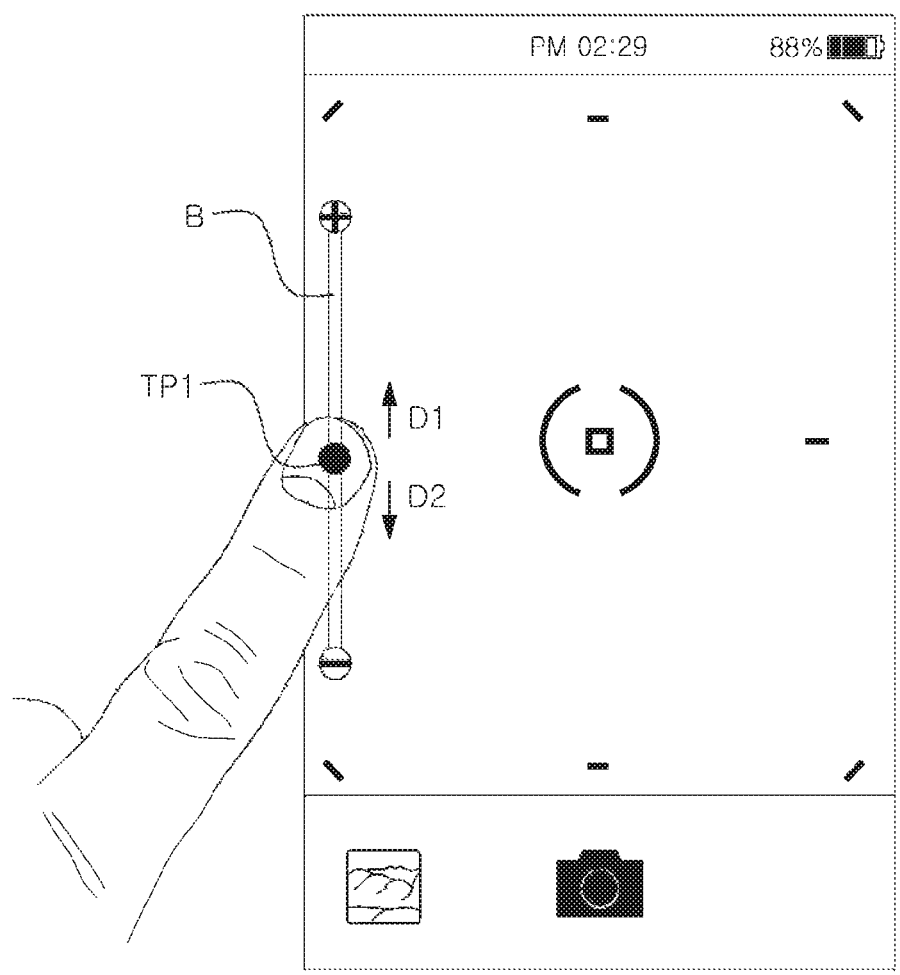

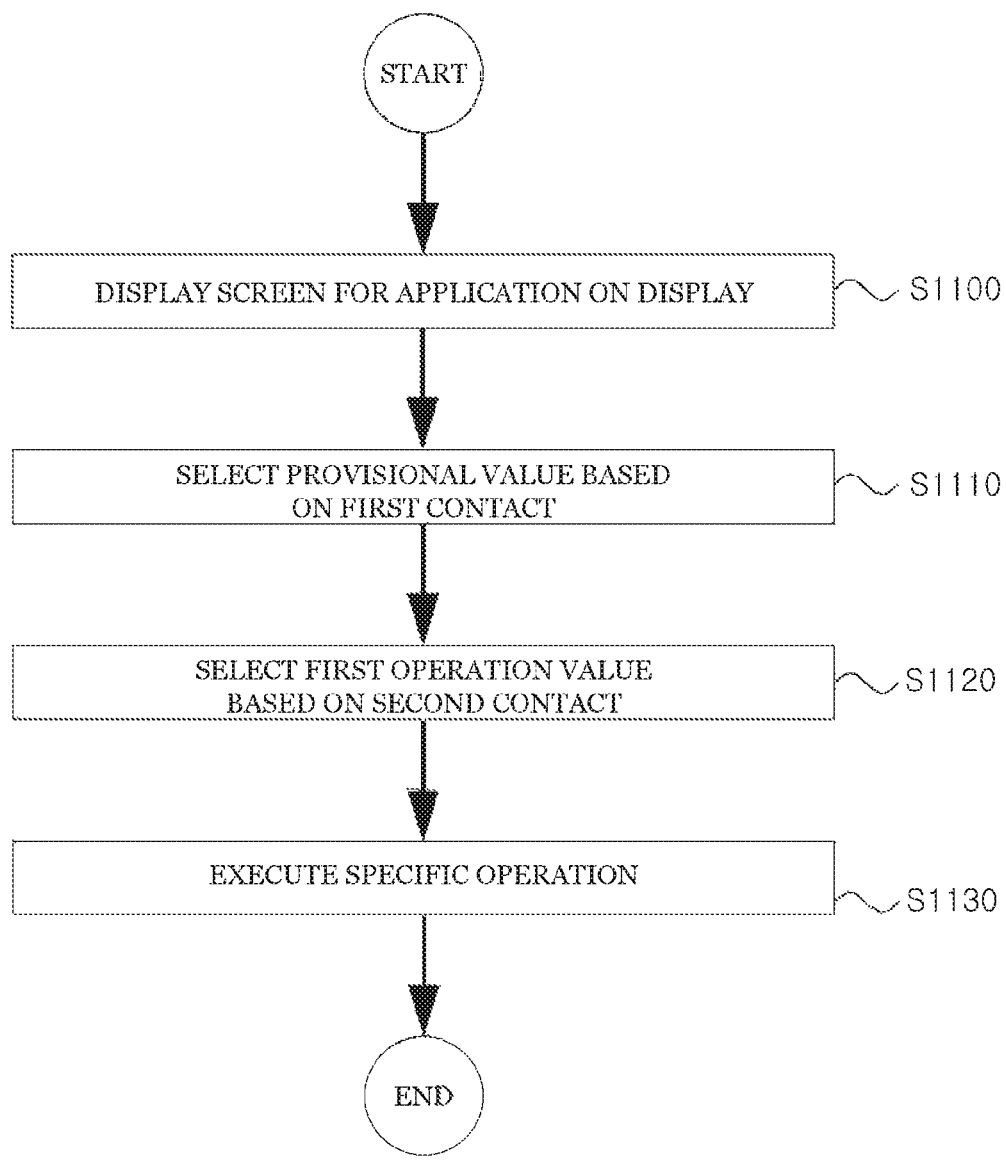
[Fig. 90]

[Fig. 91]
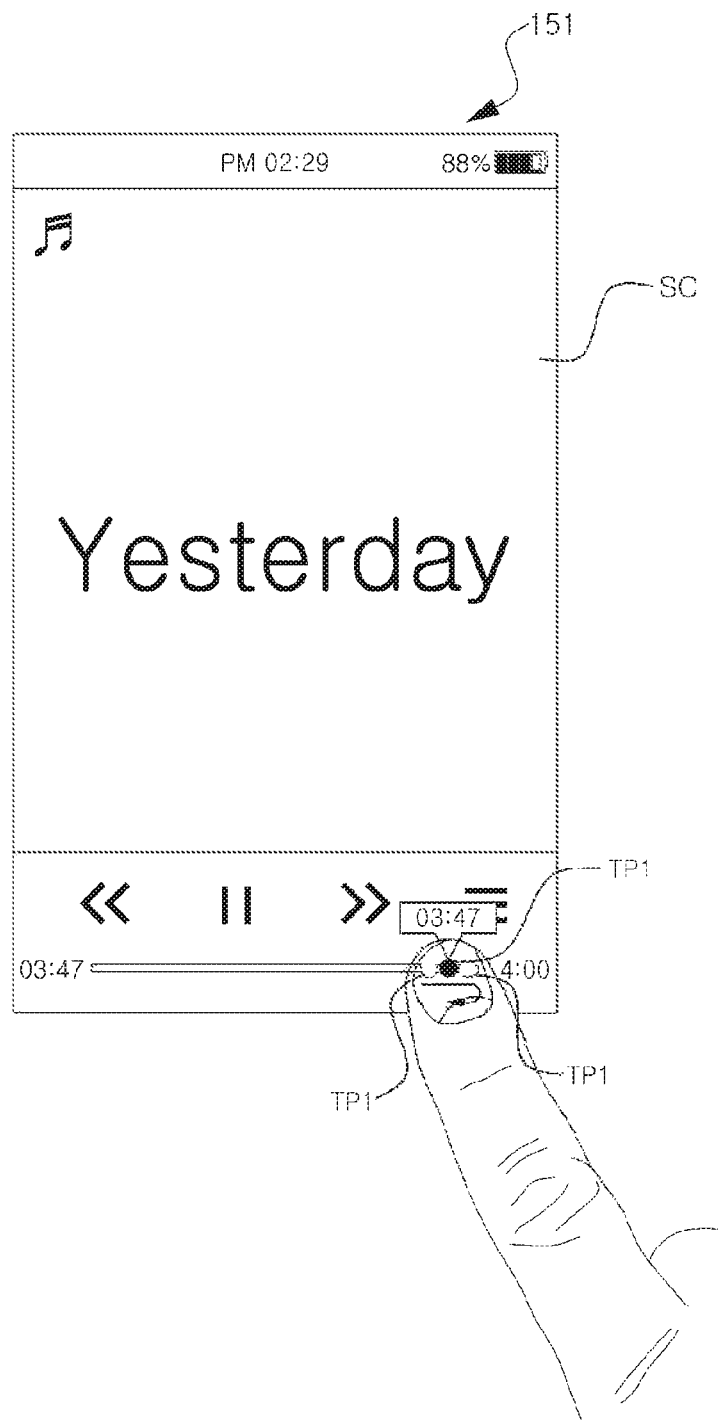

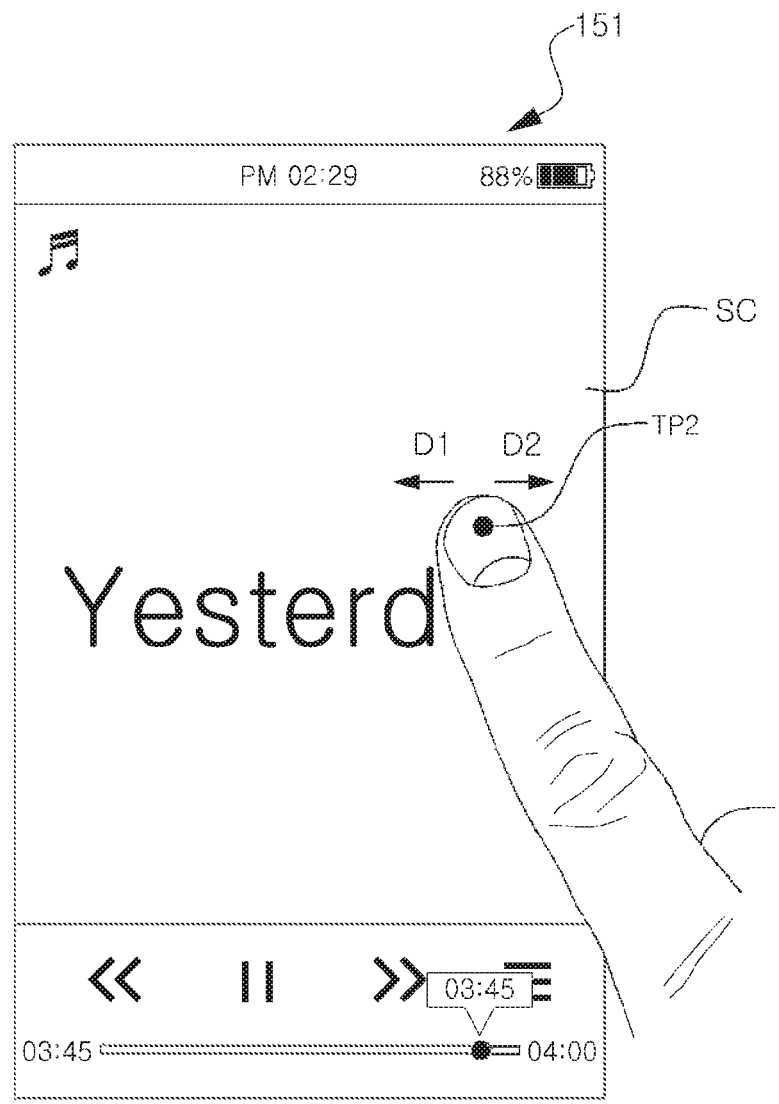
[Fig. 92]

[Fig. 93]
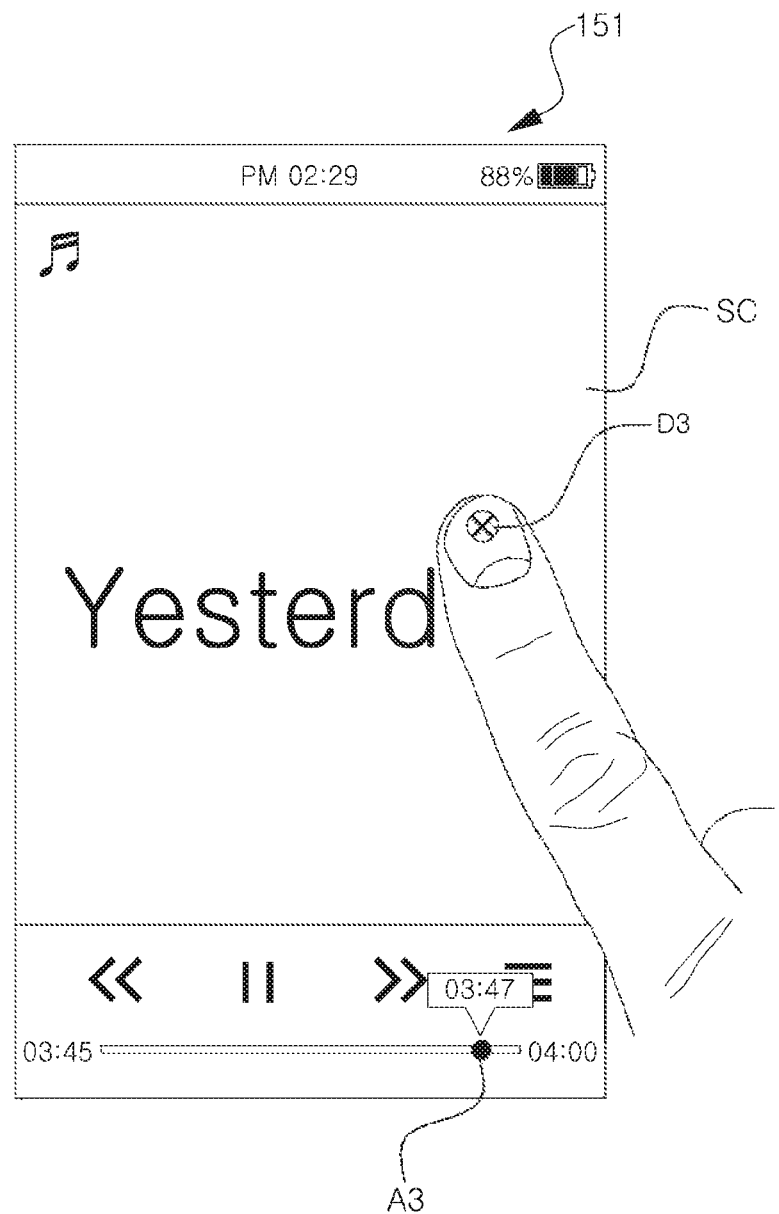

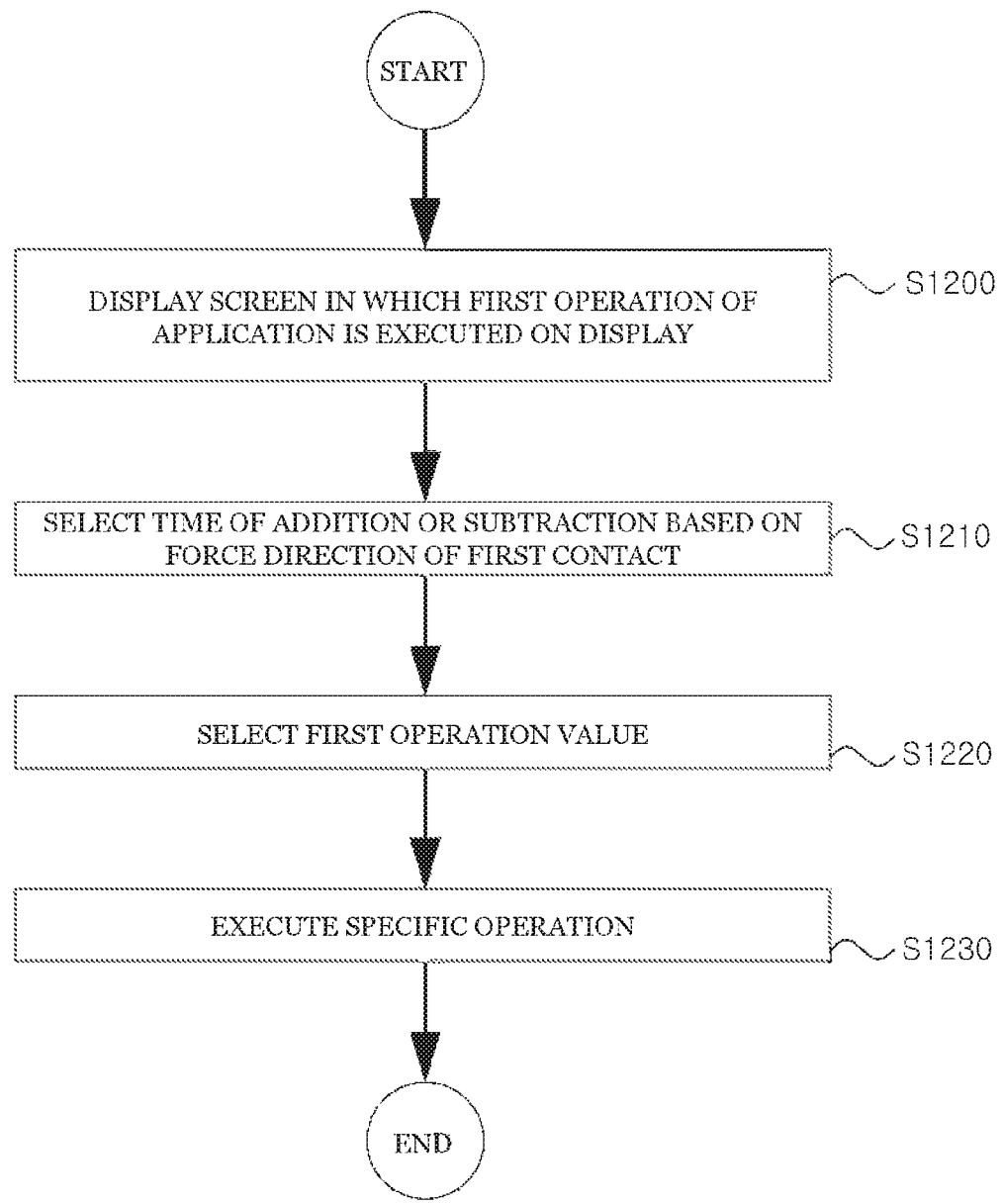
[Fig. 94]

[Fig. 95]

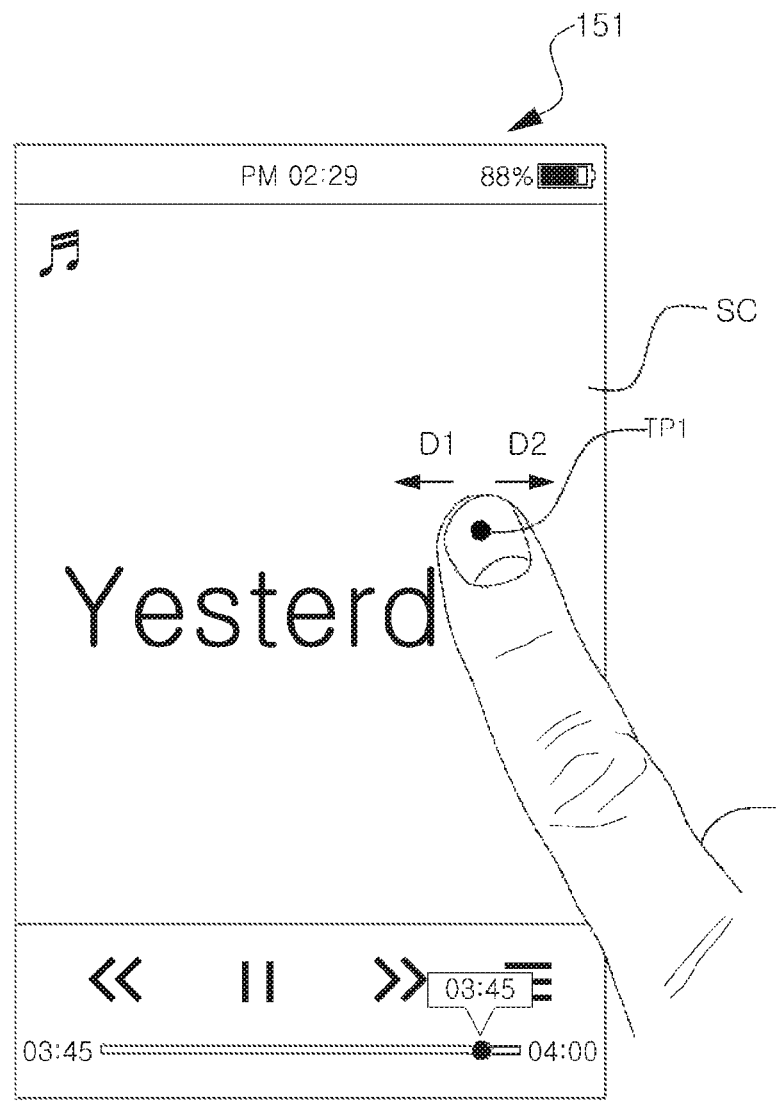
[Fig. 96]

ELECTRONIC DEVICE AND A CONTROL METHOD THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

1. Field of the Invention

The present invention relates to an electronic device for providing a user interface that may be easily and familiarly used by a user who uses a display, and a control method thereof.

2. Description of the Related Art

These days, there are many types of input devices such as a key pad, a mouse, a track ball, a touch pad, a joystick, a touch screen, or the like in order to manipulate a computer system. Such input devices are used to input data a user desires such as a letter, a symbol, a picture, or the like to a computer system and input a signal for requesting a specific command from the computer system.

Among the various input devices, recently, a touch input means such as a touch screen that can minimize and simplify a device by implementing an input means and an output function together is generally used.

A touch input means may sense contact with a touch region by a contact means such as a human body part of a user or a touch pen and may be classified into a resistive type, a capacitive type, and an optical type. The resistive-type touch input means senses a touch by recognizing a pressure applied to a contact point by the touch, the capacitive-type touch input means senses a touch through a change in an electric charge on a contact point caused by contact of a human body part of a user, and the optical-type touch input means detects a touch position using an infrared light camera and an infrared light lamp.

An initial method for providing a user interface using such a touch input means displays a manipulation means such as multiple buttons on a screen and performs a corresponding function based on a position where contact is sensed. Recently, in order to enhance a user's convenience and operability, a method of combining a variety of information such as a contact start position, a contact start time, a contact end position, and a contact end time, recognizing a user touch gesture such as tapping, dragging, sliding, and pinching, and executing various user commands according to the touch gesture is used. In addition, a method of recognizing multiple touch points in a touch region and executing a user command according to the number of, positions of, combinations of, and distance changes between the touch points.

Furthermore, recently, along with the development of organic light-emitting diode (OLED) technology, flexible display technology was developed. Much research has been conducted on various user interfaces using a flexible display.

However, a conventional user interface method using a touch has difficulty in user manipulation because a user makes a complex touch gesture or touches several points to draw a complex pattern. In addition, much research has been conducted on a user interface using the flexible display by changing the form of the flexible display while the flexible display is gripped with both hands. Thus, when a scheme in which several necessary commands are entered while the flexible display is gripped with both hands and an existing touch input scheme in which a touch gesture or a touch pattern is entered are combined with each other and used, the two-hand grip of the flexible display should be released in order to input a touch. Thus, it will be expected to have limitations.

In addition, the conventional user interface method has limitations in providing an instant response because it takes a certain time to perform and then recognize a touch gesture or touch pattern.

SUMMARY OF THE INVENTION

Technical Problem

The present invention is directed to providing an electronic device for providing a user interface that may overcome limitations of the conventional touch type user interface and may be easily and familiarly used by a user who uses a display including a flexible display, and a control method thereof.

Technical Solution

An electronic device according to an embodiment of the present invention may include a display configured to display a first screen; a force direction sensing unit configured to detect a force direction of a contact applied to one point by an external object; and a control unit configured to sense an occurrence of a predetermined event to logically divide the display into at least two regions including a first region and a second region, acquire a force direction of a first contact associated with the predetermined event from the force direction sensing unit, determine a region from among the at least two regions to display the first screen according to the force direction of the first contact, and display the first screen on the determined region.

The predetermined event may be one of an event 1) in which the display is flexed along a center portion of the display and an event 2) in which, when a first touch point is positioned at a first position and a second touch point is positioned at a second position, a force direction at the first touch point is opposite to a direction from the first position to the second position, and a force direction at the second touch point is opposite to a direction from the second position to the first position.

The control unit may further determine whether the first contact is associated with the predetermined event.

When the first contact is made between a first time that is within a predetermined time from an occurrence time of the predetermined event and a second time that is after the predetermined time from the occurrence time of the predetermined event, the control unit may determine that the first contact is associated with the predetermined event.

When the force direction of the first contact is sensed within the predetermined time after the occurrence of the predetermined event, the control unit may determine that the first contact is associated with the predetermined event.

The control unit may determine a region from among the two or more regions to display the first screen in consideration of only the force direction of the first contact irrespective of a contact position of the first contact.

An electronic device according to another embodiment of the present invention may include a display configured to display a first screen; a force direction sensing unit configured to sense a force direction of a contact applied to one point by an external object; and a control unit configured to sense an occurrence of a specific data reception event, sense a predetermined division event to logically divide the display into at least two regions including a first region and a second region, display a first screen in any one of the divided regions based on a force direction of a first contact sensed by the force direction sensing unit, and display a second screen including information regarding the specific data reception event in any one of the remaining regions.

The specific data reception event may be one of data reception events sensed within a predetermined time among data reception events sensed before the occurrence of the first contact.

When a data reception event sensed before the occurrence of the first contact is provided in plurality, the specific data reception event may be a data reception event corresponding to a time closest to an occurrence time of the first contact.

The specific data reception event may be one of data reception events sensed before the occurrence of the first contact, and the control unit may display the second screen including a list associated with the data reception events in any one of the remaining regions.

When another data reception event is sensed after the occurrence of the first contact, the control unit may additionally display a list associated with the other data reception event in the second screen.

The predetermined division event may be an event in which, when a first touch point is positioned at a first position and a second touch point is positioned at a second position, a force direction at the first touch point is opposite to a direction from the first position to the second position, and a force direction at the second touch point is opposite to a direction from the second position to the first position.

The first contact may correspond to at least one of the first touch point and the second touch point.

An electronic device according to another embodiment of the present invention may comprises a display logically divided into at least two regions including a first region and a second region; a force direction sensing unit configured to sense a force direction of a contact applied to one point by an external object; and a control unit configured to acquire a force direction of a first contact with a first position on the display through the force direction sensing unit, and control a first application displayed in the first region or a second application displayed in the second region based on the acquired force direction of the first contact.

The control unit may acquire the force direction of the first contact with the first position included in the first region through the force direction sensing unit, acquire a force direction of a second contact with a second position included in the second region through the force direction sensing unit, and control the first application displayed in the first region and the second application displayed in the second region based on the acquired force direction of the first contact and the acquired force direction of the second contact, respectively.

The control unit may control the first application and the second application independently from each other.

The control unit may select any one from a list including at least one piece of information included in the first application based on the force direction of the first contact sensed by the force direction sensing unit, or select any one from a list including at least one piece of information included in the second application based on the force direction of the second contact sensed by the force direction sensing unit.

The control unit may acquire a force direction of a third contact with a third position on the display through the force direction sensing unit and deactivate control of an application displayed in a region not including the third position.

The control unit may control an application displayed in a region including the third position based on the acquired force direction of the first contact.

When the force direction of the first contact is sensed within the predetermined time after the force direction of the third contact is sensed, the control unit may control the application displayed in the region including the third position based on the force direction of the first contact.

Advantageous Effects

According to the present invention, it is possible to provide a user interface that may allow a user to easily manipulate division and/or integration of a screen.

According to the present invention, it is possible to conveniently divide and/or integrate the screen by sensing a force direction of a contact and/or a touch and using the sensed force direction to divide and/or integrate the screen.

According to the present invention, it is possible to easily control a division state and/or an integration state of a display without the user needing to detach the hand gripping an electronic device from the electronic device.

According to the electronic device and the control method thereof according to the present invention, it is possible to provide a user interface that may allow the user to easily manipulate the division of the screen.

According to the present invention, it is possible to conveniently divide the screen and/or control the divided screen by sensing the force direction of the contact and/or the touch and using the sensed force direction to divide the screen and/or control the divided screen.

According to the present invention, it is possible to easily divide the display and/or control the state of the divided display without the user needing to detach the hand gripping an electronic device from the electronic device.

According to the present invention, it is possible to conveniently control the divided screen by sensing the force direction of the contact and/or touch and using the sensed force direction to control the divided screen.

According to the present invention, it is possible to easily control the state of the divided display without the user needing to detach the hand gripping the electronic device from the electronic device.

According to the present invention, it is possible to provide a user interface that allows the user to easily control a specific operation executed on any application.

According to the present invention, it is possible to conveniently control the specific operation by sensing the force direction of the contact and/or the touch and using the sensed force direction to control a specific operation executed on any application.

BRIEF DESCRIPTION OF THE DRAWINGS

FIG. 1 is a block diagram of an electronic device according to some embodiments of the present invention.

FIG. 2 is a diagram for describing an exterior of an electronic device having a flexible display according to some embodiments of the present invention.

FIG. 3 is a diagram for describing another exterior of an electronic device having a flexible display according to some embodiments of the present invention.

FIG. 4 is a cross sectional view showing a section of the electronic device shown in FIG. 2A taken along line I-I'.

FIG. 5 is a cross sectional view showing a section of the electronic device shown in FIG. 3A taken along line J-J'.

FIG. 6 is a schematic diagram showing an example of a process of detecting a force direction using force intensity according to an embodiment of the present invention.

FIG. 7 is a flowchart for describing a first control method of an electronic device according to the present invention.

FIGS. 8 to 14 are diagrams for describing the first control method of an electronic device according to the present invention.

FIG. 15 is a flowchart for describing a second control method of an electronic device according to the present invention.

FIGS. 16 to 23 are diagrams for describing the second control method of an electronic device according to the present invention.

FIG. 24 is a flowchart for describing a third control method of an electronic device according to the present invention.

FIGS. 25 to 29 are diagrams for describing the third control method of an electronic device according to the present invention.

FIG. 30 is a flowchart for describing a fourth control method of an electronic device according to the present invention.

FIGS. 31 to 34 are diagrams for describing the fourth control method of an electronic device according to the present invention.

FIGS. 35 to 42 are diagrams for describing some control associated examples about a divided region in the fourth control method of an electronic device according to the present invention.

FIGS. 43 to 50 are diagrams for describing some examples about a specific data reception event used in the fourth control method of an electronic device according to the present invention.

FIG. 51 is a flowchart for describing a fifth control method of an electronic device according to the present invention.

FIG. 52 is a diagram for describing the fifth control method of an electronic device according to the present invention.

FIG. 53 is a flowchart for describing a sixth control method of an electronic device according to the present invention.

FIGS. 54 to 56 are diagrams for describing the sixth control method of an electronic device according to the present invention.

FIG. 57 is a flowchart for describing a seventh control method of an electronic device according to the present invention.

FIG. 58 is a flowchart for describing an eighth control method of an electronic device according to the present invention.

FIGS. 59 to 61 are diagrams for describing the eighth control method of an electronic device according to the present invention.

FIG. 62 is a flowchart for describing a ninth control method of an electronic device according to the present invention.

FIGS. 63 to 67 are diagrams for describing the ninth control method of an electronic device according to the present invention.

FIGS. 68 to 72 are other diagrams for describing the ninth control method of an electronic device according to the present invention.

FIGS. 73 to 78 are still other diagrams for describing the ninth control method of an electronic device according to the present invention.

FIG. 79 is a flowchart for describing a tenth control method of an electronic device according to the present invention.

FIGS. 80 to 89 are diagrams for describing the tenth control method of an electronic device according to the present invention.

FIG. 90 is a flowchart for describing an eleventh control method of an electronic device according to the present invention.

FIGS. 91 to 93 are diagrams for describing the eleventh control method of an electronic device according to the present invention.

FIG. 94 is a flowchart for describing a twelfth control method of an electronic device according to the present invention.

FIGS. 95 and 96 are diagrams for describing the twelfth control method of an electronic device according to the present invention.

DETAILED DESCRIPTION OF THE PREFERRED EMBODIMENT

Best Mode of the Invention

An electronic device according to an embodiment of the present invention may include a display configured to display a first screen; a force direction sensing unit configured to detect a force direction of a contact applied to one point by an external object; and a control unit configured to sense an occurrence of a predetermined event to logically divide the display into at least two regions including a first region and a second region, acquiring a force direction of a first contact associated with the predetermined event from the force direction sensing unit, determining a region from among the at least two regions to display the first screen according to the force direction of the first contact, and displaying the first screen on the determined region.

Modes of the Invention

The above-described objects, characteristics, and advantages of the present invention will be more apparent by the following detailed description with reference to the accompanying drawings. Since the present invention may be variously modified and have several exemplary embodiments, specific exemplary embodiments will be shown in the accompanying drawings and be described in detail in a detailed description.

In the drawings, the thicknesses of layers and regions may be exaggerated for clarity. Also, when it is mentioned that an element or layer is 'on' another element or layer, the element or layer may be formed directly on another element or layer, or a third element or layer may be interposed therebetween. Like reference numerals refer to like elements throughout the specification.

Moreover, detailed descriptions about well-known functions or configurations associated with the present invention will be ruled out in order to not unnecessarily obscure the essence of the present invention. It should also be noted that, although ordinal numbers (such as first and second) are used in the following description, they are used only to distinguish similar components.

Hereinafter, an element according to the present invention will be described in detail with reference to the accompanying drawings. The suffixes "module" and "unit" for elements used in the following description are given or used interchangeably only for facilitation of preparing this specification, and thus they are not granted a specific meaning or function.

An electronic device described herein may include a mobile terminal, such as a cellular phone, a smartphone, a laptop computer, a digital broadcasting terminal, a personal digital assistant (PDA), a portable multimedia player (PMP), and a navigation device, as well as a stationary terminal, such as a digital TV and a desktop computer.

The control method of an electronic device according to the present invention may be applied to a device having a means capable of sensing a touch and/or a contact of an external object (e.g., some part of a human body such as a finger of a user, and/or a touch pen).

The means capable of sensing the touch and/or the contact may be a general touch input means such as a touch screen or a touch pad. However, the sensing means may further sense a force direction of the touch and/or the contact in addition to a function of sensing a position of the touch and/or the contact that may be implemented by the touch screen and/or touch pad.

In this case, the means capable of sensing the touch and/or the contact may also be formed integrally with the conventional touch screen and configured to be able to sense the touch and/or the contact with the touch screen. Alternatively, the means may be included in an element such as a portion of a housing of a device to which the control method of an electronic device according to the present invention is applied or a grip portion that may be provided separately to a portion of a boundary of a touch screen and may be configured to sense a touch and/or a contact with the portion of the housing and/or the grip portion. That is, it should be noted that the means capable of sensing the touch and/or the contact may be disposed to sense the force direction of the touch and/or the contact with another component rather than the touch screen and/or the touch pad.

The control method of an electronic device according to the present invention may be applied to any type of device as long as the device includes the means capable of sensing the touch and/or the contact. That is, the device to which the control method of an electronic device according to the present invention may be applied may include a smartphone, a cellular phone, a tablet PC, a notebook, a desktop, a PDA, etc.

In the following description, an electronic device according to some embodiments of the present invention will be simply described, and then the control method of an electronic device according to some embodiments of the present invention will be described in detail.

Configuration of an Electronic Device

FIG. 1 is a block diagram of an electronic device according to some embodiments of the present invention.

An electronic device 100 may include a wireless communication unit 110, an audio/video (A/V) input unit 120, a user input unit 130, a sensing unit 140, an output unit 150, a memory 160, an interface unit 170, a control unit 180, a power supply unit 190 and the like. FIG. 1 shows the electronic device 100 having components, although all the illustrated components are not a requirement, and more or less components may alternatively be implemented.

The components will be described below in sequence.

The wireless communication unit 110 may include one or more modules that permit wireless communication between the electronic device 100 and a wireless communication system or a network within which the electronic device 100 is located. For example, the wireless communication unit 110 may include a broadcast receiving module 111, a mobile communication module 112, a wireless Internet module 113, a short-range communication module 114, a location information module 115 and/or the like.

The broadcast receiving module 111 receives a broadcast signal and/or broadcast associated information from an external broadcast managing server via a broadcast channel.

The broadcast channel may include a satellite channel and a terrestrial channel. The broadcast managing server may include a server that generates and transmits a broadcast signal and/or broadcast associated information, or a server that receives a pre-generated broadcast signal and/or broadcast associated information and transmits the pre-generated broadcast signal and/or the broadcast associated information to a terminal. The broadcast signal may include not only a TV broadcast signal, a radio broadcast signal, a data broadcast signal, but also a mixed signal of a data broadcast signal and a TV broadcast signal or a radio broadcast signal.

The broadcast associated information may include information on a broadcast channel, a broadcast program, or a broadcast service provider. The broadcast associated information may be provided over a communication network. In this case, the broadcast associated information may be received by the mobile communication module 112.

The broadcast associated information may include various forms. For example, the information may be provided in a form such as an electronic program guide (EPG) of Digital Multimedia Broadcasting (DMB) or an electronic service guide (ESG) of Digital Video Broadcasting-Handheld (DVB-H).

The broadcast receiving module 111 may receive a broadcast signal using various broadcast systems and may receive a digital broadcast signal using a digital broadcast system such as Digital Multimedia Broadcasting Terrestrial (DMBT), Digital Multimedia Broadcasting Satellite (DMBS), Media Forward Link Only (MediaFLO), Digital Video Broadcast Handheld (DVBH), Integrated Services Digital Broadcast Terrestrial (ISDBT), etc. It will be appreciated that the broadcast receiving module 111 may be configured to be suitable for another broadcast system in addition to the above-described digital broadcast systems.

The broadcast signal and/or the broadcast associated information received through the broadcast receiving module 111 may be stored in the memory 160.

The mobile communication module 112 transmits wireless signals to or receives wireless signals from at least one of a base station, an external terminal, and a server over a mobile communication network. The wireless signals may include voice call signals, video call signals, or various types of data according to transmission and reception of text and/or multimedia messages.

The wireless Internet module 113 is a module for supporting wireless Internet access. This module may be internally or externally coupled to the electronic device 100. Examples of the wireless Internet technology may include Wireless LAN (WLAN; Wi-Fi), Wireless Broadband (WIBRO), World Interoperability for Microwave Access (Wimax), High Speed Downlink Packet Access (HSDPA), etc.

The short-range communication module 114 is a module for supporting short-range communications. Examples of the short-range communication technology include Bluetooth, Radio Frequency Identification (RFID), Infrared Data Association (IrDA), Ultra-WideBand (UWB), ZigBee, WiHD, WiGig, etc.

The location information module 115 is a module for identifying or otherwise obtaining a location of the electronic device 100. A Global Position System (GPS) module is a representative example of the location information module. According to the current technology, the GPS module 115 may calculate information on distances between one point or object and three or more satellites, and information on a time when distance information is measured, and apply trigonometry to the obtained distance information to obtain three-dimensional position information on the point or object according to latitude, longitude, and altitude at a predetermine time. Furthermore, a method of calculating position and time information using three satellites and correcting the calculated position and time information using another satellite may also be used. In addition, the GPS module 115 may continuously calculate a current position in real time and calculate velocity information using the location information.

Referring to FIG. 1, the A/V input unit 120 is configured to receive an audio or video signal, and may include a camera 121, a microphone 122, etc. The camera 121 processes an image frame of a still picture or video obtained by an image sensor in a video call mode or image capturing mode. The processed image frame may be displayed on a display 151.

The image frame processed by the camera 121 may be stored in the memory 160 or transmitted to the outside via the wireless communication unit 110. The camera 121 may be provided as two or more according to an aspect of the configuration of the terminal.

The microphone 122 may receive an external audio signal in a phone call mode, a recording mode, and a voice recognition mode and may process and convert the received audio signal into electric voice data. In the phone call mode, the processed voice data may be converted and output in a form that is transmittable to a mobile communication base station through the mobile communication module 112. Various noise removal algorithms for removing noise generated while the external audio signal is received may be implemented in the microphone 122.

The user input unit 130 generates input data used for a user to control an operation of a terminal. The user input unit 130 may include a keypad, a dome switch, a touch pad (e.g., static pressure/capacitance), a jog wheel, or a jog switch.

However, the user input unit 130 may include a force direction sensing unit 131 that is capable of sensing a force direction of a touch and/or a contact. The force direction sensing unit 131 may not only include a function of sensing a position of the touch and/or the contact, which may be implemented by a general touch screen and/or touch pad, but also be the means further capable of detecting a force direction of the touch or the contact.

The term "force direction" used herein may conceptually include a force acting in a direction parallel to a touch surface (hereinafter referred to as a shear force), which cannot be detected by a conventional touch sensor. That is, the force direction sensing unit 131 according to an embodiment of the present invention may also sense a direction of a shear force acting in a direction parallel to the touch surface in addition to a direction of a force applied in a direction perpendicular to the touch surface.

The force direction sensing unit 131 may be formed integrally with a conventional touch screen and be configured to be capable of sensing the touch and/or contact with the touch screen. Alternatively, the force direction sensing unit 131 may be included in an element such as a portion of a housing of a device to which the control method of an electronic device according to the present invention is applied or a grip portion that may be provided separately to a portion of a boundary of a touch screen and may be configured to sense a touch and/or a contact with the portion of the housing and/or the grip portion. The detailed operation of the force direction sensing unit 131 will be described in detail later.

The sensing unit 140 senses a current status (or state) of the electronic device 100, such as an opened or closed state of the electronic device 100, a location of the electronic device 100, the presence or absence of a user contact with the electronic device 100, the orientation of the electronic device 100, and acceleration and/or deceleration of the electronic device 100, to generate a sensing signal for controlling the operation of the electronic device 100. For example, when the electronic device 100 is implemented as a slide type mobile phone, the sensing unit 140 may sense whether the slide phone is opened or closed. In addition, the sensing unit 140 may also be responsible for a sensing function associated with whether the power supply unit 190 supplies power or whether the interface unit 170 is coupled with an external device. The sensing unit 140 may include a posture sensor 141 and/or a proximity sensor 142.

The output unit 150 is intended to generate an output related to visual, auditory, and tactile senses and may include a display 151, an audio output module 152, an alarm 153, and a haptic module 154.

The display 151 outputs information processed by the electronic device 100. For example, when the electronic device is in a phone call mode, the display 151 displays a user interface (UI) or a graphic user interface (GUI), which is associated with the call. When the electronic device 100 is in a video call mode or an image capturing mode, the display 151 displays a captured image and/or a received image, a UI, or a GUI.

The display 151 may include at least one of a liquid crystal display (LCD), a thin film transistor-LCD (TFT-LCD), an organic light emitting diode (OLED) display, a flexible display, and a three-dimensional (3D) display.

Some of the above displays may be configured as a transparent or light-transmission type display through which the outside may be viewed. This may be called a transparent display. An example of the transparent display includes a transparent LCD. A rear portion of the display 151 may also have a light-transmission structure. Such a structure allows a user to view an object located at the rear portion of the terminal body through a portion which is occupied by the display 151 of the terminal body.

According to a type of implementing the electronic device 100, two or more display units 151 may be provided. For example, a plurality of display units may be spaced apart or integrally formed on one surface of the electronic device 100, and may also be arranged on different surfaces of the electronic device 100. Alternatively, the display 151 may be logically divided into two or more regions.

In a case where the display 151 and a sensor for sensing a touch operation (hereinafter referred to as a "touch sensor") are mutually layered (hereinafter, simply referred to as a "touch screen"), the display 151 may be used as an input device, as well as an output device. The touch sensor may have the form of, for example, a touch film, a touch sheet, or a touch pad.

The touch sensor may be configured to convert a variation in capacitance that occurs at a specific region of the display 151 or a pressure exerted at a specific region of the display 151 into an electrical input signal.

When a touch input is applied to the touch sensor, a signal or signals corresponding to the touch input are sent to a touch controller. The touch controller processes the signal(s) to generate corresponding data, and transmits the data to the control unit 180. Accordingly, the control unit 180 may determine what region of the display 151 has been touched.

Referring to FIG. 1, the proximity sensor 142 may be provided to an internal region of an electronic device enclosed by the touch screen or around the touch screen. The proximity sensor 142 denotes a sensor that detects a presence or non-presence of an object approaching a predetermined detecting surface or an object existing around the proximity sensor 142 using the strength of an electromagnetic field of the object or an infrared ray without mechanical contact. The proximity sensor 142 has a longer life and a wider utility than a contact type sensor.

Examples of the proximity sensor 142 include a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like.

When the touch screen is a capacitive-type touch screen, the proximity of a pointer may be detected using a variation of an electric field according to the proximity of the pointer. In this case, the touch screen (i.e., touch sensor) may be classified as a proximity sensor.

In the following description, for convenience of description, in order to allow the pointer to be recognized as being positioned on the touch screen, an action where a pointer approaches without contacting the touch screen is called a "proximity touch," and an action where a pointer actually touches the touch screen is called a "contact touch." The meaning of the position on the touch screen proximity touched by the pointer may define a position of the pointer that vertically opposes the touch screen when the pointer performs the proximity touch. However, when the proximity touch and the contact touch need not be described separately, the term "touch" or "touch input" includes both an input by the proximity touch and an input by the contact touch.

The proximity sensor 142 may detect a proximity touch and a proximity touch pattern (e.g., a proximity touch distance, a proximity touch direction, a proximity touch speed, a proximity touch duration, a proximity touch position, a proximity touch movement state, etc.). Information corresponding to the detected proximity touch action and the detected proximity touch pattern may be output to the touch screen.

The audio output module 152 may function to output audio data that is received from the wireless communication unit 110 or is stored in the memory 160 in a call-receiving mode, a call-placing mode, a recoding mode, a voice recognition mode, a broadcast reception mode and/or the like. The audio output module 152 outputs an audio signal relating to a particular function (e.g., a call received, a message received, etc.) performed by the electronic device 100. The audio output module 152 may include a receiver, a speaker, a buzzer, and so on.

The alarm 153 outputs a signal for announcing an occurrence of a particular event of the electronic device 100. Examples of the event may include call reception, message reception, key signal input, and touch input. The alarm 153 may output a signal for announcing the event occurrence by way of a video signal, an audio signal, or in another form, for example, as vibration. The video signal or the audio signal may be output via the display 151 or the audio output module 152.

The haptic module 154 generates various tactile effects that may be sensed by a user. Vibration may be representative of the tactile effects generated by the haptic module 154. An intensity and a pattern of the vibration generated by the haptic module 154 are controllable. For example, different vibrations may be output by being combined or may be output in sequence.

The haptic module 154 may generate various tactile effects as well as vibration. For example, the haptic module 154 may generate an effect of stimulation via the arrangement of pins vertically moving against a contact skin surface, an effect of stimulation via a suction power of air through an injection/suction hole, an effect of stimulation via rubbing a skin surface, an effect of stimulation via contact with an electrode, an effect of stimulation via an electrostatic force, an effect of stimulation via a warm or cold sense using an endothermic or exothermic device and/or the like.

The haptic module 154 may enable a user to sense a tactile effect through a muscle sense of a finger of the user, an arm or the like as well as to transfer the tactile effect through a direct contact. Two haptic modules 154 or more may be provided based on a corresponding configuration type of the mobile terminal 100.

The memory 160 may store programs for operating the control unit 180. The memory 160 may temporarily store input/output data (e.g., phonebook data, message data, a still image, and a video). The memory 160 may store data for various patterns of vibration and sound that are output in case of a touch input to the touch screen.

The memory 160 may include at least one of storage devices including a flash memory, a hard disk, a multimedia card micro type memory, a card-type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, and a magnetic or optical disk. The electronic device 100 may operate in association with a web storage for performing a storage function of the memory 160 on the Internet.

The interface unit 170 functions as a passage with all external devices connected to the electronic device 100. The interface unit 170 receives data from the external devices or is supplied with power, and then transfers the data or power to respective elements of the electronic device 100 or enables data within the electronic device 100 to be transferred to the external devices. For example, the interface unit 170 may include a wired/wireless headset port, an external charger port, a wired/wireless data port, a memory card port, a port for coupling to a device having an identity module, an audio input/output (I/O) port, a video I/O port, an earphone port, and/or the like.

The identity module is a chip for storing various kinds of information for authenticating a use authority of the electronic device 100 and may include a User Identify Module (UIM), a Subscriber Identity Module (SIM), a Universal Subscriber Identity Module (USIM) and/or the like. A device having an identity module (hereinafter referred to as an "identity device") may be manufactured as a smart card. The identity device may be connectible to the terminal 100 via a port.

When the electronic device 100 is connected to an external cradle, the interface unit 170 may become a passage for supplying the electronic device 100 with power from the cradle or a passage for delivering various command signals input from the cradle by the user to the electronic device 100. Each of the various command signals input from the cradle or the power may operate as a signal enabling the electronic device 100 to recognize that it is correctly loaded in the cradle.

The control unit 180 typically controls overall operations of the electronic device 100. For example, the control unit 180 performs control and processing associated with voice calls, data communications, video calls, etc. The control unit 180 may include a multimedia module 181 that provides multimedia playback. The multimedia module 181 may be implemented as part of the control unit 180, or may be implemented as a separate component.

The control unit 180 may perform a pattern recognizing process for recognizing a writing input or a picture drawing input carried out on the touch screen as characters or images, respectively.

The power supply unit 190 is supplied with internal power or external power by control of the control unit 180 and supplies a power required by an operation of each component.

Embodiments may be implemented in a computer-readable medium using, for example, computer software, hardware, and/or some combination thereof.

For hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electronic units designed to perform functions described herein. Embodiments may also be implemented by or in conjunction with the control unit 180.

For software implementation, embodiments may be implemented with separate software modules, such as procedures and functions, each of which may perform one or more of the functions and operations described herein. The software codes may be implemented with a software application written in any suitable programming language. The software codes may be stored in the memory 160 and executed by the control unit 180.

Flexible Display

A flexible display that may be applied to the electronic device 100 according to some embodiments of the present invention and the electronic device 100 to which the flexible display has been applied will be described below with reference to FIGS. 2 to 5. The electronic device 100 to which the flexible display has been applied will be described below. However, it should be noted that a control method of an electronic device according to the present invention is not necessarily applied only to an electronic device having a flexible display, and may be applied to an electronic device having a flat panel display, etc.

As described above, the electronic device 100 according to the present invention may include a display 151 that is implemented as the flexible display.

The flexible display is a display device that is formed of a flexible material configured to be bent or folded. In order words, the flexible display is a light and unbreakable display device that is manufactured on a bendable, foldable, or rollable substrate like a paper while maintaining display characteristics of an existing flat panel display. The flexible display may be called a bendable display and a flexible display.

Such a flexible display may be implemented using a TFT-LCD, an OLED, electrophoretic or laser induced thermal imaging (urn) technology or the like.

In addition, electronic paper may be used as the flexible display. The electronic paper is a display device to which characteristics of ink and paper are applied and is also referred to as e-paper. Unlike a traditional flat panel display that provides backlight illumination to pixels, the electronic paper may use reflected light like general paper. Once an image or text is formed, the shape of the image or text may be maintained even without additional power supply.

The above-described flexible display is light and unbreakable. When the flexible display is applied to a mobile terminal, the flexible display has various shapes and arrangements, and thus may provide a mobile terminal with various forms and corresponding functions.

FIG. 2 is a diagram for describing an exterior of an electronic device having a flexible display according to some embodiments of the present invention.

An example in which the flexible display is provided in a mobile terminal will be simply and clearly described with reference to FIG. 2. Other elements that may be additionally included in the mobile terminal will be omitted in order to provide intuitive understanding.

FIG. 2 shows an example of an electronic device having the flexible display according to some embodiments of the present invention.

An electronic device 100 shown in FIG. 2 has two bodies B1 and B2. The two bodies B1 and B2 may be formed of a rigid material and thus may not be flexible.

A display 151 implemented with a flexible display may be provided at one side of the two bodies B1 and B2. Different flexible displays that are physically distinct may be arranged at each of the two bodies B1 and B2. However, preferably, one flexible display 151 may be arranged therein.

The two bodies B1 and B2 may be connected to each other by a hinge H. Furthermore, one of the two bodies B1 and B2 may be coupled with the other to rotate with respect to the hinge H. This means that the two bodies B1 and B2 may be coupled in a foldable manner.

FIG. 2A shows that the two bodies B1 and B2 are completely unfolded. As shown in FIG. 2A, a state in which the two bodies B1 and B2 are completely unfolded is simply referred to as a "flat state."

FIG. 2B shows that the two bodies B1 and B2 are slightly bent since the body B2 is slightly rotated. FIG. 2C shows that the two bodies B1 and B2 are completely folded. As shown in FIGS. 2B and 2C, a state in which the two bodies B1 and B2 are bent and coupled together is simply referred to as a "bending state." However, for convenience of description, as shown in FIG. 2C, a state in which the two bodies B1 and B2 are completely folded may be referred to as a "folded state."

As the two bodies B1 and B2 are changed from the flat state to the bending state, the flexible display 151 may also be bent.

The term "flat state" or "bending state" may be used according to a predetermined criterion or depending on whether the display 151 is completely unfolded or is bent. For example, as shown in FIG. 2A, it is possible to express "the display 151 is flat" or "the display 151 is in a flat state." As shown in FIGS. 2B and 2C, it is possible to express "the display 151 is bent" or "the display 151 is in a bending state."

FIG. 2 shows a case in which there are two bodies that are rotatably coupled. However, the electronic device 100 need not necessarily be composed of two bodies, and may be composed of three or more bodies. In this case, one body may be rotatably coupled with other adjacent bodies.

FIG. 3 is a diagram for describing another exterior of an electronic device having a flexible display according to some embodiments of the present invention.

The exterior of the electronic device described with reference to FIG. 2 includes the first body B1 and the second body B2 formed of a rigid material and connected by the hinge H. However, unlike that shown in FIG. 2, the exterior of the electronic device shown in FIG. 3 may include the third body B3 formed of a flexible material like the flexible display.

In this case, the degree of freedom of a flexing operation of the flexible display may increase significantly compared to that of the flexible display shown in FIG. 2 in which a folding position of the flexible display cannot be varied through the rotation of the first body B1 and the second body B2 which are rigid.

For example, as shown in FIG. 3B, the flexible display may be bent and transformed with respect to the y-axis of a Cartesian coordinate that may be set on a display surface of the electronic device 100. In addition, as shown in FIG. 3C, the flexible display may be bent and transformed with respect to the x-axis of the Cartesian coordinate that may be set on the display surface of the electronic device 100.

As another example, when flexing is performed as shown in FIG. 3B or when flexing is performed as shown in FIG. 3C, a bending position may not be fixed.

As still another example, the display of the electronic device 100 may be bent such that only an upper right corner of the electronic device 100 shown in FIG. 3A is partially flexed.

FIG. 4 is a cross sectional view showing a section of the electronic device shown in FIG. 2A taken along line I-I'. The thicknesses of layers of the bodies B1 and B2 and the display 151 are exaggeratedly shown in FIG. 4. The layers may be thicker or thinner than those shown in FIG. 4. A relative thickness of each layer may be different from that shown in FIG. 4. That is, it is shown that the display 151 has a smaller thickness than the bodies B1 and B2. However, the bodies B1 and B2 may be thinner than the display 151. As shown in FIG. 4A, the electronic device 100 according to some embodiments of the present invention may be configured such that a sum of the areas of the bodies B1 and B2 is the same as the area of the display 151 when seen from a direction V shown in FIG. 4. Alternatively, as shown in FIGS. 4B and 4C, the electronic device 100 may be configured such that the sum of the areas of the bodies B1 and B2 is greater than the area of the display 151.

As shown in FIG. 4B, the electronic device 100 according to some embodiments of the present invention may have the bodies B1 and B2 having edges that protrude in a direction in which the display 151 is disposed. Furthermore, as shown in FIG. 4C, the edges may further extend horizontally to partially overlap the display 151.

Although not shown, other elements may be interposed between each of the bodies B1 and B2 and the display 151. Furthermore, another element may be further disposed on the display 151. In addition, another element may also be further disposed below the bodies B1 and B2. However, such elements are not directly associated with the description of the present invention, and thus a detailed description thereof will be omitted.

FIG. 5 is a cross sectional view showing a section of the electronic device shown in FIG. 3A taken along line J-J'. The thicknesses of layers of a body B3 and the display 151 are exaggeratedly shown in FIG. 5. The layers may be thicker or thinner than those shown in FIG. 5. A relative thickness of each layer may be different from that shown in FIG. 5. That is, it is shown that the display 151 has a smaller thickness than the body B3. However, the body B3 may be thinner than the display 151.

As shown in FIG. 5A, the electronic device 100 according to some embodiments of the present invention may be configured such that a sum of the areas of the bodies B1 and B2 is the same as that of the display 151 when seen from a direction V shown in FIG. 5. Alternatively, as shown in FIGS. 5B and 5C, the electronic device 100 may be configured such that the area of the third body B3 is greater than the area of the display 151.

As shown in FIG. 5B, in the electronic device 100 according to some embodiments of the present invention, an edge of the third body B3 may protrude to be wider than the display 151. Furthermore, as shown in FIG. 5C, the edge may extend horizontally to partially overlap the display 151.

Although not shown, other elements may be interposed between the body B3 and the display 151. Furthermore, another element may be further disposed on the display 151. In addition, another element may be further disposed below the body B3. However, such elements are not directly associated with the description of the present invention, and thus a detailed description thereof will be omitted.

Each region of the electronic device 100 that is shown in FIGS. 4 and 5 by dashed lines is a grip portion GP that is mainly grasped by a user. The grip portion GP denotes each of the regions illustrated in FIGS. 4 and 5 by dashed lines. However, the position of the grip portion GP is not limited thereto. For example, when the electronic device 100 is flexed as shown in FIG. 3C, it should be noted that the grip portion GP may be an upper side or a lower side of the electronic device 100.

In addition, according to the electronic device 100 shown in FIGS. 2 to 5, it is shown that the first to third bodies B1, B2, and B3 are arranged to overlap the entire region of the display 151. However, the first to third bodies B1, B2, and B3 may be arranged to partially overlay the display 151. For example, a rigid body may be provided only to the position of the grip portion GP shown in FIGS. 4 and 5. The rigid body may not be provided to a center region of the display 151.

As described above, the electronic device 100 may sense a state of the display 151. To this end, the electronic device 100 may include a sensor for sensing whether the display 151 is folded (in a bending state) or unfolded (in a flat state) (hereinafter, whether the display 151 is bent). Furthermore, the sensor may sense a position at which the display 151 is folded (hereinafter referred to as a "bending position") and may sense a degree to which the display 151 is folded (hereinafter referred to as a "bending degree").

In this case, the above-described sensor for sensing whether the flexible display 151 is bent may be included in the flexible display. The sensor may be arranged in a plurality. When the plurality of sensors are provided, the sensors may be arranged to be spaced apart from each other on at least one edge of the flexible display.

In this case, the above-described sensor for sensing whether the flexible display 151 is bent may be provided in the first to third bodies B1 to B3.

Here, the sensor for sensing whether the flexible display is bent is referred to as a "bending sensor" for convenience of description. The present invention is not limited to the implementation method and form of such a bending sensor. However, it is preferable that the control unit 180 may use electric signals to sense the degree and/or position of the bending of the flexible display.

When the drawings needed to describe embodiments of the present invention are shown, as shown in FIG. 3, an electronic device including a flexible display that is in a flat state or an electronic device including a flat panel display will be described as an example, unless context dictates otherwise. However, this is for convenience of description of the present invention and does not mean that the present invention is not applied to the electronic device 100 having an exterior that is shown in FIG. 2.

Force Direction Sensing Unit

A force direction sensing unit 131 that may be applied to the electronic device 100 according to some embodiments of the present invention will be described below with reference to FIG. 6.

As described above, the term "force direction" used herein includes a direction of shear force applied to a touch surface, that is, a direction parallel to force acting on the touch surface, which cannot be detected by a conventional touch sensor. That is, upon a touch and/or contact of an external object, the force direction sensing unit 131 may also sense shear force generated on the touch surface by the touch and/or contact.

The force direction sensing unit 131 according to the present invention may include a sensor array SA composed of unit sensors for sensing a force direction.

For example, the sensor array SA is arranged in a region where a force direction is to be sensed. Accordingly, when the region where the sensor array SA is arranged is touched and/or contacted, the force direction sensing unit 131 may sense a force direction of the touch and/or contact.

That is, the sensor array SA may be arranged in the region where the force direction of the touch and/or contact is to be sensed. For example, when the electronic device 100 includes a touch screen, a conventional touch input and a direction of the touch may be combined and then used to operate the electronic device 100. In this case, the sensor array SA may be arranged in a region of the display 151 (i.e., a touch screen region) of the electronic device 100. Thus, information regarding the touch input that may be acquired from the touch screen and force direction information obtained from the force direction sensing unit 131, which is a sensor array SA set, may be combined by the electronic device 100 and usefully used to operate the electronic device 100.

As another example, the sensor array SA is arranged in the first, second, and third bodies B1, B2, and B3. Accordingly, the electronic device 100 may sense the force direction of the touch and/or contact with the first, second, and third bodies B1, B2, and B3, and the sensed information may be usefully used to operate the electronic device 100.

In particular, when a control method of an electronic device according to the present invention is applied to an electronic device 100 having a flexible display, the sensor array SA may be arranged in a grip portion GP (see FIGS. 4 and 5) of the electronic device 100. In this case, the sensor array SA may be provided in a touch screen region of the grip portion GP and also may be provided in a region of the first, second, and third bodies B1, B2, and B3 included in the grip portion GP. However, even when the sensor array SA is applied to the electronic device 100 having a flexible display, it should be noted that the sensor array SA need not necessarily be provided only to the grip portion GP.

The force direction sensing unit 131 may sense a variety of information regarding a touch and/or contact to a force direction sensing region (force direction detecting area; FDDA) determined by a region in which the sensor array SA is provided. For example, the force direction sensing unit 131 may sense one or more of the presence of contact of an external object OB to the force direction sensing region, a position of the contact, a force intensity upon the contact (that is, a force intensity of a touch and/or contact), and a force direction (that is, a force direction of the touch and/or contact).

Each sensor in the sensor array SA included in the force direction sensing unit 131 may sense one or more of the presence of the contact of the external object OB to the sensor, the position of the contact, the force intensity upon the contact, and the force direction.

Information corresponding to one or more of the presence of the contact with one point of a touch region, the position of the contact, the force intensity upon the contact, and the force direction which are sensed by the force direction sensing unit 131 may be transferred to the control unit 180 and/or a separate touch event processing module (not shown).

The control unit 180 and/or the touch event processing module may set a contact region having a certain area around a point at which the touch and/or contact with the force direction sensing region is sensed, compare force intensities between a plurality of sensing points (e.g., points at which unit sensors constituting the sensor array SA are arranged) that are present in the contact region, and determine a force directions applied to the points. The determination of the direction of the forces by the touch event processing module may be achieved as illustrated in FIG. 6.

FIG. 6 is a schematic diagram showing an example of a process of detecting a force direction using force intensity according to an embodiment of the present invention.

Referring to FIG. 6, the control unit 180 and/or the touch event processing module may determine the force direction according to an intensity distribution of forces detected at a plurality of sensing points included in the contact region (touch area; TA). In particular, the control unit 180 may determine, as the force direction, a direction of a sensing point at which the greatest force intensity is detected on the basis of a center O of the touch area TA.

For example, when the touch and/or contact of the external object OB to one point of a force direction detection area FDDA is achieved, the touch area TA having a predetermined area with respect to the surface of the force direction detection area FDDA and the contact point of the external object OB may be set or extracted. The touch area TA may be set as a range of a predetermined area with respect to a specific coordinate (e.g., a center coordinate) of the one point or may be set by connecting multiple adjacent sensing points at which user contacts are sensed among multiple sensing points included in the force direction sensing region FDDA.

In addition, force intensities F1 to F5 detected at the multiple sensing points of the set or an extracted touch area TA are detected. The greater force intensity may be detected at the sensing point of the direction in which a user applies force in the touch area TA.

Accordingly, the electronic device 100 according to the present invention detects, as a force direction FD applied to the touch area TA, a direction of a sensing point having the greatest force intensity among the multiple sensing points from the center point of the touch area TA.

Accordingly, when the force direction sensing region FDDA is touched and/or contacted by the external object OB, the electronic device 100 may use the force direction sensing unit 131 to sense a position of the touch and/or contact and also a direction in which shear force is applied from the position of the touch and/or contact.

Various embodiments of a control method of an electronic device according to the present invention will be described below using the electronic device 100 that has been described with reference to FIGS. 1 to 6.

However, for convenience of description, the embodiments of the control method of an electronic device according to the present invention will be described using the electronic device 100 that has been described with reference to FIGS. 1 to 6. Accordingly, the control method of an electronic device according to the present invention is not restricted to be applied only to the electronic device 100 that has been described with reference to FIGS. 1 to 6. That is, the control method of an electronic device according to the present invention may be applied to an electronic device that does not have at least some of the elements of the electronic device 100 that has been described with reference to FIGS. 1 to 6. On the other hand, the control method of an electronic device according to the present invention may also be applied to an electronic device that has more elements than the electronic device 100.

Furthermore, in various embodiments of the control method of an electronic device according to the present invention, the control method of an electronic device according to the present invention may be applied to an electronic device that senses a force direction in a scheme other than the scheme described with reference to FIG. 6. That is, the control method of an electronic device according to the present invention, which will be described below, may be applied to an electronic device having a sensor that may sense a force direction of a touch and/or contact in a method other than the method, which has been described with reference to FIG. 6, for sensing shear force applied to the touch surface.

First Control Method of Electronic Device User Interface Providing Method #1—Selection of Divided Screens FIG. 7 is a flowchart for describing a first control method of an electronic device according to the present invention, and FIGS. 8 to 14 are diagrams for describing the first control method of an electronic device according to the present invention.

Referring to FIG. 7, the first control method of an electronic device according to the present invention includes displaying a first screen on a display 151 (S100), sensing an occurrence of a predetermined event for logically dividing the display 151 into two or more regions (S110), sensing a force direction of a first contact associated with the occurrence of the predetermined event (S120), selecting one of the two or more regions according to the sensed force direction (S130), and displaying the first screen in the selected region (S140).

The steps will be described below in detail with reference to FIGS. 8 to 14.

As shown in FIG. 8, a control unit 180 may display a first screen SC1 on the display 151 (S100). The first screen SC1 may be a screen that is selected according to an input of a user and/or an event that occurred in the electronic device 100. For example, in particular, FIG. 8 shows that the electronic device 100 displays a mail message screen SC1 on the display 151 through a mail application.

Subsequently, the control unit 180 may sense the occurrence of the predetermined event for logically dividing the display 151 into two or more regions (S110).

The predetermined event may be set for the electronic device 100 in various ways.

Referring to FIG. 9A, for example, the electronic device 100 may set an operation of flexing the display 151 of the electronic device 100 as the predetermined event. In particular, the control unit 180 may sense a flexing state of the display 151. When the control unit 180 determines that the display 151 is flexed, e.g., folded in half along a center line of the display 151, the control unit 180 may determine that the predetermined event has occurred.

Referring to FIG. 9B, as another example, when a first touch point TP1 and a second touch point TP2 are sensed from both hands that grip the electronic device 100, the electronic device 100 may set, as the predetermined event, an event in which a leftward shear force LF is sensed at the first touch point TP1 and a rightward shear force RF is sensed at the second touch point TP2. That is, on a condition that the first touch point TP1 is positioned at a first position, and the second touch point TP2 is positioned at a second position, when a force direction at the first touch point TP1 is opposite to a direction from the first position to the second position, and a force direction at the second touch point TP2 is opposite to a direction from the second position to the first position, the electronic device 100 may determine that the predetermined event has occurred.

In addition to the above-described two examples, although not shown, the electronic device 100 may set an operation of a hardware key/soft key that is separately provided in the electronic device 100 as the predetermined event. Furthermore, the electronic device 100 may also set various forms of operations as the predetermined event.

When the electronic device 100 senses a predetermined event for logically dividing the display into two or more regions, the control unit 180 may sense a force direction of a first contact associated with the occurrence of the predetermined event.

The control unit 180 may determine whether the first contact has been associated with the occurrence of the predetermined event.

The determination of whether the first contact has been associated with the occurrence of the predetermined event may be performed by the control unit 180 in various ways.

For example, when the first contact has occurred within a predetermined time from a time at which it is sensed that the predetermined event has occurred, the control unit 180 may determine that the first contact has been associated with the predetermined event.

In this case, when the contact has not occurred within the predetermined time after the occurrence of the predetermined event and the contact has occurred after a predetermined time, the control unit 180 may determine that the contact is unassociated with the predetermined event and may ignore the contact.

As another example, the first contact has occurred before it is sensed that the predetermined event has occurred. When a force direction of the first contact is changed within a predetermined time after the occurrence of the predetermined event, the control unit 180 may determine that the first contact has been associated with the predetermined event. That is, when the predetermined event is set as a "flexing operation" as shown in FIG. 9A, the user may grip the display 151 in order to perform the flexing operation. Thus, when the first contact (e.g., contact caused by a user's thumb) to the display 151 has occurred before the flexing operation, but the force direction at the contact point that is generated by the grip is changed from a vertical direction to a rightward direction (or a leftward direction) within a predetermined time (e.g., 0.5 seconds) after the flexing operation is performed, the control unit 180 may determine that the first contact has been associated with the predetermined event.

In this case, when the force direction of the first contact has not been changed within the predetermined time after the occurrence of the predetermined event, but the contact has occurred within a predetermined time, the control unit 180 may determine that the contact is unassociated with the predetermined event and may ignore the contact.

In addition, the control unit 180 may determine whether the first contact has been associated with the predetermined event in various ways.

In this case, the first contact need not be applied just once, but may be applied two or more times when it is determined that the first contact has been associated with the predetermined event.

Next, the control unit 180 may sense a force direction of the first contact through the force direction sensing unit 131. The method of sensing the force direction through the force direction sensing unit 131 has been described above, and thus a detailed description thereof will be omitted.

Subsequently, the control unit 180 may determine one screen out of the two or more regions according to the sensed force direction (S130).

A method of determining one of the divided screens of the display 151 will be described below with reference to FIGS. 10 and 11. In the following description of FIGS. 10 and 11, an example in which the display 151 is divided into two regions R1 and R2 through step S110 will be described. For convenience of description, after the display 151 is divided, a region positioned to the left with respect to a length direction (traverse direction) of the display 151 is called a first region R1, and a region positioned to the right is called a second region R2.

First, FIG. 10A shows that a force direction of a first contact TP3 with the first region R1 is a first direction D1. In this case, the control unit 180 may select the first region R1 that is positioned in the first direction D1 between the first region R1 and the second region R2 with respect to the center of the display 151. That is, the control unit 180 may select the first region R1 positioned in the force direction D1 side between the regions R1 and R2 in consideration of the force direction D1 of the first contact TP3.

FIG. 10B shows a case in which a force direction of the first contact TP3 with the second region R2 is the first direction D1. Even in this case, as described above with reference to FIG. 10A, the control unit 180 may select the first region R1 positioned in the force direction D1 side between the regions R1 and R2 in consideration of the force direction D1 of the first contact TP3.

In addition, FIG. 10C shows a case in which both of a force direction of the first contact TP3 at the first region R1 and a force direction of a first contact TP4 at the second region R2 are the first direction D1. Even in this case, as described above with reference to FIG. 10A, the control unit 180 may select the first region R1 positioned in the force direction D1 side between the regions R1 and R2 in consideration of the force direction D1 of the first contact TP3.

That is, irrespective of the contact positions of the first contacts and/or the number of first contacts, the control unit 180 may sense the force direction of the first contact and may select a region provided in the sensed force direction. However, when the force direction of the first contact TP3 at the first region R1 and the force direction of the first contact TP4 at the second region R2 are different from each other, unlike in FIG. 10C, the control unit 180 may not select any one region between the first and second regions R1 and R2 in step S130.

Unlike in FIG. 10, FIG. 11 shows a case in which the force direction of the first contact TP3 or TP4 is a second direction D2. As shown in FIG. 11, when the force direction is applied to the display 151, the control unit 180 may select the second region R2 positioned in the second direction D2 with respect to the center of the display 151 in step S130.

Subsequently, the control unit 180 may display the first screen SC1 in the determined region (S140).

For example, when the force direction of the first contact is toward the first direction D1 as shown in FIG. 10, and the region selected between the two regions R1 and R2 of the display 151 through step S130 is the first region R1, the control unit 180 may display the first screen SC1 on the selected first region R1 as shown in FIG. 12A.

As another example, when the force direction of the first contact is toward the second direction D2 as shown in FIG. 11, and the region selected between the two regions R1 and R2 of the display 151 through step S130 is the second region R2, the control unit 180 may display the first screen SC1 on the selected second region R2 as shown in FIG. 12B.

In step S140, when the first screen SC1 that has been displayed on the entire region of the display 151 is displayed in one of the divided regions, the control unit 180 may adjust the size of the first screen SC1. That is, the first screen SC1 may be resized to the size of the determined region.

FIGS. 10 to 12 assume that the display 151 is divided into two regions R1 and R2. When the display 151 is divided into three regions R3, R4, and R5, steps S130 and S140 will be further described with reference to FIGS. 13 and 14.

According to some embodiments of the present invention, when the control unit senses a predetermined event according to the above-described step S110, the control unit 180 may logically divide the display 151 into three regions, that is, a left third region R3, a central fourth region R4, and a right fifth region R5 rather than two regions.

In this case, when performing step S120, the control unit 180 may sense the force direction of the first contact in a third direction D3 that is a direction perpendicular to a surface of the display 151 as well as the first direction D1 and the second direction D2 that are directions parallel with the surface of the display 151, as shown in FIG. 13B.

In this case, as described with reference to FIGS. 10 and 11, the control unit 180 may select one of the three regions R3, R4, and R5 in consideration of the force direction of the first contact, irrespective of whether the first contact is positioned in any one of the three regions R3, R4, and R5. Furthermore, the control unit 180 may display the first screen SC1 in the selected region.

For example, when the force direction of the first contact is sensed as the first direction D1 shown in FIG. 13B, the control unit 180 may select the third region R3 positioned in the first direction D1 with respect to the center of the display 151 and may display the first screen SC1 on the third region R3 as shown in FIG. 14A.

As another example, when the force direction of the first contact is sensed as the second direction D2 shown in FIG. 13B, the control unit 180 may select the fifth region R5 positioned in the second direction D2 with respect to the center of the display 151 and may display the first screen SC1 on the fifth region R5 as shown in FIG. 14C.

As still another example, when the force direction of the first contact is sensed as the third direction D3 shown in FIG. 13B, the control unit 180 may select the fourth region R4 positioned in the center of the display 151 and may display the first screen SC1 on the fourth region R4 as shown in FIG. 14B.

Second Control Method of Electronic Device User Interface Providing Method #2—Size Adjustment of Divided Screens A second control method of an electronic device according to the present invention will be described below using the electronic device 100 that has been described with reference to FIGS. 1 to 6.

FIG. 15 is a flowchart for describing a second control method of an electronic device according to the present invention, and FIGS. 16 to 23 are diagrams for describing the second control method of an electronic device according to the present invention.

Referring to FIG. 15, the second control method of an electronic device according to the present invention includes dividing the display 151 into two or more regions (S200), sensing a force direction of a second contact (S210), and changing a size of at least one of the two or more regions according to the force direction (S220).

The steps will be described below in detail with reference to FIGS. 16 to 23.

First, the control unit 180 may logically divide the display 151 into two or more regions (S200).

The display 151 may be divided into two regions or may be divided into three or more regions.

On a condition that the display 151 is divided into two or more regions, the display 151 may be divided into two or more regions in the control method of an electronic device according to the present invention, which has been described with reference to FIGS. 7 to 14, or in another method.

FIG. 16 illustrates that the display 151 is divided into a left first region R1 and a right second region R2, and different screens (e.g., a mail message screen and an Internet browser screen) are displayed in the regions R1 and R2.

FIG. 20 illustrates that the display 151 is divided into a left third region R3, a right fifth region R5, and a central fourth region R4, and different screens (e.g., a mail message screen, an Internet browser screen, and a music playback application screen) are displayed in the regions R3, R4, and R5.

Next, the control unit 180 may sense a force direction of the second contact through the force direction sensing unit 131 (S210).

The method of sensing the force direction has already been described in detail above, and a detailed description thereof will be omitted.

Subsequently, the control unit 180 may change a size of at least one of the two or more regions according to the sensed force direction (S220).

Step S220 will be described in detail below.

When the control unit 180 senses a second contact and a force direction of the second contact, the control unit 180 may move a location of a logical boundary line (see BL1 of FIG. 16 and BL2 and BL3 of FIG. 20) between the regions according to the force direction. As the boundary line moves according to the force direction, a size of at least one of the regions may be changed.

For example, referring to FIG. 17, on a condition that a second contact TP5 is applied to the first region R1 while the display 151 is divided into two regions R1 and R2 as shown in FIG. 16, when the force direction of the second contact TP5 is the first direction D1 as shown in FIG. 17A, the boundary line BL1 shown in FIG. 16 may move to a position BL1' by a predetermined movement distance MS in the first direction D1, or when the force direction of the second contact TP5 is the second direction D2 as shown in FIG. 17B, the boundary line BL1 shown in FIG. 16 may move to a position BL1" by the predetermined movement distance MS in the second direction D2.

As another example, referring to FIG. 18, on a condition that a second contact TP6 is applied to the second region R2 while the display 151 is divided into two regions R1 and R2 as shown in FIG. 16, when the force direction of the second contact TP6 is the first direction D1 as shown in FIG. 18A, the boundary line BL1 shown in FIG. 16 may move to the position BL1' by the predetermined movement distance MS in the first direction D1, or when the force direction of the second contact TP6 is the second direction D2 as shown in FIG. 18B, the boundary line BL1 shown in FIG. 16 may move to the position BL1" by the predetermined movement distance MS in the second direction D2.

In addition, when the control unit 180 moves the position of the boundary line, the control unit 180 may determine a position movement distance of the boundary line and a position movement speed of the boundary line in further consideration of the following factors.

For example, referring to FIG. 19, the control unit 180 may sense a touch time TT during which the force direction of the second contact is maintained in a specific direction (e.g., the first direction D1 or the second direction D2) and may determine the position movement distance MS of the boundary in proportion to the length of the touch time TT. That is, when the touch time TT during which the force direction of the second contact is maintained in the first direction D is longer, the boundary line may further move.

With continuing reference to FIG. 19, as another example, the control unit 180 may sense the force intensity of the second contact and determine the movement speed of the boundary line in proportion to the force intensity. That is, when the force intensity of the second contact is greater, the boundary line may move faster.

The control unit 180 needs to select a boundary line whose position is to be adjusted in consideration of the force direction of the second contact when the size of at least one region is adjusted by moving the position of the boundary line.

In other words, when the display 151 is divided into two regions, the control unit 180 does not need to select the boundary line whose position is to be adjusted since there is one boundary line, and also there is one boundary line whose position is to be adjusted. However, as shown in FIG. 20, when the display 151 is divided into three regions R3, R4, and R5, the number of boundary lines is two, and thus the control unit 180 needs to select one of two boundary lines BL2 and BL3 whose position is to be adjusted.

To this end, the control unit 180 may determine a boundary line closer to the position of the second contact as a "boundary line whose position is to be adjusted" in consideration of the position of the second contact.

For example, FIG. 21 shows that the second contact TP5 is applied to the third region R3. In this case, it can be seen that the boundary line closer to the position of the second contact TP5 is the second boundary line BL2. Thus, it can be seen that the boundary line whose position is to be moved by the second contact TP5 is the second boundary line BL2, and the position of the third boundary line BL3 is not changed. In this case, the movement direction, movement speed, and movement distance of the second boundary line BL2 may be determined in a similar manner to that described above.

Unlike FIG. 21, FIG. 22 shows that a second contact TP6 is applied to the fifth region R5. In this case, the boundary line whose position is to be moved by the second contact TP6 may be the third boundary line BL3 closer to the position of the second contact TP6. In this case, the position of the second boundary line BL2 may not be changed. The movement direction, movement speed, and movement distance of the third boundary line BL3 may be determined in a similar manner to that described above.

FIG. 23 shows that the second contact is applied to two positions TP5 and TP6. In this case, both the second boundary line BL2 closer to one position TP5 of the second contact and the third boundary line BL3 closer to the other position TP6 of the second contact may be determined as the boundary lines whose positions are to be adjusted.

In this case, the control unit 180 may individually sense the force intensities, the force directions, and the touch times of the second contacts, and thus the position movement of the second boundary line BL2 and the third boundary line BL3 may be controlled independently from each other.

Third Control Method of Electronic Device User Interface Providing Method #3—Selection of Screens that are to be Integrally Displayed A third control method of an electronic device according to the present invention will be described below using the electronic device 100 that has been described with reference to FIGS. 1 to 6.

FIG. 24 is a flowchart for describing a third control method of an electronic device according to the present invention, and FIGS. 25 to 29 are diagrams for describing the third control method of an electronic device according to the present invention.

Referring to FIG. 24, the third control method of an electronic device according to the present invention includes displaying two or more screens SC1 and SC2 on the display 151 divided into two or more regions R1 and R2 (S300), selecting one of the two or more screens SC1 and SC2 in a first force direction of a third contact (S310), determining whether to continue displaying the selected screen (S320), and controlling a display state of the display 151 according to the determination (S330).

The steps will be described below in detail with reference to FIGS. 25 to 29.

First, an example in which the display 151 is logically divided into the two regions R1 and R2 will be described for convenience of description.

On a condition that the display 151 of the electronic device 100 is logically divided into the two or more regions R1 and R2, the control unit 180 may display the first screen SC1 and the second screen SC2 on the divided two or more regions R1 and R2 (S300), as shown in FIG. 25. For example, the first screen SC1 for displaying a mail message may be displayed on the first region R1, and the second screen SC2 for displaying an Internet browser may be displayed on the second screen SC2.

In this case, the control unit 180 may select one of the two or more screens SC1 and SC2 according to a third contact having the first force direction (S310), and also may sense a fourth contact having a second force direction and determine whether to continue displaying the selected screen in the second force direction (S320).

Steps S310 and S320 will be described in detail below.

The control unit 180 may sense the third contact having the first force direction applied to one of the first region R1 and the second region R2 through the force direction sensing unit 131.

The first force direction may be a third direction D3 that is perpendicular to the display 151. That is, when contact having the third direction D3 is sensed, the control unit 180 may recognize the contact as the third contact.

For example, FIG. 26A shows that a third contact TP7 is applied to the first region R1, and FIG. 26B shows that the third contact TP7 is applied to the second region R2.

The control unit 180 may select one of the first screen SC1 and the second screen SC2 according to the position of the third contact TP7. That is, as shown in FIG. 26A, when the third contact TP7 is applied to the first region R1 in which the first screen SC1 is displayed, the control unit 180 may select the first screen SC1 that is displayed in the first region R1. As shown in FIG. 26B, when the third contact TP7 is applied to the second region R2 in which the second screen SC2 is displayed, the control unit 180 may select the second screen SC2 that is displayed in the second region R2.

Next, the control unit 180 may sense the fourth contact having the second force direction.

For example, FIG. 26A shows that a fourth contact TP8 is applied to the second region R2, and the force direction of the fourth contact TP8 is the second direction D2. As another example, FIG. 26B shows that the fourth contact TP8 is applied to the first region R1, and the force direction of the fourth contact TP8 is the first direction D1.

The control unit 180 may determine whether to continue displaying the screen selected through step S310 according to the second force direction of the fourth contact TP8.

The control unit 180 may consider the position of the selected screen in addition to the second force direction when determining whether to continue displaying the screen. On a condition that there is not a screen displayed in the first direction D1 with respect to the selected screen, and there is a screen displayed in the second direction D2 (e.g., when the selected screen is displayed in the first region R1), when the second force direction is the first direction D1, the control unit 180 may make a selection to display the selected screen no longer. When the second force direction is the second direction D2, the control unit 180 may make a selection to continue displaying the selected screen.

Referring to FIG. 26A, for example, the screen selected through step S310 is the first screen SC1 that is displayed in the first region R1, as described above. In this case, when the fourth contact TP8 has the second force direction that is toward the second direction D2, the control unit 180 may make a selection to continue displaying the first screen SC1.

Referring to FIG. 26B, as another example, the screen selected through step S310 is the second screen SC2 that is displayed in the second region R2, as described above. In this case, when the fourth contact TP8 has the second force direction that is toward the first direction D1, the control unit 180 may make a selection to continue displaying the second screen SC2.

Subsequently, the control unit 180 may control a display state of the display 151 according to the determination of step S320 (S330). With a control method of an electronic device according to an another embodiment of the present invention, when the control unit 180 determines to continue displaying the selected screen according to the selection and determination of steps S310 and S320, the control unit 180 may no longer continue displaying an unselected screen. On the other hand, when the control unit 180 determines not to continue displaying the selected screen, the control unit 180 may continue displaying the unselected screen.

Referring to FIG. 26A, for example, the control unit 180 may select the first screen SC1 and determine to continue displaying the first screen SC1, as described above. In this case, the control unit 180 may not continue displaying the second screen SC2 that is unselected. Thus, as shown in FIG. 27A, the control unit 180 may display the first screen SC1 on an entire region of the display 151 and also may control the second screen SC2 to be no longer displayed.

Referring to FIG. 26B, as another example, the control unit 180 may select the second screen SC2 and determine to continue displaying the second screen SC2. In this case, the control unit 180 may not continue displaying the first screen SC1 that is unselected. Thus, as shown in FIG. 27B, the control unit 180 may display the second screen SC2 on an entire region of the display 151 and also may control the first screen SC1 to be no longer displayed.

As still another example, although not shown, when the first screen SC1 is selected, and the force direction of the fourth contact TP8 is toward the first direction D1, the control unit 180 may determine not to continue displaying the first screen SC1 but to continue displaying the second screen SC2. Accordingly, in this case, as shown in FIG. 27B, the control unit 180 may display the second screen SC2 on the entire region of the display 151.

As still another example, although not shown, when the second screen SC2 is selected, and the force direction of the fourth contact TP8 is toward the second direction D2, the control unit 180 may determine not to continue displaying the second screen SC2 but to continue displaying the first screen SC1. Accordingly, in this case, as shown in FIG. 27A, the control unit 180 may display the first screen SC1 on the entire region of the display 151.

FIG. 26 shows an example in which a contact position of the third contact TP7 is different from a contact position of the fourth contact TP8. However, as shown in FIG. 28, the third contact TP7 and the fourth contact TP8 may have the same contact position. That is, FIG. 28A shows a case in which the third contact TP7 is positioned in the second region R2. In this case, the fourth contact TP8 may still be positioned in the second region R2.

However, as also shown in FIG. 28, whether to continue displaying the screen selected by the third contact TP7 is selected according to the force direction of the fourth contact TP8.

For example, when the third contact TP7 is made as shown in FIG. 28A, the control unit 180 may select the second screen SC2. Next, when the force direction of the fourth contact TP8 is toward the second direction D2 as shown in FIG. 28B, the control unit 180 may expand the display of the first screen SC1 to the entire region of the display 151 and continue displaying the first screen SC1, and may control the display 151 to no longer display the second screen SC2, as shown in FIG. 27A.

As another example, when the force direction of the fourth contact TP8 is toward the first direction D1 as shown in FIG. 28C, the control unit 180 may expand the display of the second screen SC2 to the entire region of the display 151 and continue displaying the second screen SC2, and may control the display 151 to no longer display the first screen SC1.

The display 151 may be logically divided into three or more regions rather than two regions. In this case, the methods described above with reference to FIGS. 25 to 28 may be modified and then applied.

FIG. 29 shows an example in which the display 151 is divided into three regions R3, R4, and R5 which displays a third screen SC3, a fourth screen SC4, and a fifth screen SC5, respectively. A method of integrally displaying the screens when the display 151 is divided into the three regions will be briefly described with reference to FIG. 29.

First, an example in which the third contact is applied to the third region R3 and the force direction of the fourth contact is the first direction D1 will be described. In this case, the control unit 180 selects the third screen SC3 displayed in the third region R3. Since there is no screen that is displayed in the first direction D1, that is, the force direction of the fourth contact with respect to the third region R3, the control unit 180 may determine to no longer continue displaying the third screen SC3. Thus, the control unit 180 may control the display 151 to enlarge the display of the fourth screen SC4 up to the third region R3. Thus, the fourth screen SC4 may be displayed in the third region R3 and the fourth region R4, and the fifth screen SC5 may still be displayed in the fifth region R5. In this case, when the third contact and the fourth contact are received again, the control unit 180 may determine whether to continue displaying the fourth screen SC4 and the fifth screen SC5, and may display the determined screen, as described with reference to FIGS. 24 and 28.

Second, an example in which the third contact is applied to the third region R3 and the force direction of the fourth contact is the second direction D2 will be described. In this case, the control unit 180 selects the third screen SC3 displayed in the third region R3. Since the fourth screen SC4 is displayed in the second direction D2, that is, the force direction of the fourth contact with respect to the third region R3, the control unit 180 may determine to continue displaying the third screen SC3. Thus, the control unit 180 may control the display 151 to enlarge the display of the third screen SC3 up to the fourth region R4. Thus, the third screen SC3 may be displayed in the third region R3 and the fourth region R4, and the fifth screen SC5 may still be displayed in the fifth region R5. It will be appreciated that the control unit 180 may receive the third contact and the fourth contact once again and may control a display state of the display 151 according to the received contacts.

Fourth Control Method of Electronic Device User Interface Providing Method #4

FIG. 30 is a flowchart for describing a fourth control method of an electronic device according to the present invention, and FIGS. 31 to 34 are diagrams for describing the fourth control method of an electronic device according to the present invention.

Referring to FIG. 30, the fourth control method of an electronic device according to the present invention includes displaying a first screen on a display 151 (S400), sensing a specific data reception event (S410), sensing a predetermined division event for logically dividing the display 151 into two or more regions (S420), displaying the first screen in any one of the divided regions on the basis of a force direction of a first contact (S430), and displaying a second screen including information regarding the specific data reception event in any one of the remaining regions (S440).

The steps will be described below in detail with reference to FIGS. 31 to 34.

As shown in FIG. 31, the control unit 180 may display the first screen SC1 on the display 151 (S400). Here, the first screen SC1 may be a screen that is selected according to a user's input and/or a specific event that occurred in the electronic device 100. For example, FIG. 8 shows that the electronic device 100 displays a mail message screen on the display 151 through a mail application.

Next, the control unit 180 may sense an occurrence of a specific data reception event (S410). The specific data reception event may include all events that may be received by the electronic device 100. For example, the specific data reception event may be a text message reception associated event, a voice message reception associated event, a mail reception associated event, a sound source reception associated event, an image (including a photograph, etc.) reception associated event, or the like. FIG. 32 shows a state in which a text message has been received.

That is, when a text message reception associated event E, which is the specific data reception event, is sensed through the control unit 180 by the electronic device 100 while a mail message is displayed on a first screen of the display 151, the control unit 180 may inform the user of the reception of the text message by displaying an icon or the like on the display 151, and also a vibration function and/or an alarm function may be added to the electronic device 100.

In this case, the user may check a mail message and a received text message through screen division at the same time.

That is, when the control unit 180 senses an occurrence of the specific data reception event E, such as a text message, the control unit 180 may sense a predetermined division event for logically dividing the display 151 into the two or more regions (S410). The predetermined division event may be set for the electronic device 100 in various ways.

For example, on the assumption that the display 151 is a flexible display, the electronic device 100 may set an operation of flexing the display 151 of the electronic device 100 as the predetermined division event. In particular, the control unit 180 may sense a flexing state of the display 151. When the control unit 180 determines that the display 151 is flexed, e.g., folded in half along a center line of the display 151, the control unit 180 may determine that the predetermined division event has occurred.

As another example, when a first touch point TP1 and a second touch point TP2 are sensed from both hands that grip the electronic device 100 as shown in FIG. 33, the electronic device 100 may set, as the predetermined division event, an event in which a leftward shear force LF is sensed at the first touch point TP1 by the force direction sensing unit 131 and a rightward shear force RF is sensed at the second touch point TP2 by the force direction sensing unit 131.

That is, on a condition that the first touch point TP1 is positioned at a first position, and the second touch point TP2 is positioned at a second position, when a force direction at the first touch point TP1 is opposite to a direction from the first position to the second position, and a force direction at the second touch point TP2 is opposite to a direction from the second position to the first position, the electronic device 100 may determine that the predetermined division event has occurred.

Here, it should be noted that the first position and the second position may be two various positions on the display 151, and a force direction at each point (e.g., a direction from one point to another, etc.) for satisfying the predetermined division event may be changed in various ways according to the user's convenience.

In addition to the above-described two examples, although not shown, the electronic device 100 may set an operation of a hardware key/soft key that is separately provided in the electronic device 100 as the predetermined event. Furthermore, the electronic device 100 may also set various forms of operations as the predetermined division event.

An example of the predetermined division event will be described on the basis of the second example. It should be noted that the present invention is not limited thereto.

When the control unit 180 senses a predetermined division event for logically dividing a display into two or more regions (S420), the control unit 180 may sense a force direction of a first contact TP3 and display a first screen in any one of the divided regions (S430).

Here, the first contact TP3 may correspond to at least one of a first touch point TP1 and a second touch point TP2 that are associated with the predetermined division event for logically dividing the display 151 into two or more regions.

In other words, when the control unit 180 senses the force directions of the first touch point TP1 and the second touch point TP2 which are associated with the predetermined division event and logically divides the display 151 into two or more regions, the control unit 180 may display the first screen in any one of the divided regions on the basis of a force direction of the first contact TP3, that is, at least one of the first touch point TP1 and the second touch point TP2 (S430) while the control unit 180 displays the second screen including information regarding the specific data reception event in any one of the remaining regions (S440).

Here, the control unit 180 may automatically display the first screen before the region division to the left side of the second screen. However, the present invention is not limited thereto, and the control unit 180 may display the first screen to the right side of the second screen by the user's manipulation.

In addition, the control unit 180 may select regions where the first screen and the second screen are to be displayed according to the change in the predetermined division event for logically dividing the display into regions. This will be described below with reference to FIGS. 35 to 42.

FIGS. 35 to 42 are diagrams for describing some control associated examples about a divided region in the fourth control method of an electronic device according to the present invention.

Referring to FIG. 35, when a first touch point TP1 and a second touch point TP2 are sensed from both hands that grip the electronic device 100, as shown in FIG. 10, the electronic device 100 may set, as the predetermined division event, an event in which a leftward shear force LF is sensed at the first touch point TP1 by the force direction sensing unit 131 and a rightward shear force RF is sensed at the second touch point TP2 by the force direction sensing unit 131.

That is, on a condition that the first touch point TP1 is positioned at a first position, and the second touch point TP2 is positioned at a second position, when a force direction at the first touch point TP1 is opposite to a direction from the first position to the second position, and a force direction at the second touch point TP2 is opposite to a direction from the second position to the first position, the electronic device 100 may determine that the predetermined division event has occurred (see FIG. 33).

Here, the force direction of the first contact TP3 sensed by the force direction sensing unit 131 in order to display the first screen in any one of the divided regions may be a force direction at the first touch point TP1 and/or the second touch point TP2 that is associated with the predetermined division event. FIG. 12 shows a case in which the force direction of the first contact TP3 is the force direction at the first touch point TP1.

That is, the first contact TP3 may correspond to at least one of the first touch point TP1 and the second touch point TP2. When a force direction is applied to the first touch point TP1 and the second touch point TP2 in order for the predetermined division event to occur, and then a right thumb that grips the display 151 at the second touch point TP2 is spaced apart from the display 151, the first screen may be displayed in a region corresponding to a force direction of the first touch point TP1 through steps S430 and S440.

The second screen may be displayed to the right side of the first screen.

As a result, when the display 151 is logically divided into at least two or more regions by force directions at the first touch point TP1 and the second touch point TP2 and then any one region is removed, the control unit 180 may display the first screen in a left region, which is any one of the divided regions, on the basis of the force directions at unremoved touch points (i.e., the force direction of the first touch point TP1 in FIG. 35). Ultimately, the control unit 180 may display the first screen as shown in FIG. 34.

In more detail, after the display 151 is divided, a region positioned to the left with respect to a length direction (traverse direction) of the display 151 is called a first region R1, and a region positioned to the right is called a second region R2.

As shown in FIG. 35, the control unit 180 may select the first region R1, that is, a region positioned in a force direction LF of the first touch point TP1 between the first region R1 and the second region R2 with respect to the center of the display 151, and may display the first screen in the selected region. That is, in consideration of the force direction LF of the first touch point TP1 which is the first contact TP3, through steps S430 and S440, the control unit 180 may select the first region R1 positioned in the force direction LF side between the regions R1 and R2 as a region in which the first screen is displayed, and may display the first screen in the first region R1.

As shown in FIG. 34, a second screen including a text message which is information regarding a specific data reception event may be automatically displayed in the second region R2.

On the other hand, when a force direction is applied to the first touch point TP1 and the second touch point TP2 in order for the predetermined division event to occur, as shown in FIG. 36, and then a left thumb that grips the display 151 at the first touch point TP1 is spaced apart from the display 151, the first screen may be displayed to the right side that is a region corresponding to a force direction RF of the second touch point TP1 as shown in FIG. 37.

In this case, the control unit 180 may select the second region R2, that is, a region positioned in the force direction RF of the second touch point TP2 between the first region R1 and the second region R2 with respect to the center of the display 151 and may display the first screen in the selected region. That is, in consideration of the force direction RF of the second touch point TP2 which is the first contact TP3, through steps S430 and S440, the control unit 180 may select the second region R2 positioned in the force direction RF between the regions R1 and R2 as a region in which the first screen is displayed, and may display the first screen in the second region R2.

As shown in FIG. 37, a second screen including a text message which is information regarding a specific data reception event may be automatically displayed in the first region R1.

In addition to those described with reference to FIGS. 35 and 36, as shown in FIGS. 38 and 39, a region in which the first screen and/or the second screen is to be displayed is set even while the force directions LF and RF are applied to the first touch point TP1 and the second touch point TP2 in order for the predetermined division event to occur, and then the first touch point TP1 and the second touch point TP2 are in contact with the display 151.

When the force directions are applied to the first touch point TP1 and the second touch point TP2 in order for the predetermined division event to occur as shown in FIG. 38, and then the force direction RF that is applied to the second touch point TP2 and is opposite to a direction from the second position to the first position is changed to a direction LF opposite to a direction from the first position to the second position while the force direction LF that is applied to the first touch point TP1 is unchanged, the first screen may be displayed to the left side that is a region corresponding to the changed force direction of the second touch point as shown in FIG. 11.

As a result, when the force direction of any one of the first touch point TP1 and the second touch point TP2 is changed, the control unit 180 may display the first screen in the first region R1 that is any one of divided regions through steps S430 and S440 on the basis of the changed direction.

On the other hand, when the force directions LF and RF are applied to the first touch point TP1 and the second touch point TP2 in order for the predetermined division event to occur as shown in FIG. 39, and then the force direction LF that is applied to the first touch point TP1 and is opposite to a direction from the first position to the second position is changed to a direction RF opposite to a direction from the second position to the first position while the force direction RF that is applied to the second touch point TP2 is unchanged, the first screen may be displayed in the second region R2 that is a region corresponding to the changed force direction RF of the first touch point TP1 as shown in FIG. 37.

As shown in FIG. 40, when the force directions LF and RF are applied to the first touch point TP1 and the second touch point TP2 in order for the predetermined division event to occur and then are all changed, the control unit 180 may remove the divided region by ignoring the sensed predetermined division event, and thus return to a state shown in FIG. 32.

Referring to FIG. 41, the first contact TP3 sensed by the force direction sensing unit 131 for displaying the first screen in any one of the regions divided by the control unit 180 may be a discontinuous operation, unlike FIGS. 35 to 40, that is, unlike the first touch point TP1 and the second touch point TP2 in order for the predetermined division event to occur.

Here, the control unit 180 may determine whether the first contact TP3 is associated with the occurrence of the predetermined division event. When it is determined that there is no association, the control unit 180 may remove a divided region by ignoring the sensed predetermined division event and return to a state shown in FIG. 32.

The determination of whether the first contact TP3 has been associated with the occurrence of the predetermined division event may be performed by the control unit 180 in various ways.

For example, when the first contact TP3 has occurred within a predetermined time from a time at which it is sensed that the predetermined division event has occurred, the control unit 180 may determine that the first contact TP3 has been associated with the predetermined division event.

That is, when at least one of a time at which the first contact TP3 is applied and a time at which the force direction of the first contact TP3 is sensed by the force direction sensing unit 131 is within a predetermined time from the time at which the predetermined division event has occurred, the control unit 180 may determine that the first contact TP3 has been associated with the predetermined division event. When the at least one time is after the predetermined time, the control unit 180 may determine that the first contact TP3 is unassociated with the predetermined division event and may ignore the first contact TP3.

Here, when the control unit 180 determines that the first contact TP3 is associated with the predetermined division event, the control unit 180 may display the first screen in any one of the divided regions on the basis of the force direction of the first contact TP3; otherwise, the control unit 180 may ignore the sensed predetermined division event and remove the divided region.

As another example, when the first contact TP3 is present before it is sensed that the predetermined division event has occurred, and the force direction of the first contact TP3 is changed within a predetermined time after the predetermined divided event has occurred, the control unit 180 may determine that the first contact TP3 has been associated with the predetermined event. That is, when the predetermined division event is set as a "flexing operation," the user may grip the display 151 in order to perform the flexing operation. Thus, when the first contact (e.g., contact caused by a user's thumb) to the display 151 has occurred before the flexing operation, but the force direction at the contact point that is generated by the grip is changed from a vertical direction to a rightward direction (or a leftward direction) within a predetermined time (e.g., 0.5 seconds) after the flexing operation is performed, the control unit 180 may determine that the first contact has been associated with the predetermined division event.

In this case, when the force direction of the first contact TP3 has not been changed within the predetermined time after the predetermined division event has occurred, and no contact has occurred within a predetermined time, the control unit 180 may determine that the first contact TP3 is unassociated with the predetermined division event and may ignore the contact.

In addition, the control unit 180 may determine whether the first contact TP3 has been associated with the predetermined event in various ways.

In this case, the first contact TP3 need not be applied just once, but may be applied two or more times when it is determined that the first contact TP3 has been associated with the predetermined division event.

Next, when the control unit 180 determines that at least one of a time at which the first contact TP3 is applied and a time at which the force direction of the first contact TP3 is sensed by the force direction sensing unit 131 is within a predetermined time from the time at which the predetermined division event has occurred, and thus determines that the first contact TP3 has been associated with the predetermined division event, the control unit 180 may display the first screen in any one of the divided regions on the basis of the force direction of the first contact TP3 through steps S430 and S440.

In detail, when the display 151 is divided into two or more regions by the control unit 180 according to the predetermined division event, the control unit 180 may select a region in which the first screen is to be displayed according to the following method.

First, FIG. 41A shows a case in which a force direction of the first contact TP3 with the first region R1 is the first direction D1. In this case, the control unit 180 may select the first region R1 that is positioned in the first direction D1 between the first region R1 and the second region R2 with respect to the center of the display 151. That is, the control unit 180 may select the first region R1 positioned in the force direction D1 side between the regions R1 and R2 in consideration of the force direction D1 of the first contact TP3.

The first screen may be displayed on the selected first region R1 through steps S430 and S440, and the second screen including a text message that is information regarding a specific data reception event may be automatically displayed in the second region R2, as shown in FIG. 34.

FIG. 41B shows a case in which the force direction of the first contact TP3 with the second region R2 is the first direction D1. Even in this case, as described above with reference to FIG. 41A, the control unit 180 may select the first region R1 positioned in the force direction D1 side between the regions R1 and R2 in consideration of the force direction D1 of the first contact TP3.

In addition, FIG. 41C shows a case in which both of a force direction of the first contact TP3 at the first region R1 and a force direction of the first contact TP4 at the second region R2 are the first direction D1. Even in this case, as described above with reference to FIG. 41A, the control unit 180 may select the first region R1 positioned in the force direction D1 side between the regions R1 and R2 in consideration of the force direction D1 of the first contact TP3.

That is, irrespective of the contact positions of the first contacts TP3 and/or the number of first contacts TP3, the control unit 180 may sense the force direction D1 of the first contact TP3 and may select a region provided in the sensed force direction D1.

Unlike in FIG. 41, FIG. 42 shows a case in which the force direction of the first contact TP3 is the second direction D2. As shown in FIG. 42, when the force direction is applied to the display 151, the control unit 180 may display the first screen in a region positioned in the second direction D2 with respect to the display 151, and may display the second screen including a text message that is information regarding a specific data reception event in a region positioned in the first direction D1.

In steps S430 and S440, when the first screen SC1 that has been displayed on the entire region of the display 151 is displayed in one of the divided regions, the control unit 180 may adjust the size of the first screen SC1. That is, the first screen SC1 may be resized to the size of the determined region.

FIGS. 43 to 50 are diagrams for describing some examples about a specific data reception event used in the fourth control method of an electronic device according to the present invention.

Referring to FIG. 43, the control unit 180 may display the first screen that is a mail message screen on the display 151 through a mail application.

The control unit 180 may sense an occurrence of a specific data reception event. An icon associated with the previously sensed specific data reception event may be displayed on the display 151, in addition to the first screen.

As an example, as shown in FIG. 43, the specific data reception event may be a text message reception associated event, a mail reception associated event, a sound source reception associated event, and an image (including a photograph, etc.) reception associated event. The specific data reception event may be displayed on the display 151 using an icon or the like.

In this case, the user may check a mail message and information regarding the specific data reception event through screen division at the same time.

Here, a method of dividing the display 151 into two or more regions and displaying a first screen in any one of the divided regions has been described with reference to FIGS. 31 to 42. Thus, a detailed description thereof will be omitted.

The control unit 180 may display the first screen in any one of the divided regions through step S430, and may display the second screen including information regarding a data reception event sensed within a predetermined time among data reception events that are sensed before the first contact TP3 for displaying the first screen has occurred in any one of the remaining regions through step S440.

For example, when there are a plurality of specific data reception events received by the control unit 180 before the first contact TP3 for displaying the first screen in any one of the divided regions has occurred, the control unit 180 may display, in any one of the remaining regions, a second screen including information regarding a specific data reception event corresponding to a time closest to a time at which the first contact TP3 occurred.

In detail, when the control unit 180 already senses a text message reception associated event, a mail reception associated event, a sound source reception associated event, and an image (including a photograph, etc.) reception associated event while a user checks a mail message through a first screen on the display 151, the control unit 180 determines a time at which each event is sensed.

As a result of the determination, the control unit 180 may display information regarding a most recent event among the data reception events that are sensed before the first contact TP3 has occurred on the second screen. FIG. 21 shows a case in which the image (including a photograph, etc.) reception associated event is the most recent event.

However, it should be noted that a relationship between a time at which a specific data reception event is sensed and a time at which a first contact has occurred may be changed variously according to the user's convenience with respect to the predetermined time.

As shown in FIG. 45, the control unit 180 may display the first screen in any one of the divided regions through step S430, and may display the second screen including a list associated with the data reception events sensed before the first contact TP3 for displaying the first screen has occurred in any one of the remaining regions through step S440.

When a text message associated event E1 (e.g., a Kakaotalk message) that is similar to a text message associated event, which is another data reception event, is sensed after the second screen including a list associated with data reception events sensed before the occurrence of the first contact as shown in FIGS. 46 and 47 is sensed, the control unit 180 may additionally display a list associated with another data reception event on the second screen.

As shown in FIG. 48, when a list associated with the data reception event is displayed in any one of the remaining regions through step S440, the control unit 180 may select any one from the list displayed on the second screen on the basis of a changed force direction of the first contact TP3 or a force direction of the second contact, which occurs after the force direction of the first contact TP3 is sensed by the force direction sensing unit 131.

Here, the first contact TP3 which is a subject of the changed force direction of the first contact TP3 may be a contact corresponding to the first touch point TP1 and/or the second touch point TP2 that is associated with the predetermined division event that has been described above with reference to FIGS. 35 to 40 or may be a contact that is a discontinuous operation unlike the first touch point TP1 and the second touch point TP2 for an occurrence of the predetermined division event, which have been described with reference to FIGS. 41 and 42.

As an example, FIG. 49 shows an assumption that the first contact that is a subject of the changed force direction of the first contact TP3 is the first touch point TP1 associated with the predetermined division event as shown in FIG. 35.

Referring to FIGS. 49 and 35, the control unit 180 may separate the second touch point TP2 associated with the predetermined division event from the display 151, select the first region R1, which is a region positioned in the force direction of the first touch point TP1, between the first region R1 and the second region R2 with respect to the center of the display 151, and display the first screen in the selected region.

Subsequently, while the force direction of the first touch point TP1 is maintained in or released from the state of FIG. 12, the control unit 180 may change the force direction of the first touch point TP1 that is the first contact TP3 to a third direction D3 or fourth direction D4, and thus may select any one from the list displayed on the second screen.

Here, the third direction D3 or the fourth direction D4 of the first contact TP3 may be sensed by the force direction sensing unit 131 that may sense shear force that is acting in a direction parallel with the surface of the display 151 as well as shear force that is acting in a direction perpendicular to the surface of the display 151. A sensing region of the force direction sensing unit 131 is as shown in FIG. 50.

That is, as shown in FIG. 50, when the force direction of the first touch point TP1 that is the first contact TP3 changes to the third direction D3 or the fourth direction D4, the force direction sensing unit 131 may sense the change and move a selection region to select any one from the list displayed on the second screen (see FIG. 48). When the force direction of the first touch point TP1 that is the first contact TP3 is determined as a fifth direction D5, one (the sound source reception associated event in FIG. 49) is selected from the list, and then information regarding the selected data reception event is executed.

When the force direction for selecting any one from the list displayed on the second screen is the force direction of the second contact, the same principle as that of the force direction of the first contact that has been described with reference to FIGS. 41 and 42 may be applied.

Fifth Control Method of Electronic Device User Interface Providing Method #5

FIG. 51 is a flowchart for describing a fifth control method of an electronic device according to the present invention, and FIG. 52 is a diagram for describing the fifth control method of an electronic device according to the present invention.

Another control method of an electronic device according to the present invention will be described below using the electronic device 100 that has been described with reference to FIGS. 1 to 6.

Referring to FIG. 51, the fifth control method of an electronic device according to the present invention includes displaying a first screen on a display 151 (S500), sensing a predetermined division event for logically dividing the display 151 into two or more regions (S510), displaying the first screen in any one of the divided regions on the basis of a force direction of a first contact (S520), and displaying a second screen including a list of applications in any one of the remaining regions (S530).

The steps will be described below in detail with reference to FIG. 52.

The control unit 180 may display the first screen including information regarding at least one of a first application to an N-th application (N is a natural number) on the display 151 (S500).

As an example, as shown in FIG. 31, the control unit 180 may display a mail message screen on the display 151 through a mail application.

In this case, the control unit 180 may sense a predetermined division event for logically dividing the display 151 into two or more regions (S510). Here, a method of displaying the first screen in any one of the divided regions has been described with reference to FIGS. 31 to 42. Thus, a detailed description thereof will be omitted.

The control unit 180 may display the first screen in any one of the divided regions through step S520, and may display the second screen including a list of at least some of the first application to the N-th application (N is a natural number) in any one of the remaining regions through step S530.

For example, as shown in FIG. 52, the control unit 180 may display the second screen including a list of applications other than an application regarding the information included in the first screen in any one of the remaining regions.

That is, the list of applications shown in the second region of FIG. 52 may be a list of applications other than the application included in the first screen displayed in the first region.

Alternatively, the control unit 180 may display the second screen including a list of applications already executed before the application regarding the information included in the first screen is executed in any one of the remaining regions.

In other words, when the applications already executed before a mail application is executed are an application A, an application B, and an application C, information including a list of application A, application B, and application C may be displayed in the second region among the divided regions.

Alternatively, the control unit 180 may display the second screen including a list of applications corresponding to a predetermined condition in any one of the remaining regions. The predetermined condition may be an application that is executed many times during a specific period of time, and may be arbitrarily set by a user.

The selection and activation of any one from a list of applications displayed in any one of the remaining regions may be the same as the methods described with reference to FIGS. 45 and 47, and thus a detailed description thereof will be omitted.

At least one from the list of the applications displayed on the second screen, that is, at least one from a list of applications other than application associated with information included in the first screen, at least one from a list of applications already executed before the application associated with information included in the first screen is executed, or at least one from a list of applications that are executed many times during a specific period may be sequentially removed on the basis of a force direction caused by a contact, that is, may be sequentially removed by a general touch operation.

Sixth Control Method of Electronic Device User Interface Providing Method #6

FIG. 53 is a flowchart for describing a sixth control method of an electronic device according to the present invention, and FIGS. 54 and 56 are diagrams for describing the sixth control method of an electronic device according to the present invention.

The sixth control method of an electronic device according to the present invention will be described below using the electronic device 100 that has been described with reference to FIGS. 1 to 6.

Referring to FIG. 53, the sixth control method of an electronic device according to the present invention includes displaying a first screen including first information regarding a specific application on a display 151 (S600), sensing a predetermined division event for logically dividing the display 151 into two or more regions (S610), displaying the first screen in any one of the divided regions on the basis of a force direction of a first contact (S620), and displaying a second screen including second information regarding a specific application in any one of the remaining regions (S630).

The steps will be described below in detail with reference to FIGS. 54 to 56.

The control unit 180 may display the first screen including the first information regarding the specific application on the display 151 (S600).

As an example, as shown in FIG. 54, the control unit 180 may display a photograph capturing screen P1 on the display 151 through a camera application.

In this case, the control unit 180 may sense a predetermined division event for logically dividing the display 151 into two or more regions (S610). Here, a method of displaying the first screen in any one of the divided regions has been described with reference to FIGS. 31 to 42. Thus, a detailed description thereof will be omitted.

The control unit 180 may display the first screen in any one of the divided regions through step S620, and may display the second screen including the second information regarding the specific application in any one of the remaining regions through step S630.

For example, as shown in FIG. 55, the control unit 180 may display the second screen including information executed within a predetermined time from a time at which the first information included in the first screen is executed by the specific application in any one of the remaining regions. In detail, the information may be an image P2 or video that is previously captured through the camera application.

Here, the time at which the first information included in the first screen is executed may be a time at which the camera application is executed to start a capture mode as shown in FIG. 54. The predetermined time may be a specific period that is before the capture is started on the first screen displayed in the first region, and may be arbitrarily set by a user.

When the information executed within the predetermined time is provided in a plurality, the control unit 180 may display a plurality of pieces of information in the form of thumbnails, etc. In this case, the selection and activation of any one region may be the same as the methods described with reference to FIGS. 45 and 47, and thus a detailed description thereof will be omitted.

The second screen including the second information regarding the specific application in any one of the remaining regions may be information executed at a time closest to a time at which the first information included in the first screen is executed. For the camera application, the second screen may be the most recently captured image or video.

Alternatively, the second screen including the second information regarding the specific application in any one of the remaining regions may be information executed most frequently before the first information included in the first screen is executed. For the camera application, the second screen may be the most frequently viewed image or video.

Referring to FIG. 46, when the specific application is a music playback application, the user may listen to two or more songs at the same time after the screen division.

Here, the method applied to the camera application may also be applied to the played-back music.

Seventh Control Method of Electronic Device User Interface Providing Method #7

FIG. 57 is a flowchart for describing a seventh control method of an electronic device according to the present invention.

The seventh control method of an electronic device according to the present invention will be described below using the electronic device 100 that has been described with reference to FIGS. 1 to 6.

Referring to FIG. 57, the seventh control method of an electronic device according to the present invention includes displaying a first screen including information regarding a first application on a display 151 (S700), sensing a predetermined division event for logically dividing the display 151 into two or more regions (S710), displaying the first screen in any one of the divided regions on the basis of a force direction of a first contact (S720), and displaying a second screen including second information regarding a specific application in any one of the remaining regions (S730).

The control unit 180 may display the first screen including the first information regarding the first application on the display 151 (S700).

As an example, as shown in FIG. 54, the control unit 180 may display a photograph capturing screen on the display 151 through a camera application.

In this case, the control unit 180 may sense a predetermined division event for logically dividing the display 151 into two or more regions (S710). Here, a method of displaying the first screen in any one of the divided regions has been described with reference to FIGS. 31 to 42. Thus, a detailed description thereof will be omitted.

The control unit 180 may display the first screen in any one of the divided regions through step S720, and may display the second screen including the second information regarding a second application in any one of the remaining regions through step S730.

Here, the control unit 180 may display the second screen including information regarding the second application corresponding to a predetermined condition in any one of the remaining regions through step S730. The predetermined condition may include a condition of a difference between a time at which the first application is executed and a time at which the specific application is executed or a condition of the number of times applications other than the first application are executed within a predetermined period of time.

For example, when the user sets the time difference condition as three hours, the control unit 180 may display a music playback application on the first screen of the display 151 through step S700, and may display an application that was executed three hours earlier, that is, before the music playback application was executed on the second screen through step S730.

Alternatively, the control unit 180 may display an application that is most frequently executed within a specific period that is a predetermined period on the second screen.

However, the predetermined condition is not limited thereto, and may be changed in various ways according to the user's intention.

Eighth Control Method of Electronic Device User Interface Providing Method #8 Method of Dividing Display Screen FIG. 58 is a flowchart for describing an eighth control method of an electronic device according to the present invention, and FIGS. 59 and 61 are diagrams for describing the eighth control method of an electronic device according to the present invention.

Referring to FIG. 58, the eighth control method of an electronic device according to the present invention includes displaying a first screen on a display 151 (S800), sensing a predetermined division event for logically dividing the display 151 into two or more regions (S810), displaying the first screen in any one of the divided regions (S820), and displaying a second screen in any one of the remaining regions (S830).

The steps will be described below in detail with reference to FIGS. 59 and 61.

As shown in FIG. 59, the control unit 180 may display the first screen SC1 on the display 151 (S400). Here, the first screen SC1 may be a screen that is selected according to a user's input and/or a specific event that occurred in the electronic device 100. For example, FIG. 8 shows that the electronic device 100 displays a mail message screen on the display 151 through a mail application.

Next, the control unit 180 may sense a predetermined division event for logically dividing the display 151 into the two or more regions (S810). The predetermined division event may be set for the electronic device 100 in various ways.

Referring to FIG. 60A, for example, on the assumption that the display 151 is a flexible display, the electronic device 100 may set an operation of flexing the display 151 of the electronic device 100 as the predetermined division event. In particular, the control unit 180 may sense a flexing state of the display 151. When the control unit 180 determines that the display 151 is flexed, e.g., folded in half along a center line of the display 151, the control unit 180 may determine that the predetermined division event has occurred.

Referring to FIG. 60B, as another example, when a first touch point TP1 and a second touch point TP2 are sensed from both hands that grip the electronic device 100, the electronic device 100 may set, as the predetermined division event, an event in which a leftward shear force LF is sensed at the first touch point TP1 by the force direction sensing unit 131 and a rightward shear force RF is sensed at the second touch point TP2 by the force direction sensing unit 131.

That is, on a condition that the first touch point TP1 is positioned at a first position, and the second touch point TP2 is positioned at a second position, when a force direction at the first touch point TP1 is opposite to a direction from the first position to the second position, and a force direction at the second touch point TP2 is opposite to a direction from the second position to the first position, the electronic device 100 may determine that the predetermined division event has occurred.

Here, it should be noted that the first position and the second position may be two various positions on the display 151, and a force direction at each point (e.g., a direction from one point to another, etc.) for satisfying the predetermined division event may be changed in various ways according to the user's convenience.

In addition to the above-described two examples, although not shown, the electronic device 100 may set an operation of a hardware key/soft key that is separately provided in the electronic device 100 as the predetermined event. Furthermore, the electronic device 100 may also set various forms of operations as the predetermined division event.

When the control unit 180 senses a predetermined division event for logically dividing a display into two or more regions (S810), the control unit 180 may display the first screen in any one of the divided regions (S820) and may display the second screen in any one of the remaining regions (S830).

FIG. 61 shows that the control unit 180 senses the predetermined division event (S810) and then displays the first screen SC1 including a mail message screen and the second screen SC2 including a text message in a left region and a right region of the divided display 151, respectively.

As shown in FIG. 9, the control unit 180 may automatically display the first screen before the region division to the left side of the second screen. However, the present invention is not limited thereto, and the control unit 180 may display the first screen to the right side of the second screen by the user's manipulation.

Ninth Control Method of Electronic Device User Interface Providing Method #9

1. First Control Method of Divided Screen

FIG. 62 is a flowchart for describing a ninth control method of an electronic device according to the present invention, and FIGS. 63 to 67 are diagrams for describing the ninth control method of an electronic device according to the present invention.

Referring to FIG. 62, the ninth control method of an electronic device according to the present invention includes dividing a screen of a display 151 into two or more regions (S900), sensing a force direction of a first contact TP3 (S910), and controlling a first application displayed in a first region R1 or a second application displayed in a second region R2 (S920).

The steps will be described below in detail with reference to FIGS. 63 to 67.

As shown in FIG. 59, the control unit 180 may display the first screen SC1 on the display 151. Here, the first screen SC1 may be a screen that is selected according to a user's input and/or a specific event that occurred in the electronic device 100. For example, FIG. 8 shows that the electronic device 100 displays a mail message screen on the display 151 through a mail application that is the first application.

Next, the control unit 180 may logically divide the display 151 into two or more regions (S900).

Here, the display 151 may be divided into two regions or may be divided into three or more regions.

On a condition that the display 151 is divided into two or more regions, the display 151 may be divided into two or more regions in the display screen division method described with reference to FIGS. 58 to 61 or in another method.

FIG. 12 illustrates that the display 151 is divided into a left first region R1 and a right second region R2, and different screens (e.g., a mail message screen that is the first application and a text message screen that is the second application) are displayed in the regions R1 and R2.

Next, the control unit 180 may acquire the force direction of the first contact TP3 at a first position P3 on the display 151 through the force direction sensing unit 131 (S910).

Here, the method of sensing the force direction using the force direction sensing unit 131 has already been described in detail above, and a detailed description thereof will be omitted.

The first position P3 may be any point included in the first region R1 or the second region R2 on the display 151. FIG. 64 shows a case in which the first position P3 is any point included in the first region R1, and FIG. 66 shows a case in which the first position P3 is any point included in the second region R2.

Referring to FIG. 64, in order to control the divided screens of the display 151 using the control unit 180, the user may make contact with the first position P3 that is any point of the first region R1 among the divided regions on the display 151.

Here, the contact may be the first contact TP3 at the first position P3. In this case, the force direction sensing unit 131 may sense the force direction of the first contact TP3.

Subsequently, the control unit 180 may control the first screen SC1 displayed in the first region R1, which is a region where the first position P3 is positioned, among the divided regions on the basis of the force direction of the first contact TP3 and, as a result, may control the first application displayed on the first screen SC1 (S920).

Here, the control of the first application may include scrolling or the like when the first application is a mail message associated application. A direction of the scrolling may be determined by a change in the force direction of the first contact TP3.

In other words, when the force direction of the first contact TP3 sensed by the force direction sensing unit 131 is a first direction D1, a second direction D2, or another direction, the control unit 180 may control the scrolling direction in the first direction D1, the second direction D2, or the other direction. As shown in FIG. 65, this may be controlled by the force direction sensing unit 131 that may sense shear force that is acting in a direction parallel with the surface of the display 151 as well as shear force that is acting in a direction perpendicular to the surface of the display 151.

As a result, when the user intends to control the first screen SC1 displayed on the first region R1 among the divided regions, that is, the first application displayed on the first screen SC1, the user may make the first contact TP3 by bringing a finger in contact with the first position P3, which is any point on the first region R1, and then change the force direction of the first contact TP3 to the first direction D1, the second direction D2, or the other direction while maintaining the contact.

The screen controlled on the basis of the force direction of the first contact TP3 is not limited to a region including the first position SC1. The electronic device 100 according to the present invention may allow the user to control the screen displayed in the region that does not include the first position SC1.

Referring to FIG. 66, in order to control the divided screens of the display 151 using the control unit 180, the user may make contact with the first position P3 that is any point of the second region R2 among the divided regions on the display 151.

Subsequently, the control unit 180 may control the second screen SC2 displayed in the second region R2, which is a region where the first position P3 is positioned, among the divided regions on the basis of the force direction of the first contact TP3 and, as a result, may control the second application displayed on the second screen SC2 (S920).

When the user intends to control the second screen SC2 displayed on the second region R2 among the divided regions, that is, the second application displayed on the second screen SC2, the user may make the first contact TP3 by bringing a finger in contact with the first position P3, which is any point on the second region R2, and then change the force direction of the first contact TP3 at the first direction D1, the second direction D2, or the other direction while maintaining the contact.

Referring to FIG. 67, in order to independently control the divided screens of the display 151 using the control unit 180, the user may bring a finger in contact with the first position P3 that is any point of the first region R1 and a second position P4 that is any point of the second region R2 among the divided regions on the display 151. The contact with the first position P3 may be the first contact TP3, and the contact with the second position P4 may be a second contact TP4.

In this case, the force direction sensing unit 131 may sense the force direction of the first contact TP3 and the force direction of the second contact TP4. The control unit 180 may independently control the first application displayed in the first region R1 and the second application displayed in the second region R2 on the basis of a result sensed by the force direction sensing unit 131 (S920).

As a result, when the user intends to control the second screen SC2 displayed in the second region R2, that is, the second application displayed on the second screen SC2 while intending to control the first screen SC1 displayed in the first region R1, that is, the first application displayed on the first screen SC1, the user may make the first contact TP3 by bringing a finger in contact with the first position P3, which is any point on the first region R1, make the second contact TP4 by bringing a finger in contact with the second position P4, which is any point on the second region R2, change the force direction of the first contact TP3 at the first direction D1, the second direction D2, or another direction while maintaining the contact, and change the force direction of the second contact TP4 in the first direction D1, the second direction D2, or another direction while maintaining the contact.

2. Second Control Method of Divided Screen

FIGS. 68 to 72 are other diagrams for describing the ninth control method of an electronic device according to the present invention.

The control unit 180 may logically divide the display 151 into two or more regions (S900). FIG. 68 illustrates that the display 151 is divided into a left first region R1 and a right second region R2, and different screens are displayed in the regions R1 and R2.

Here, a sound source list, which is at least one or more pieces of information included in a sound source playback application that is the first application stored in the electronic device 100, may be displayed in the first region R1, and an image list (displayed in alphabet capitals), which is at least one or more pieces of information included in an application for playing back an image such as a photograph that is the second application, may be displayed in the second region R2.

However, the lists displayed on the first region R1 and the second region R2 are not limited to those shown in FIG. 68, and may include a main message list, a text message list, and a plurality of application lists (i.e., thumbnails), etc.

Referring to FIG. 69, the first screen SC1 displayed in the first region R1 may be controlled by the control method described with reference to FIGS. 64 to 67 on the basis of the force direction of the first contact TP3 at the first position P3 or the force direction of the second contact TP4 at the second position P4. As a result, any one may be selected from a list including at least one or more pieces of information included in the first application displayed on the first screen SC1.

For convenience of description, an example in which the first screen SC1 displayed in the first region R1 is controlled on the basis of the force direction of the first contact TP3 at the first position P3 will be described below.

On a condition that the force direction of the first contact TP3 sensed by the force direction sensing unit 131 is a first direction D1, a second direction D2, or another direction, the control unit 180 may move a preliminary selection region RO within the list including at least one or more pieces of information included in the first application in the first direction D1, the second direction D2, or the other direction in order to select any one from the list. When the preliminary selection region RO is positioned on information intended to be selected, the control unit 180 may activate information (e.g., the national anthem) on which the preliminary selection region RO is positioned as shown in FIG. 70.

As shown in FIG. 65, this may be achieved by the force direction sensing unit 131 that may sense shear force that is acting in a direction parallel with the surface of the display 151 as well as shear force that is acting in a direction perpendicular to the surface of the display 151. In detail, when the force direction of the first contact TP3 is changed to the first direction D1, the second direction D2, or the other direction, the force direction sensing unit 131 may sense the change, and thus the control unit 180 may move the preliminary selection region RO to select any one from the list displayed in the first region.

Ultimately, when the force direction of the first contact TP3 is the third direction D3 (see FIG. 65), one is selected from the list, and then the selected information (e.g.; the national anthem) is executed.

However, the selection of the information is not limited to a case in which the force direction of the first contact TP3 is the third direction D3, and may be changed variously according to the user's intention.

Referring to FIG. 71, the second screen SC2 displayed in the second region R2 may be controlled by the control method described with reference to FIGS. 64 to 67 on the basis of the force direction of the first contact TP3 at the first position P3 or the force direction of the second contact TP4 at the second position P4. As a result, any one may be selected from a list including at least one or more pieces of information included in the second application displayed on the second screen SC2.

For convenience of description, an example in which the second screen SC2 displayed in the second region R2 is controlled on the basis of the force direction of the second contact TP4 at the second position P4 will be described below.

On a condition that the force direction of the second contact TP4 sensed by the force direction sensing unit 131 is the first direction D1, the second direction D2, or another direction, the control unit 180 may move the preliminary selection region RO within the list including at least one or more pieces of information included in the second application in the first direction D1, the second direction D2, or the other direction in order to select any one from the list. When the preliminary selection region RO is positioned on information intended to be selected, the control unit 180 may activate information (e.g., the image C) on which the preliminary selection region RO is positioned as shown in FIG. 72.

Here, the movement of the preliminary selection region RO and the activation of the information (e.g., the image C) on which the preliminary selection region RO is positioned have already been described with reference to FIGS. 68 to 70. Thus, a detailed description thereof will be omitted.

The activated image C may also implement operations such as rotation, enlargement, and reduction by the force direction of the contact sensed by the force direction sensing unit 131.

As a result, the electronic device 100 according to the present invention may allow the control unit 180 to select any one from the list including at least one or more pieces of information included in the first application on the basis of the force direction of the first contact TP3 sensed by the force direction sensing unit 131, or to select any one from the list including at least one or more pieces of information included in the second application on the basis of the force direction of the second contact TP4 sensed by the force direction sensing unit 131.

3. Second control method of divided screen

FIGS. 73 to 78 are still other diagrams for describing the ninth control method of an electronic device according to the present invention.

The control unit 180 may logically divide the display 151 into two or more regions. FIG. 73 illustrates that the display 151 is divided into a left first region R1 and a right second region R2, and different screens (a mail message screen that is the first application and a text message screen that is the second application) are displayed in the regions R1 and R2.

Next, the control unit 180 may acquire the force direction of a third contact TP5 to a third position P5 on the display 151 through the force direction sensing unit 131.

The control unit 180 may deactivate the control of the application displayed on a region that does not include the third position P5, e.g., the first region R1 in FIG. 73, and represent it in shadow in order to indicate the deactivation.

Here, the deactivation of the control of the application may mean that a scrolling function is not implemented or the preliminary selection region for selecting information included in the list is not implemented, and may widely mean all operations for controlling the application.

Subsequently, the control unit 180 may acquire the force direction of the first contact TP3 at the first position P3 on the display 151 through the force direction sensing unit 131. The first position P3 may be any point included in the first region R1 or the second region R2 on the display 151. FIG. 74 shows a case in which the first position P3 is any point included in the first region R1, and FIG. 75 shows a case in which the first position P3 is any point included in the second region R2.

The control unit 180 may control the application displayed in the second region R2 that is a region including the third position P5 among the divided regions on the basis of the force direction of the first contact TP3. As an example, a scrolling function of a text message may be implemented as shown in FIGS. 74 and 75.

Here, the scrolling function of the text message may be implemented by the force direction sensing unit 131 for sensing the force direction of the first contact TP3. This has been described in the above embodiment, and thus a detailed description thereof will be omitted.

A keypad including numbers or characters may be activated in the deactivated first region R1 by the control unit 180 on the basis of the force direction of the third contact TP5 at the third position P5 on the display 151. The application displayed in the first region or the application displayed in the second region can be controlled using the keypad.

The control unit 180 may not control the application displayed in a region including the third position P5 even when the first contact TP3 at the first position P3 is made after the third contact TP5 at the third position P5 is made. This can be achieved by a specific condition.

In other words, when the force direction of the first contact TP3 is sensed within a predetermined time after the force direction of the third contact TP5 is sensed, the control unit 180 may control an application displayed in the region including the third position P5 on the basis of the force direction of the first contact TP3. When the predetermined time has passed, the control unit 180 may not control the application displayed in the region including the third position P5 even when the first contact TP3 is made.

That is, the control unit 180 may determine whether the first contact TP3 is made within the predetermined time after the third contact TP5 is made. When the predetermined time has passed, the control unit 180 may determine that the first contact TP3 is unassociated with the control of the application, and then may ignore the first contact TP3.

The first contact TP3 may be the same as the third contact TP5, that is, continuous contact. In this case, the control unit 180 may control an application displayed in the region including the third position P5 on the basis of the force direction of the third contact TP5 or the first contact TP3 acquired through the force direction sensing unit 131.

In other words, when a start point and an end point of the first contact TP3 are the same as a start point and an end point of the third contact TP5, the control unit 180 may control an application displayed in the region including the third position P5 on the basis of the force direction of the third contact TP5 or the first contact TP3 acquired through the force direction sensing unit 131.

Unlike the method described with reference to FIG. 73, the region deactivated by the control unit 180 may be a region including a fourth position P6, and this will be described in detail below.

The control unit 180 may acquire the force direction of a fourth contact TP6 at the fourth position P6 on the display 151 through the force direction sensing unit 131, and may deactivate the control of the application displayed in the region including the fourth position P6, e.g., the second region R2 of FIG. 76.

A keypad including numbers or characters may be activated in the deactivated second region R2 by the control unit 180 on the basis of the force direction of the fourth contact TP5 at the fourth position P6 on the display 151. The application displayed in the first region or the application displayed in the second region may be controlled using the keypad.

Subsequently, the control unit 180 may acquire the force direction of the first contact TP3 at the first position P3 on the display 151 through the force direction sensing unit 131. The first position P3 may be any point included in the first region R1 or the second region R2 on the display 151. FIG. 77 shows a case in which the first position P3 is any point included in the first region R1, and FIG. 78 shows a case in which the first position P3 is any point included in the second region R2.

The control unit 180 may control the application displayed in the first region R1 that is one of regions not including the fourth position P6 among the divided regions on the basis of the force direction of the first contact TP3. As an example, a scrolling function of a mail message may be implemented as shown in FIGS. 74 and 75.

The control unit 180 may not control the application displayed in a region including the fourth position P6 even when the first contact TP3 at the first position P3 is made after the fourth contact TP6 at the fourth position P6 is made. This may be achieved by a specific condition.

The first contact TP3 may be the same as the fourth contact TP6, that is, continuous contact. This has been described above, and thus a detailed description thereof will be omitted.

Tenth control method of electronic device User interface providing method #10

A tenth control method of an electronic device according to the present invention will be described below using the electronic device 100 that has been described with reference to FIGS. 1 to 6.

FIG. 79 is a flowchart for describing the tenth control method of an electronic device according to the present invention, and FIGS. 80 to 89 are diagrams for describing the tenth control method of an electronic device according to the present invention.

Referring to FIG. 79, the control method of an electronic device according to the present invention may include displaying a screen for an application on a display 151 (S1000), sensing a force direction of a first contact TP1 (S1010), selecting a first operation value (S1020), and executing a specific operation (S1030).

The steps will be described below in detail with reference to FIGS. 80 to 89.

As shown in FIG. 80, the control unit 180 may display a screen SC for any application on the display 151 (S1000).

Here, the screen SC may be a screen for a specific application that is selected according to a user's input and/or a specific event that occurred in the electronic device 100. For example, FIG. 4 shows that the electronic device 100 displays a sound source (e.g., Yesterday) playback screen on the display 151 through a sound source playback application.

The sound source playback screen may include a pause icon, a rewind icon and a fast forward icon for moving a playback time of a sound source or moving a played-back sound, and a line bar B that displays the playback time of the sound source.

Here, the line bar B may be a kind of time bar that may visually inform the user of the start and end of the sound source being played back, and may correspond to an operation range to be described below.

An example in which the application is the sound source playback application and a specific operation includes playing back the sound source "Yesterday" for 2 minutes, changing the playback time from 2:00 to 3:45, and then playing back the sound source from 3:45 will be described below.

Referring to FIG. 5, when a user intends to change the playback time on the sound source playback application, the user may make contact with the screen SC within the operation range.

Here, the contact with the screen is defined as the first contact TP1.

The operation range may be a range that is associated with the sound source playback time, and has a first value and a second value as a lower limit and an upper limit, respectively.

The operation range may be a specific region on the display 151 for a specific operation of the application, and the specific region may be set in various ways according to characteristics of the specific operation.

As an example, when the sound source "Yesterday" is a four-minute sound source, the first value may be 00:00, and the second value may be 04:00.

The first value and the second value corresponding to the lower limit and the upper limit, respectively, may be time-conceptual numerical values associated with the sound source playback time. The first value and the second value may be changed according to the kind of the sound source.

When the user intends to change the sound source playback time from 2:00 to 3:45, the user may make contact with the screen SC within the operation range. A contact value corresponding to the position of the first contact TP1 that is the contact with the screen is positioned between the first value and the second value, the force direction sensing unit 131 may sense the force direction of the first contact TP1 (S1010).

However, the force direction sensing unit 131 may sense all contacts to the screen SC. However, when the contact is not made within the operation range, the control unit 180 may determine that the contact does not correspond to the first contact TP1.

Here, the operation range may denote a region in which at least a portion of a region on the display 151 is changed to a time-conceptual numerical value and then assigned by the control unit 180.

The contact value is a numerical value for any contact with the screen and allows the control unit 180 to compare the first value and the second value. Here, the contact value may be a time-conceptual numerical number.

In other words, the control unit 180 may change a numerical value for contact with the screen in various ways according to characteristics of a specific operation. As an example, for the sound source playback application, the numerical value for the contact may be a time-conceptual numerical value.

Furthermore, the control unit 180 may display the contact value on the screen SC.

When the contact with the screen SC is made within the operation range, that is, between the first value and the second value in which the contact value is time-conceptual to implement the first contact TP1, the user may drag a position of the first contact TP1 within the operation range to change the position. Thus the control unit 180 may change a playback time that is the contact value.

Here, the term "drag" may denote an operation of changing a contact position while the contact is maintained on the screen.

When the control unit 180 determines that the contact value is not between the first value and the second value, the sound source playback time may not be changed even by the drag operation.

A line bar B corresponding to the operation range and having positions corresponding to the first value and the second value as both ends may be displayed on the screen SC by the control unit 180. For the sound source playback application, the line bar B may be a kind of time bar that may visually inform the user of the start and the end of the sound source being played back.

Here, the line bar B may denote a region in which at least a portion of a region on the display 151 is changed to a time-conceptual numerical value and then assigned by the control unit 180.

As a result, when the first contact TP1 is made on the line bar B, and the position of the first contact TP1 is positioned on the line bar B, the control unit 180 determines that the contact value of the first contact TP1 is between the first value and the second value. The user may drag the position of the first contact TP1 within the operation range to change the position and thus may change a playback time that is the contact value.

Furthermore, the control unit 180 may display the changed playback time that is the contact value on the screen SC in real time.

When the user intends to drag the position of the first contact TP1 to move to a time that the user desires, that is, a playback time of 3:45 in order to play back the sound source from the time of 3:45, fine adjustment is not possible due to limitation of a drag and thus movement to a position corresponding to 3:45 is actually impossible, as shown in FIG. 81.

In other words, the start point of the first contact TP1 is B1, and the end point thereof is ultimately a position A1 of 3:47, which is around 3:45, via B2.

That is, even though the user intends to drag the position of the first contact TP1 to a position A3 corresponding to 3:45 (see FIG. 83), the position of the first contact TP1 may ultimately be changed only to a position corresponding to 3:47 because the fine control is actually impossible.

Here, when the position of the first contact TP1 is positioned at a position of 3:47, the force direction sensing unit 131 senses the force direction of the first contact TP1 while the first contact TP1 is maintained (S1010).

The method of sensing the force direction has already been described in detail above, and a detailed description thereof will be omitted.

Next, as shown in FIGS. 82 and 83, the control unit 180 may acquire the force direction at the end point A1 of the first contact TP1 through the force direction sensing unit 131 and then may select a first operation value on the basis of the force direction (S1020).

The first operation value is a control value for executing a specific operation. Here, the first operation value may denote a playback time of 3:45, and the playback time may move along the line bar B according to the force direction of the first contact TP1.

In other words, when the force direction of the first contact TP1 sensed by the force direction sensing unit 131 is a first direction D1, a second direction D2, or another direction, the control unit 180 may control the playback time to be a time corresponding to the first direction D1, a time corresponding to the second direction D2, or a time corresponding to the other direction. As shown in FIG. 84, this may be implemented by the force direction sensing unit 131 that may sense shear force that is acting in a direction parallel with the surface of the display 151 as well as shear force that is acting in a direction perpendicular to the surface of the display 151.

As a result, this may be implemented by changing the force direction of the first contact TP1 to the first direction D1, the second direction D2, or the other direction while maintaining the first contact TP1 within the operation range at the point A1 in order to perform a specific operation executed on the application, and then ultimately changing the playback time to the point A3.

When the playback time is changed to the point A3 by the change in the force direction of the first contact TP1, the control unit may remove the first contact TP1 to play back the sound source that is a specific operation at the point A3 of 3:45.

That is, the control unit 180 may execute the sound source playback which is a specific operation at the playback time of 3:45 that is the first operation value (S1030).

Alternatively, as shown in FIG. 86, when the force direction of the first contact TP1 is changed to a third direction D3 (see FIG. 84), that is, a direction that is toward the screen SC after the playback time is changed to the point A3 by the change in the force direction of the first contact TP1, the control unit 180 may select a value corresponding to the moment as the first operation value and then may execute the sound source playback that is a specific operation at that time.

That is, the control unit 180 may select the point A3 as the first operation value by the force direction from the point A3 to the third direction D3, and may execute the sound source playback that is a specific operation at the playback time of 3:45 that is the selected first operation value.

The control unit 180 may display the change in the playback time, that is, the change in the playback time caused by the drag and the force direction change on the screen SC in real time. As a result, the control unit 180 may display a process in which the contact value is changed to the first operation value on the screen in real time.

The control unit 180 may add or subtract a predetermined unit section value to or from the contact value corresponding to the position of the first contact TP1 according to the force direction of the first contact TP1 to select the first operation value. Here, the contact value may be a time-conceptual value and may be the playback time of 3:47.

As an example, the predetermined unit section value may be an interval time in which the playback time of the sound source is rewound or fast forwarded and may be, e.g., 1 second.

Accordingly, the control unit 180 may consecutively add or subtract 1 second, which is the predetermined unit section value to or from the point A1 that is the contact value corresponding to the position of the first contact TP1 according to the force direction of the first contact TP1 to ultimately select A3 (3:45) that is the first operation value.

The control unit 180 may change the number of additions and subtractions of the unit section value on the basis of duration of the force direction of the first contact TP1 sensed by the force direction sensing unit 131 and magnitude of the force direction of the first contact TP1 sensed by the force direction sensing unit 131 and then select the first operation value. A description associated with time will be provided with reference to FIG. 85.

Referring to FIG. 85, first, when the force direction of the first contact TP1 is maintained in the first direction D1 for Δ2t (displayed in the graph as a negative number in consideration of a direction), 1 second, which is the predetermined unit section value, is subtracted four times from the point A1 (3:47, see FIG. 81) by the control unit 180 to change the playback time to a point A2 (3:43, see FIG. 82).

That is, the graph of FIG. 9 the playback point may move from the origin to the point A2 along the line positioned in the third quadrant of the graph.

However, A1, A2, and A3 are reference numbers associated with the playback time. A1, A2, and A3 may indicate the same position when the first contact TP1 is made.

The above-described result may be derived under the assumption that the duration Δt of the force direction corresponds to two subtractions of the predetermined unit section value.

Subsequently, when the force direction of the first contact TP1 is maintained in the second direction D2 for Δt, 1 second, which is the predetermined unit section value, is added two times to the point A2 (3:43) by the control unit 180 to change the playback time to the point A3 (3:45). Thus the point A3 may be selected as the first operation value.

The predetermined unit section value may be variously changed, and the relationship between the duration Δt of the force direction and the number of additions and subtractions of the predetermined unit section value may be variously changed.

In addition, the number of additions and subtractions of the predetermined unit section value may be changed on the basis of the magnitude of the force direction of the first contact TP1. When the magnitude of the force direction and the number of additions and subtractions are set in advance, the control unit 180 may select the first operation value according to the set values.

The control unit 180 may adjust the size of the predetermined unit section value on the basis of the magnitude of the force direction of the first contact sensed by the force direction sensing unit 131.

For example, the magnitude of the force direction of the first contact TP1 sensed by the force direction sensing unit 131 and the magnitude of the predetermined unit section value may have a proportional relationship. In this case, the degree of addition or subtraction may be different although the force direction is maintained during the same time.

As another example, as shown in FIG. 87, the control unit 180 may select the first operation value when the start point of the first contact TP1 is implemented within a range outside the operation range.

Referring to FIG. 87, when a user intends to change the playback time on the sound source playback application, the user may make contact with the screen SC within a range other than the operation range. That is, the start point of the first contact TP1 may be the range other than the operation range.

However, the position of the first contact TP1 may be changed by dragging the contact to the operation range, that is, the line bar B while maintaining the contact. In this case, the control unit 180 may determine that the first contact TP1 is implemented within the operation range.

In other words, when the position is moved to the operation range through the dragging although the start point of the first contact TP1 is implemented within the range other than the operation range, the control unit 180 may determine that the contact value of the first contact TP1 is between the first value and the second value.

Subsequently, the control unit 180 may change the contact value by the dragging, select the first operation value, and execute the specific operation by the method described with reference to FIGS. 81 to 86.

As still another example, as shown in FIG. 88, the control unit 180 may select the first operation value when the end point of the first contact TP1 is implemented within a range other than the operation range.

Referring to FIG. 88, when a user intends to change the playback time on the sound source playback application, the user may make contact with the screen within the operation range. That is, the start point of the first contact TP1 may be within the operation range.

Here, when the start point of the first contact TP1 is within the operation range, the control unit 180 may determine that the contact value of the first contact TP1 is between the first value and the second value. Even when the end point of the first contact TP1 is positioned within a range other than the operation range while the contact is maintained, the control unit 180 may select the first operation value on the basis of the force direction of the first contact TP1.

Here, the change of the contact value by the dragging, the selection of the first operation value by the control unit 180, and the execution of the specific operation can be implemented by the method described with reference to FIGS. 81 to 86, and thus a detailed description thereof will be omitted.

The above control method of an electronic device has been described using the sound source playback application as an example. However, the control method can be applied when fine adjustment is required while the first operation value is selected to perform a specific operation that may be executed on various applications.

For example, as shown in FIG. 89, the control method can be applied to an image and video (hereinafter referred to as an image) capture application, and in particular, may be applied when a focus is adjusted.

When a user intends to capture an image through the image capture application, the user may acquire a specific focus through a focus adjustment process in order to acquire a clear image.

Here, the specific focus may be the specific operation. In order to perform the specific operation executed on the application, the control unit 180 may select the first operation value on the basis of the first contact TP1 at the screen within the operation range and the force direction of the first contact TP1 sensed by the force direction sensing unit 131 and then may execute the specific operation according to the first operation value.

In a capturing mode of the image capture application, the operation range may be a range for focus adjustment, and particularly a line bar B that indicates the range for the focus adjustment.

The first operation value may be a numerical value corresponding to a specific focus desired by the user. The numerical value indicating the range of the focus can be variously changed.

Subsequently, the selection of the first operation value by the control unit 180 and the execution of the specific operation can be implemented by the method described with reference to FIGS. 81 to 88, and thus a detailed description thereof will be omitted.

For the sound source playback application, etc., the above-described control method of an electronic device may be applied when the user may intends to select an editing section. For example, the user may select the first operation value and a second operation value by the above-described control method of an electronic device, acquire a playback section corresponding to a section between the first operation value and the second operation value, and then set the playback section as the editing section.

Eleventh Control Method of Electronic Device User Interface Providing Method #11

An eleventh control method of an electronic device according to the present invention will be described below using the electronic device 100 that has been described with reference to FIGS. 1 to 6.

FIG. 90 is a flowchart for describing the eleventh control method of an electronic device according to the present invention, and FIGS. 91 to 93 are diagrams for describing the eleventh control method of an electronic device according to the present invention.

Referring to FIG. 90, the eleventh control method of an electronic device according to the present invention may include displaying a screen for an application on a display 151 (S1100), selecting a provisional value on the basis of a first contact TP1 (S1110), selecting a first operation value on the basis of a second contact TP2 (1120), and executing a specific operation (S1130).

The steps will be described below in detail with reference to FIGS. 91 to 93.

As shown in FIG. 91, the control unit 180 may display a screen SC for any application on the display 151 (S1100).

Here, the screen SC may be a screen for a specific application that is selected according to a user's input and/or a specific event that occurred in the electronic device 100. For example, FIG. 15 shows that the electronic device 100 displays a sound source (e.g., Yesterday) playback screen on the display 151 through a sound source playback application.

Referring to FIG. 91, when a user intends to change the playback time on the sound source playback application, the user may make contact with the screen SC within the operation range.

Here, the contact with the screen is defined as the first contact TP1.

The operation range may be a range that is associated with the sound source playback time and has a first value and a second value as a lower limit and an upper limit, respectively. A detailed description has been already provided with reference to FIGS. 81 to 89 and thus will be omitted.

When the first contact TP1 is made within the operation range, that is, on the line bar B, the control unit 180 may select a provisional value on the basis of the first contact TP1 (S1110). Even when the start point of the first contact TP1 is positioned within a range other than the operation range, but the position of the first contact TP1 is changed within the operation range, that is, on the line bar B through dragging while the contact is maintained, the control unit 180 may determine that the first contact TP1 is made within the operation range, and may select the provisional value on the basis of the first contact TP1 (S1110).

As shown in FIG. 88, even when the start point of the first contact TP1 is made within the operation range, and the end point of the first contact TP1 is positioned within a range other than the operation range while the contact is maintained, the control unit 180 may determine that the first contact TP1 is made within the operation range and may select the provisional value on the basis of the first contact TP1 (S1110).

When the control unit 180 determines that the first contact is made within the operation range, that is, that a contact value (a time-conceptual value for the sound source playback application) which is a numerical value between the first value and the second value for the contact, the control unit 180 may change a playback time that is the contact value by the user dragging the first contact TP1.

The control unit 180 may ultimately select the provisional value on the basis of the end point of the first contact TP1. In FIG. 91, the provisional value is 3:47 that is A1 among playback times.

Here, the provisional value is the same concept as the contact value of the first contact TP1. For the sound source playback application, the provisional value may denote a playback time.

When the playback time A1 (3:47) is selected by dragging the first contact TP1, the control unit 180 may select a first operation value A3 (3:45) obtained by performing addition or subtraction on the provisional value on the basis of the force direction of the second contact TP2 that is in contact with the screen SC (S1120).

Referring to FIG. 92, the second contact TP2 is discontinuous contact when a relationship with the first contact TP1 is considered, and may be contact with any point on the screen SC. The control unit 180 may move the playback time according to the force direction of the second contact TP2 to select the first operation value, and may remove the second contact TP2 to play back the sound source that is the specific operation from 3:45 that is the point A3 (S1130).

The method of sensing the force direction has already been described in detail above, and a detailed description thereof will be omitted.

As shown in FIG. 93, when the force direction of the second contact TP2 is changed to a third direction D3, that is, a direction that is toward the screen SC after the playback time is changed to the playback point A3 by the change in the force direction of the second contact TP2, the control unit 180 may select a value corresponding to the moment as the first operation value and then may execute the sound source playback that is a specific operation at that time.

Here, a process and a principle in which the first operation value is selected according to the force direction of the second contact TP2 and a process and a principle in which the specific operation is executed have already been described with reference to FIGS. 81 to 89. Thus, a detailed description will be omitted.

When the force direction of the second contact TP2 is sensed by the force direction sensing unit 131 within a predetermined time after the force direction of the first contact TP1 is sensed by the force direction sensing unit 131, the control unit 180 may select the first operation value obtained by performing addition or subtraction on the provisional value on the basis of the force direction of the second contact TP2. When the predetermined time has passed, the control unit 180 may not select the first operation value obtained by performing addition or subtraction on the provisional value although the second contact TP2 is made.

That is, the control unit 180 may determine whether the second contact TP2 is made within the predetermined time after the first contact TP1 is made. When the predetermined time has passed, the control unit 180 may determine that the second contact TP2 is unassociated with the selection of the first operation value, and then may ignore the second contact TP2.

The control unit 180 may play back the sound source corresponding to the playback time that corresponds to the provisional value according to the ignorance of the second contact TP2.

Twelfth Control Method of Electronic Device User Interface Providing Method #12

A twelfth control method of an electronic device according to the present invention will be described below using the electronic device 100 that has been described with reference to FIGS. 1 to 6.

FIG. 94 is a flowchart for describing the twelfth control method of an electronic device according to the present invention, and FIGS. 95 to 96 are diagrams for describing the twelfth control method of an electronic device according to the present invention.

Referring to FIG. 94, the twelfth control method of an electronic device according to the present invention may include displaying a screen in which a first operation of an application is executed on a display 151 (S1200), selecting a time of addition or subtraction on the basis of a force direction of a first contact TP1 (S1210), selecting a first operation value (S1220), and executing a specific operation (S1230).

The steps will be described below in detail with reference to FIGS. 95 and 96.

As shown in FIG. 95, the control unit 180 may display a screen SC in which a first operation of any application is executed on the display 151 (S1200).

Here, the screen SC may be a screen for a specific application that is selected according to a user's input and/or a specific event that occurred in the electronic device 100. For example, FIG. 19 shows that the electronic device 100 displays a sound source (e.g., Yesterday) playback screen on the display 151 through a sound source playback application. The first operation may be sound source playback.

The screen SC displays the moment in which the sound source is played back at a current playback time of 3:47.

Referring to FIG. 96, when a user intends to change the playback time on the sound source playback application, the user may make contact with any point on the screen SC. The contact is defined as the first contact TP1.

The control unit 180 may select a time added to or subtracted from the playback time of 3:47 at which the first operation is executed on the basis of a force direction D1 or D2 of the first contact TP1 (S1210), select a first operation value corresponding to the selected added or subtracted time (S1220), and then execute a specific operation on the basis of the first operation value (S1230).

In detail, a time at which the first operation is executed may denote the playback time of 3:47. The control unit 180 may move the playback time according to the force direction of the first contact TP1 to select the playback time of 3:45 that is the first operation value, and may remove the first contact TP1 to play back the sound source that is the specific operation from 3:45 that is the first operation value.

The method of sensing the force direction has already been described in detail above, and a detailed description thereof will be omitted.

A process and a principle in which the first operation value is selected according to the force direction of the first contact TP1 and a process and a principle in which the specific operation is executed have already been described with reference to FIGS. 81 to 89. Thus, a detailed description will be omitted.

In the above-described control method of an electronic device, the steps of each embodiment are not necessary, and thus the embodiment may selectively include the above-described steps. The steps of each embodiment do not need to be performed in the described order. Steps described later may also be performed before steps described earlier.

The control method of an electronic device according to the present invention may be implemented in the form of a code or program that performs the control method. Such a code or program may be stored in a computer-readable recording medium.

It will be apparent to those skilled in the art that various substitutions, modifications, and changes may be made thereto without departing from the scope and spirit of the present invention. The present invention is not limited by the embodiments and drawings described herein. However, the embodiment described herein may not be limitedly applied, and various modifications to the embodiments may be made by selectively combining all or some of the embodiments. Furthermore, the steps of each embodiment may be used separately from or in combination with steps of another embodiment.

In addition, the present invention has been described under the assumption that the display 151 is divided into two regions, but is not limited thereto. The present invention may also be applied to a case in which the display 151 is divided into three or more regions.

However, a process of the control unit 180 selecting a region in which the first screen and/or the second screen is to be displayed may be implemented by the force direction sensing unit 131 that senses a change in the force direction of the first contact that is described with reference to FIG. 27.

What is claimed is:

1. An electronic device comprising:
a flexible display comprising a first region and a second region neighboring and separate from the first region, wherein the flexible display comprises a plurality of touch areas that comprise a first touch area in the first region and a second touch area in the second region;
a plurality of sensor arrays formed on the plurality of touch areas such that each of the plurality of sensor arrays is disposed on a corresponding one of the plurality of touch areas, each of the plurality of sensor arrays being configured to detect a touch input by a finger on the corresponding touch area and touch force applied by the touch input at a plurality of points in the corresponding touch area, each of the plurality of sensor arrays being further configured to obtain a plurality of force intensities at a plurality of points in the corresponding touch area; and
a controller configured to:
process the plurality of force intensities at the plurality of points in each touch area obtained by a corresponding sensor array disposed on each of the plurality of touch areas;
determine a force direction of the touch input based on the plurality of force intensities at the plurality of points in each touch area;
control the flexible display to display a first screen of a first application such that the combination of the first region and the second region displays the first screen;
provide a notification about an event while the combination of the first region and the second region displays the first screen;
determine, based on the touch input, that a predetermined touch input is applied on the flexible display while the notification is being provided, the predetermined touch input comprising a first touch input by a first finger applied on the first touch area and a second touch input by a second finger applied on the second touch area, the first touch input on the first touch area having a first force direction that is determined based on the plurality of force intensities at the plurality of points in the first touch area and the second touch input on the second touch area having a second force direction that is determined based on the plurality of force intensities at the plurality of points in the second touch area;
in response to the first and second touch inputs, activate a second application different from the first application; and
in response to a third touch input by the second finger on at the second touch area having a third force direction that is determined based on the plurality of force intensities at the plurality of points in the second touch area and different from the second force direction or the second finger being released from the second touch area while the first finger remains on the first touch area, control the flexible display to display a second screen of the second application on the second region to provide the information of the event and further control the flexible display to display a third screen of the first application on the first region such that the second region no longer displays a screen of the first application in response to the third force direction of the third touch input by the second finger being applied to or the release of the second finger following the first touch input by the first finger and the second touch input by the second finger.

2. The electronic device of claim 1, wherein the controller is further configured to control the flexible display to display the second screen when the first force direction is opposite to the second force direction.

3. The electronic device of claim 1, wherein the controller is configured to determine that both the first and second touch inputs are applied when a time interval between the first touch input and the second touch input is shorter than a predetermined reference.

4. The electronic device of claim 1, wherein when determining the force direction of the touch input, the controller is configured to locate a first point of the plurality of points that has the greatest force intensity among the plurality of points and determine a direction from a center point of the touch area to the first point as the force direction.

\* \* \* \* \*